(12) United States Patent
Morikawa et al.

(10) Patent No.: US 6,852,665 B2
(45) Date of Patent: Feb. 8, 2005

(54) COMPOSITE OXIDE, PROCESS FOR PRODUCING THE SAME, CATALYST FOR PURIFYING EXHAUST GAS, AND PROCESS FOR PRODUCING THE SAME

(75) Inventors: Akira Morikawa, Aichi-gun (JP); Miho Hatanaka, Aichi-gun (JP); Haruo Imagawa, Aichi-gun (JP); Akihiko Suda, Aichi-gun (JP); Naoki Takahashi, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 244 days.

(21) Appl. No.: 09/911,489

(22) Filed: Jul. 25, 2001

(65) Prior Publication Data

US 2002/0049137 A1 Apr. 25, 2002

(30) Foreign Application Priority Data

| Jul. 27, 2000 | (JP) | 2000-227183 |
| Dec. 13, 2000 | (JP) | 2000-379295 |
| Dec. 26, 2000 | (JP) | 2000-394738 |
| Mar. 6, 2001 | (JP) | 2001-061422 |
| May 31, 2001 | (JP) | 2001-164444 |

(51) Int. Cl.$^7$ .............................................. B01J 23/00
(52) U.S. Cl. ................ 502/302; 502/303; 502/304; 502/340; 502/349; 502/350; 502/351; 502/355
(58) Field of Search ................ 502/60–87, 300–355

(56) References Cited

U.S. PATENT DOCUMENTS

| 4,910,180 A | * | 3/1990 | Berndt et al. ............... 502/304 |
| 5,024,985 A | * | 6/1991 | Koberstein et al. ......... 502/304 |
| 5,496,788 A | * | 3/1996 | Domesle et al. ............ 502/333 |
| 6,150,288 A | * | 11/2000 | Suzuki et al. ............... 501/105 |
| 6,335,305 B1 | | 1/2002 | Suzuki et al. |

FOREIGN PATENT DOCUMENTS

| DE | 40 14 584 | 11/1991 |
| EP | 0 499 402 | 8/1992 |
| EP | 0 778 071 | 6/1997 |
| EP | 0 794 527 | 9/1997 |
| EP | 0 852 966 | 7/1998 |
| EP | 1 020 216 | 7/2000 |
| JP | 62-027328 | 2/1987 |
| JP | 62-158117 | 7/1987 |
| JP | 4-4043 | 1/1992 |
| JP | 7-300315 | 11/1995 |
| JP | 2533516 | 6/1996 |
| JP | 9-141098 | 6/1997 |
| JP | 2893648 | 3/1999 |
| WO | WO 01/08797 | 2/2001 |
| WO | WO 01/60738 | 8/2001 |

* cited by examiner

Primary Examiner—Steven Bos
Assistant Examiner—William G. Wright, Sr.
(74) Attorney, Agent, or Firm—Oblon, Spivak, McClelland, Maier & Neustadt, P.C.

(57) ABSTRACT

A composite oxide includes agglomerated particles which have an average particle diameter of 20 μm or less, which are composed of a plurality of metallic element oxides being in form of fine particles having an average diameter of 50 nm or less, and which have a surface and an inner portion whose metallic element distributions differ with each other. The characteristics of the respective metallic elements are exhibited maximally. Hence, it is extremely useful as a support for an exhaust gas purifying catalyst. The catalyst exhibits the activities which degrade less even after it is subjected to a sever durability, is good in terms of the heat and sulfur-poisoning resistance, and can efficiently purify the harmful components in exhaust gases. Moreover, it is possible to produce such a composite oxide and catalyst easily and stably by production processes disclosed herein.

57 Claims, 3 Drawing Sheets

10: $Al_2O_3$
12: $Al_2O_3-La_2O_3$
13: $CeO_2-ZrO_2$

21: $CeO_2-ZrO_2$
20: $Al_2O_3$
22: $Al_2O_3-La_2O_3$
23: $CeO_2-ZrO_2-La_2O_3$

COMPOSITE OXIDE, PROCESS FOR PRODUCING THE SAME, CATALYST FOR PURIFYING EXHAUST GAS, AND PROCESS FOR PRODUCING THE SAME

BACKGROUND OF THE INVENTION

1. Field of the Invention

The present invention relates to a composite oxide, which is useful as a support for a catalyst for purifying an exhaust gas, a process for producing the same, a catalyst for purifying an exhaust gas, in which the composite oxide is employed as a support, and a process for producing the same.

2. Description of the Related Art

Conventionally, as a catalyst for purifying an automotive exhaust gas, a 3-way catalyst is used which oxidizes CO and HC and reduces $NO_x$ in the exhaust gas simultaneously. As for such a 3-way catalyst, for example, a catalyst has been known widely in which a support layer, being composed of $\gamma$-$Al_2O_3$, is formed on a heat resistant honeycomb substrate, being composed of cordierite, etc., and a catalyst ingredient, such as platinum (Pt), rhodium (Rh), etc., is loaded in the support layer.

By the way, as the conditions required for the support used in the catalyst for purifying an exhaust gas, a large specific surface area and a high heat resistance can be listed. In general, $Al_2O_3$, $SiO_2$, $ZrO_2$, $TiO_2$, etc., have been used often. Further, by combinedly using $CeO_2$ having an oxygen storage-and-lease ability, it has been carried out relieving the atmosphere fluctuation of exhaust gas. Furthermore, it has been known that the durability of the oxygen storage-and-release ability of $CeO_2$ can be improved by making $CeO_2$ into a composite oxide with $ZrO_2$.

However, in the conventional catalyst for purifying an exhaust gas, there arise the decrement of the specific surface area of the support by sintering and the granular growth of the catalyst ingredient when it is subjected to a high temperature exceeding 800° C. Moreover, since the oxygen storage-and-release ability, possessed by $CeO_2$, decreases as well, there has been a drawback in that the purifying performance of the conventional catalyst degrades sharply.

Since the exhaust gas emission control has been strengthened recently, it has been required strongly to purify an exhaust gas even in a very short period of time from starting an engine. In order to do so, it is required to activate the catalysts at a much lower temperature and to purify the emission-controlled components. Among them, a catalyst, in which Pt is loaded on $CeO_2$, is excellent in terms of the performance for purifying CO starting at a low temperature. When such a catalyst is used, the CO-adsorption poisoning of Pt is relieved by igniting CO at a low temperature, and the igniting ability of HC is enhanced. Further, with these advantageous effects, the warm-up of the catalyst surface is facilitated, and accordingly it is possible to purify HC from a low temperature region. Furthermore, in this catalyst, $H_2$ is produced by a water gas shift reaction in a low temperature region, and consequently it is possible to reduce and purify $NO_x$ by the reactions of $H_2$ and $NO_x$ from a low temperature region.

However, the conventional catalyst, in which Pt, etc., is loaded on $CeO_2$, lacks the durability in actual exhaust gases. It is not practical because $CeO_2$ causes the sintering by heat. In order to use it in actual exhaust gases, it is necessary to upgrade the heat resistance without losing the properties of $CeO_2$. Moreover, accompanied by the sintering of $CeO_2$, Pt causes the granular growth so that there may arise a case in that the activity decreases. Hence, it has been required to stabilize Pt loaded on the support.

Even in a catalyst which includes $CeO_2$ in its support, its oxygen storage-and-release ability, which is exhibited by $CeO_2$, lowers when it is exposed to a high temperature. The disadvantage is caused by the sintering of $CeO_2$, the granular growth of the noble metal loaded thereon, the oxidation of the noble metal, the solving of Rh in $CeO_2$, and so on. Thus, in a catalyst which exhibits a low oxygen storage-and-release ability (or which has a small $CeO_2$ content), the novel metal is likely to be exposed to a fluctuating atmosphere, and the deterioration (e.g., the agglomeration or solving) of the noble metal is furthermore facilitated.

Therefore, in Japanese Unexamined Patent Publication (KOKAI) No. 4-4,043, there is disclosed a catalyst for purifying an exhaust gas in which a catalytic ingredient is loaded on a composite oxide support being composed of a composite oxide of $Al_2O_3$, $CeO_2$ and $ZrO_2$. The catalyst, in which an arbitrary noble metal is loaded on such a composite oxide support, has high purifying performance even after it is subjected to a high temperature calcining at 850° C. The publication sets forth the reason for the advantage that the decrement of the oxygen storage-and-release ability is suppressed. Moreover, in Japanese Unexamined Patent Publication (KOKAI) No. 7-300,315, there is disclosed an oxide support, which is formed by precipitating Ce ions and Zr ions by adding charged particles (e.g., $Al_2O_3$).

Such composite oxide supports are produced in the following manner. Oxide precursors, being composed of a plurality of metallic elements, are prepared by an alkoxide method, a co-precipitation method, and the like, and are calcined thereafter. Among them, since the co-precipitation method is less expensive in terms of the material cost compared to that of the alkoxide method, it effects an advantage in that the resulting composite oxide is less expensive. Hence, the co-precipitation method has been used widely in the production of composite oxides.

For instance, in Japanese Unexamined Patent Publication (KOKAI) No. 9-141,098, there is set forth a catalyst for purifying an exhaust gas, which has Rh, serving as the catalytic ingredient, and a catalytic component loading layer, constituted by a composite oxide. The catalytic component loading layer is made in the following manner. Precipitates are co-precipitated from an aqueous mixture solution, being composed of a first water-soluble metallic salt including at least one metal selected from the group consisting of Mg, Ca, Sr, Ba, Y and La and a second water-soluble metallic salt including Zr. Then, the resulting precipitates are calcined to form the composite oxide, which constitutes the catalytic component loading layer. By thus making the composite oxide support, the high temperature durability and catalytic activity of Rh are upgraded, and the low temperature activity and purifying performance of the catalyst are improved remarkably even after a high temperature durability test.

Moreover, since Rh is good in terms of the reducing activity, it is one of the essential catalytic metal to a catalyst for purifying an exhaust gas along with Pt, which exhibits a high oxidizing activity. However, in the aforementioned catalyst, in which Pt and Rh are loaded on the composite oxide support, the granular growth of Pt can be controlled, but there still remains a drawback in that a solid phase reaction takes place between Rh and $CeO_2$ in a high temperature oxidizing atmosphere so that Rh loses the activity.

While, in Japanese Patent Publication No. 2,893,648, a catalyst is reported which uses a support being composed of porous fine particles. The porous fine particles are a mixture of alumina and lanthanum oxide, which is produced by a co-precipitation method, and have pores, which have a pore diameter of 400 Å or less, in a percentage of from 20 to 30%. Since the porous fine particles are good in terms of the heat resistance, they can inhibit the granular growth of the noble metal. Moreover, there occurs no solid phase reaction between the porous fine particles and Rh.

In Japanese Patent Publication No. 253,516, etc., there is disclosed a catalyst for purifying an exhaust gas. In the catalyst, the coating layer is made into a two-layered construction, a catalytic layer with Pt loaded on $Al_2O_3$ is formed as a lower layer, and a catalytic layer with Rh loaded on a support, being composed of $Al_2O_3$ and $ZrO_2$, is formed as an upper layer. By thus making a catalyst having such a plurality of catalytic layers, the functions of the respective layers can be shared more efficiently, and the activities can be enhanced. In addition, it is possible to control the drawbacks, such as the granular growth of the catalytic ingredient, caused by the mutual actions between the components, and so on.

While, a zeolite has an HC adsorbing ability. Hence, by using a zeolite for a support, HC are adsorbed onto the zeolite to control the emission in a low temperature range, and the HC, which are released from the zeolite, are oxidized in a high temperature region in which the catalytic ingredient is heated to the activation temperature or more. Therefore, it has been known to improve the conversion of HC from a low temperature to a high temperature by the operations. Accordingly, when a support is used in which a zeolite and $CeO_2$ are used combindely, the oxygen storage-and-release ability is exhibited simultaneously in addition to the HC adsorbing ability. Thus, it is expected that the conversion of HC is furthermore upgraded by adjusting the atmosphere fluctuation.

Moreover, an $NO_x$ storage-and-reduction type catalyst has been recently put into an actual application as a catalyst for purifying an exhaust gas, which is emitted by a lean-burn gasoline engine. This $NO_x$ storage-and-reduction type catalyst is made by loading an $NO_x$ storage member, such as an alkaline metal, an alkaline-earth metal, etc., as well as a noble metal on a porous support, such as $Al_2O_3$, etc. In the operation of this $NO_x$ storage-and-reduction type catalyst, the air-fuel ratio is controlled from the fuel-lean side to the stoichiometric air-fuel ratio as well as the fuel-rich side in a pulsating manner. Hence, $NO_x$ are adsorbed onto the NOx member on the fuel-lean side. Then, the adsorbed $NO_x$ are released from the No, storage member at the stoichiometric air-fuel ratio and on the fuel-rich side, and are reduced and purified by reacting with the reducing components, such as HC and CO, by the catalytic action of the noble metal. Accordingly, since the emission of the NOx is controlled on the fuel-lean side as well, a high $NO_x$ purifying ability can be exhibited as a whole.

However, in the exhaust gas, $SO_2$ is included which is generated by burning sulfur (S) contained in the fuel. The sulfur is oxidized by the noble metal to turn into $SO_3$ in an oxygen-excess atmosphere. Then, the $SO_3$ is easily turned into a sulfuric acid by water vapor contained in the fuel. The $SO_3$ and sulfuric acid react with the $NO_x$ storage member to generate sulfites and sulfates. Thus, it has been apparent that the $NO_x$ storage member is poisoned to deteriorate by the sulfites and sulfates. This phenomenon is referred to as the sulfur poisoning. Moreover, since the porous support, such as $Al_2O_3$, etc., has a quality that it is likely to adsorb $SO_x$ thereonto, there has arisen a problem in that the aforementioned sulfur poisoning is facilitated. Then, when the $NO_x$ adsorbing member is thus turned into sulfites and sulfates, it cannot store $NO_x$ any more. As a result, the aforementioned catalyst might suffer from a drawback that the purifying performance lowers.

Therefore, it is possible to think of using an oxide, such as $TiO_2$, etc., which exhibits a high acidity. Since $TiO_2$ exhibits an acidity higher than that of $Al_2O_3$, it exhibits a low affinity with respect to $SO_x$. As a result, it is possible to inhibit the $NO_x$ storage member from the sulfur poisoning.

By the way, by the recent strengthening of the exhaust gas emission control, the increasing opportunities of high speed driving, or the like, the temperature of the exhaust gas has become extremely high, and accordingly it has been required to furthermore improve the durability of the catalyst. Moreover, there arises another problem of the lowering purifying-ability phenomenon (the sulfur poisoning of the catalytic ingredient), which is caused by the $SO_x$. Namely, the $SO_x$, which are generated by burning the sulfur component in the fuel, are adsorbed onto the support so that they cover the catalytic ingredient to cause the drawback.

However, in the conventional catalyst for purifying an exhaust gas in which the composite oxide was made into the support, there are limits in terms of the heat resistance and sulfur-poisoning resistance. It is believed that the disadvantages result from the fact that the characteristics of the respective metallic oxides are not fully revealed.

For example, in the catalyst set forth in Japanese Unexamined Patent Publication (KOKAI) No. 4-4,043, not only $CeO_2$ and $ZrO_2$, but also $Al_2O_3$, which is a component being mainly responsible for the heat resistance, grow granularly considerably when the catalyst is used in a high temperature region of 1,000° C. or more for a long period of time. Accordingly, there arises a drawback in that the catalytic metal, which is loaded on the support, is also likely to grow granularly. There also arises another problem in that the durability is not improved as much as it is expected.

In addition, $TiO_2$ is good in terms of the sulfur-poisoning resistance. However, it is short of the initial purifying activity when it is used independently. Therefore, it is possible to think of using a composite oxide, in which $TiO_2$ is composited with $Al_2 O_3$. Acatalyst, in which such a composite oxide is made into a support, is good in terms of the sulfur-poisoning resistance, and has a high specific surface area. However, even in this composite oxide, there arises a drawback in that $Al_2O_3$, which is a component being responsible for the heat resistance, grows granularly considerably.

SUMMARY OF THE INVENTION

The present invention has been developed in view of these circumstances. It is therefore a main object of the present invention to provide a composite oxide, whose heat resistance is furthermore enhanced, which has the respective constituent metallic oxides exhibit the characteristics maximally at the same time, and which is useful as a support for a catalyst for purifying an exhaust gas.

In an aspect of the present invention, a composite oxide can carry out the object, and comprises: agglomerated particles having an average particle diameter of 20 $\mu$m or less and being composed of a plurality of metallic element oxides which are in form of fine particles having an average diameter of 50 nm or less, the agglomerated particles having a surface and an inner portion whose metallic element distributions differ with each other.

In a further aspect of the present invention, a composite oxide can carry out the object, and comprises: agglomerated particles having an average particle diameter of 20 μm or less, in which first oxide-phase fine particles having an average diameter of 50 nm or less, and second oxide-phase fine particles being different from the first oxide-phase fine particles and having an average particle diameter of 50 nm or less, are agglomerated, the first oxide-phase forming a crystal having an aspect ratio of 30 or less and being highly dispersed each other with the second-phase fine particles to constitute the agglomerated particles.

In a furthermore aspect of the present invention, a composite oxide can carry out the object, and comprises: agglomerated particles having an average particle diameter of 20 μm or less, in which first oxide-phase fine particles having an average diameter of 100 nm or less and second oxide-phase fine particles being different from the first oxide-phase fine particles and having an average particle diameter of 30 nm or less are agglomerated; the first oxide-phase fine particles having pores between the fine particles, in the pores which a major part of the second oxide-phase fine particles are dispersed, the pores having a median pore diameter of from 5 to 20 nm, 50% or more of all the pores falling in a range of ±2 nm of the median diameter.

In another aspect of the present invention, a catalyst for purifying an exhaust gas can carry out the object, and comprises: a catalytic ingredient being loaded on either of the above-described composite oxides.

The catalyst for purifying an exhaust gas according to the present invention can be constituted so that it has a uniform loading layer, or so that it has a two-layered construction, which is composed of two different support species. The characteristics of the later-described present catalyst for purifying an exhaust gas are that it comprises a support substrate, a first catalytic layer and a second catalytic layer; that the first catalytic layer is formed on a surface of the support substrate, and is composed of a first support including either one of the aforementioned first oxide phases, and a catalytic ingredient being loaded on the first support; that the second catalytic layer is formed on a surface of the first catalytic layer, and is composed of a second support including either one of the aforementioned second oxide phases, and a catalytic ingredient being loaded on the second oxide support; and that at least one of the first support and the second support including agglomerated particles having an average particle diameter of 20 μm or less, in which a plurality of metallic element oxides is in form of fine particles and having an average particle diameter of 50 nm or less, are dispersed, the agglomerated particles having a surface and an inner portion whose metallic element distributions differ with each other.

Further, it is preferred that the loading layer can include a zeolite. The characteristics of the thus constructed present catalyst for purifying an exhaust gas are that it comprises a support substrate, a support layer being formed on a surface of the support substrate, and a catalytic ingredient loaded on the support layer; and that the support layer includes agglomerated particles having an average particle diameter of 20 μm or less, in which a plurality of metallic element oxides being in form of fine particles shape and having an average diameter of 50 nm or less, are dispersed, and zeolite particles, the agglomerated particles having a surface and an inner portion whose metallic element distributions differ with each other.

Furthermore, it is preferred that one of the layers of the above-described present two-layered-construction catalyst can include a zeolite. For example, the characteristic of the thus modified present catalyst for purifying an exhaust gas is that the support layer is formed as a two-layered construction including at least a lower layer, and an upper layer being formed on a surface of the lower layer, the lower layer being composed of the zeolite particles, the upper layer and being composed of the agglomerated particles.

The characteristic of a process for producing the present composite oxide is that it comprises the steps of: preparing a plurality of aqueous solutions of metallic acid salts; adding the plurality of aqueous solutions successively to an alkaline aqueous solution, which can neutralize the total amount of the metallic acid salts, thereby generating precipitates; and calcining the precipitates.

It is desired that the precipitates, which are generated successively, can be subjected to an aging treatment while putting them in a suspension state in which water or a solution containing water serves as a dispersion medium, or in a system in which water is present sufficiently.

The characteristic of another process for producing the present composite oxide is that it comprises the steps of: preparing a plurality of aqueous solutions of metallic acid salts; mixing the respective aqueous solutions of the metallic acid salts with an alkaline solution, thereby forming precipitates respectively; mixing the respective precipitates, thereby preparing a precipitates mixture; and calcining the precipitates mixture. In the case of this process as well, it is desired that at least one of the precipitates, which are generated, can be subjected to an aging treatment while putting it in a suspension state in which water or a solution containing water serves as a dispersion medium, or in a system in which water is present sufficiently, and that a precipitates mixture, in which the respective precipitates are mixed, can be calcined.

The characteristic of still another process for producing the present composite oxide is that it comprises the steps of: preparing a plurality of aqueous solutions of metallic acid salts; mixing at least one of the aqueous solutions of the metallic acid salts with an alkaline solution, thereby forming precipitates; subjecting at least one of the precipitates to an aging treatment while putting it in a suspension state in which water or a solution containing water serves as a dispersion medium, or in a system in which water is present sufficiently; adding the rest of the aqueous solutions of the metallic acid salts to the formed precipitates thereafter, thereby further forming precipitates; and calcining the resulting precipitates subsequently.

The characteristic of a further process for producing the present composite oxide is that, before the calcining step, it further comprises the step of: subjecting the resulting precipitates to an aging treatment while putting them in a suspension state in which water or a solution containing water serves as a dispersion medium, or in a system in which water is present sufficiently.

Note that, in the above-described production processes according to the present invention, it is desired that stirring can be always carried out at a shear rate of 1,000 sec.$^{-1}$ in the step of forming the precipitates.

The characteristic of a process for producing a catalyst for purifying an exhaust gas according to the present invention is that a catalytic ingredient is included in at least one of the aqueous solutions of the metallic acid salts, which are set forth in the above-described production processes according to the present invention.

Namely, in accordance with the present composite oxide, the characteristics of the respective metallic elements, which constitute the present composite oxide, are exhibited maximally. Hence, the present composite oxide is extremely useful as a support for a catalyst for purifying an exhaust gas. Further, in accordance with the present catalyst for purifying an exhaust gas in which the present composite oxide is used as the support, the activities degrade less even after the present catalyst is subjected to a durability test, which is carried out at an elevated temperature as high as 1,000° C. Furthermore, the present catalyst is good in terms of the heat resistance and sulfur-poisoning resistance. Moreover, the present catalyst can efficiently purify the harmful components in exhaust gases.

In addition, in accordance with the present production processes, it is possible to produce composite oxides and catalysts for purifying an exhaust gas, which exhibit such advantages, easily and stably.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
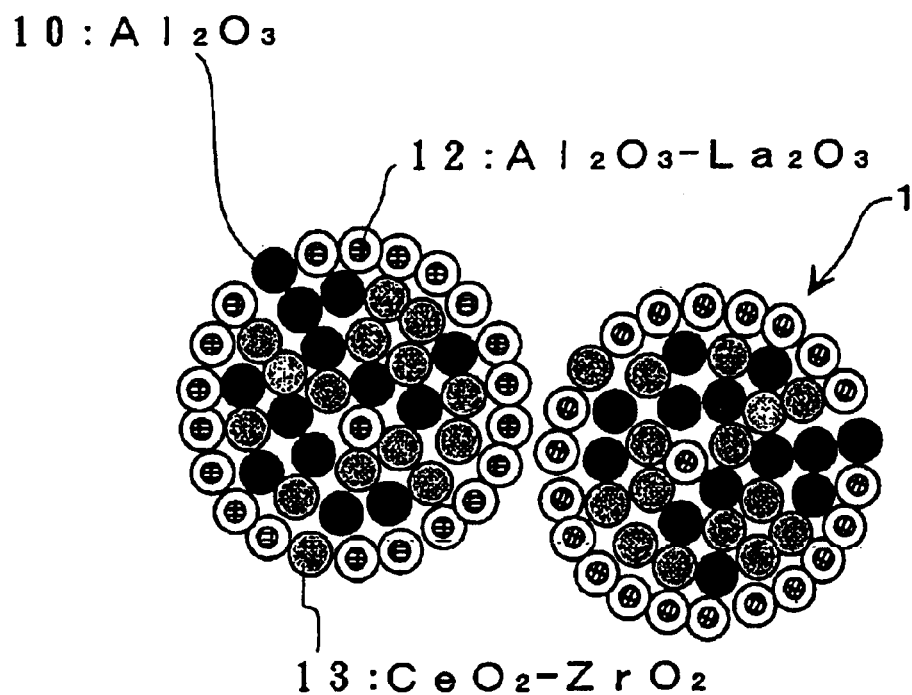
FIG. 1 is a schematic explanatory diagram for illustrating a constitution of a composite oxide, which was prepared in Example No. 1 according to the present invention.

Having generally described the present invention, a further understanding can be obtained by reference to the specific preferred embodiments which are provided herein for the purpose of illustration only and not intended to limit the scope of the appended claims.

In the present composite oxide, the plurality of metallic elements can be at least two elements selected from the group consisting of Al, Ce, Zr, Y, Si, Ti, Mg and Pr.

In the present composite oxide, the plurality of metallic element oxides, are dispersed as fine particles, which have an average particle diameter of 50 nm or less, in the agglomerated particles, which have an average particle diameter of 20 μm or less. Accordingly, since the plurality of oxide fine particles are in a highly dispersed state with each other, and since the different kinds of oxide fine particles intervene mutually, the sintering is inhibited between the same kind of oxide fine particles. Thus, the heat resistance is improved.

Further, in the present composite oxide, the metallic element distributions differ in the surface and inner potion of the agglomerated particles. Therefore, by variously adjusting the oxide species in the surface and inner portion of the agglomerated particles, the respective metallic oxides, which constitute the present composite oxide, exhibit their characteristics, respectively. This advantageous effect is exhibited when a catalytic ingredient is loaded on the present composite oxide to make a catalyst. Hence, in the present catalyst for purifying an exhaust gas, a catalytic ingredient is loaded on the present composite oxide.

The fine particles, having an average diameter of 50 nm or less, refer to primary particles. The agglomerated particles, having an average particle diameter of 20 μm or less, refer to secondary particles, which are formed by agglomerating the fine particles (primary particles). Note that the phrase, average diameter, has the same meaning as that of the phrase, average particle diameter. In the present specification, however, the expressions are used distinctively by referring the average particle diameter of the fine particles as the "average diameter" and by referring the average particle diameter of the agglomerated particles as the "average particle diameter".

When the average diameter of the fine particles exceeds 50 nm, the specific surface areas of the oxides decrease so that the purifying activities tend to decrease. The lower limit of the average diameter of the fine particles is not limited in particular. In accordance with the present production process, however, it usually becomes 5 nm or more. Note that the average diameter of the primary particles can desirably be 30 nm or less, and can further desirably be 20 nm or less.

It is required that the average particle diameter of the agglomerated particles be 20 μm or less. When the average particle diameter of the agglomerated particles exceeds 20 μm, there might arise a case where the activities lower and at the same time the strength of the resulting support layers decreases. The lower limit of the average particle diameter of the agglomerated particles is not limited in particular. In accordance with the present production process, however, it usually becomes 1 μm or more. Note that the average particle diameter of the agglomerated particles can desirably be 15 μm or less, and can further desirably be 8 μm or less.

The surface of the agglomerated particles refers to a range from the outermost surface to a depth of from 1 to 7 μm. However, the depth can desirably fall in a range of from 1 to 5 μm, and can further desirably fall in a range of from 1 to 3 μm. The inner portion of the agglomerated particles refers to a portion thereof with the aforementioned surface range removed. Depending on the characteristics to be derived from the agglomerated particles, it is possible to variously determine the differing extent of the metallic element distributions between the surface and the inner portion. For example, when a metallic element "A" is present in an amount of from 60 to 90 mol % with respect to a total amount of the metallic element "A" in the surface, and when it is present in an amount of from 10 to 40 mol % with respect to the total amount thereof in the inner portion, the characteristics of the metallic element "A", which is present more in the surface than in the inner portion, are exhibited strongly. In the surface of the agglomerated particles, the other oxide fine particles, being composed of a metallic element "B" or a metallic element "C", intervene between the oxide fine particles, being composed of the metallic element "A". In the inner portion of the agglomerated particles, the oxide fine particles, being composed of the metallic element "A", intervene between the fine particles, being composed of the metallic element "B" or the metallic element "C". Hence, the same kind of metallic oxide particles are inhibited from agglomerating with each other so that the heat resistance is upgraded. When the content of the metallic element "A" is more than 90 mol % in the surface, or when the content of the metallic element "A" is more than 40 mol % in the inner portion, it is difficult to exhibit the aforementioned advantage.

Hereinafter, the present invention will be described while exemplifying the metallic elements specifically.

For example, when the plurality of metallic elements are Al, Ce and Zr, since $Al_2O_3$, $CeO_2$ and $ZrO_2$ are present as fine particles having an average diameter of 50 nm or less, respectively, in the agglomerated particles, the sintering is inhibited by intervening different kinds of oxides so that the heat resistance is enhanced. Accordingly, the present composite oxide or the catalyst for purifying an exhaust gas has a specific surface area of 70 m²/g or more after it is subjected to a durability test, which is carried out in air at 1,000° C. for 10 hours. Moreover, since the fine particles exist in a highly dispersed manner, the specific surface area of $CeO_2$ is large so that a high oxygen storage-and-release ability can be exhibited.

In the present composite oxide or the present catalyst, parts of $CeO_2$ and $ZrO_2$ at least can desirably form a solid solution. Thus, the durability of $CeO_2$ is furthermore improved so that a much higher oxygen storage-and-release ability can be exhibited even after a high temperature durability test.

For example, when the surface of the agglomerated particles involves $Al_2O_3$ in a large amount, the surface concentration of $CeO_2$ decreases so that the degradation, which is caused by the solving of Rh in $CeO_2$, can be suppressed in a case where Rh is loaded on the surface of the agglomerated particles. In this case, in the surface of the agglomerated particles, an $Al_2O_3$ amount can desirably fall in a range of from 60 to 90 mol % with respect to a total $Al_2O_3$ amount. When the $Al_2O_3$ amount in the surface deviates from this range, it is difficult to exhibit the aforementioned advantage.

When the surface includes a $CeO_2$—$ZrO_2$ solid solution in a large amount, the granular growth of Pt is inhibited in a case where Pt is loaded on the surface of the agglomerated particles, and at the same time the initial activities can be upgraded. Moreover, since the contact interface between the catalytic ingredient and $CeO_2$ enlarges, the oxygen storage-and-release ability can be enhanced in the transition range, and the same time the granular growth of the catalytic ingredient can be suppressed. Thus, the durability can be improved remarkably. In this case, in the surface of the agglomerated particles, an amount of the $CeO_2$—$ZrO_3$ solid solution can desirably fall in a range of from 60 to 90 mol % with respect to a total amount of the $CeO_2$—$ZrO_2$ solid solution. When the amount of the $CeO_2$—$ZrO_2$ solid solution in the surface deviates from this range, it is difficult to exhibit the aforementioned advantage.

In the present composite oxide or the present catalyst, the agglomerated particles can further involve a rare-earth element oxide, and the rare-earth element oxide can further desirably be solved in $Al_2O_3$ in an amount of 70 mol % or more with respect to a total amount of the rare-earth element oxide. With this arrangement, the heat resistance of $Al_2O_3$ can be upgraded, and at the same time it is possible to control the decrement of the oxygen storage-and-release ability of $CeO_2$, which is caused by solving the rare-earth element in $CeO_2$. The rare-earth element oxide can furthermore desirably be solved in $Al_2O_3$ in an amount of 90 mol % or more with respect to a total amount the rare-earth element oxide. As for the rare-earth element oxide, it is possible to exemplify the oxides of La, Nd, Sm, Pr, etc. Among them, however, $La_2O_3$ can be the most preferable option.

When $La_2O_3$ is solved in $Al_2O_3$ in an amount of 70 mol % or more, and when $Al_2O_3$ with $La_2O_3$ solved therein is present more in the surface of the agglomerated particles and $CeO_2$ or the $CeO_2$—$ZrO_2$ solid solution is present more in the inner portion of the agglomerated particles, the present composite oxide has a high oxygen storage-and-release ability, and at the same time is up graded remarkably in terms of the heat resistance. Hence, the present composite oxide is extremely appropriate for a catalyst, which is used in a high temperature range of 900° C. or more, and which is intended to purify an exhaust gas produced by burning an air-fuel mixture having a stoichiometric air-fuel ratio. In this case, in the surface of the agglomerated particles, an amount of $Al_2O_3$ with $La_2O_3$ solved therein can desirably fall in a range of from 60 to 90 mol % with respect to a total amount of $Al_2O_3$ with $La_2O_3$ solved therein. When the amount of $Al_2O_3$ with $La_2O_3$ solved therein deviates from this range, it is difficult to exhibit the aforementioned advantage.

In the present composite oxide or the present catalyst, when the plurality of metallic elements are Al, Zr and Ti, for instance, since $Al_2O_3$, $ZrO_2$ and $TiO_2$ are present as fine particles having an average diameter of 50 nm or less, respectively, in the agglomerated particles, the present composite oxide or the catalyst for purifying an exhaust gas has a specific surface area of 80 m²/g or more after it is subjected to a durability test, which is carried out in air at 800° C. for 5 hours. Moreover, since $TiO_2$ exists, the present catalyst can be enhanced in terms of the sulfur-poisoning resistance.

In the present composite oxide or the present catalyst, parts of $ZrO_2$ and $TiO_2$ at least can desirably form a solid solution. Thus, the heat resistance of $TiO_2$ is improved so that the high sulfur-poisoning resistance can be exhibited even after a high temperature durability test.

For example, when the surface of the agglomerated particles involves $Al_2O_3$ in a large amount, it is possible to stably load the catalytic ingredient so that the durability of the present catalyst can be upgraded. In this case, in the surface of the agglomerated particles, an $Al_2O_3$ amount can preferably fall in a range of from 60 to 90 mol % with respect to a total $Al_2O_3$ amount. When the $Al_2O_3$ amount in the surface deviates from this range, it is difficult to exhibit the aforementioned advantage.

When the surface of the agglomerated particles involve a $ZrO_2$—$TiO_2$ solid solution in a large amount, $SO_x$ are less likely to deposit on the present composite oxide so that the sulfur-poisoning resistance of the present catalyst can be enhanced remarkably. In this case, in the surface of the agglomerated particles, an amount of the $ZrO_2$—$TiO_2$ solid solution can desirably fall in a range of from 60 to 90 mol % with respect to a total amount of the $ZrO_2$—$TiO_2$ solid solution. When the amount of the $ZrO_2$—$TiO_2$ solid solution deviates from this range in the surface, it is difficult to exhibit the aforementioned advantage.

In the present composite oxide or the present catalyst, the agglomerated can further involve a rare-earth element oxide, and the rare-earth element oxide can desirably solve in $Al_2O_3$ in an amount of 70 mol % or more with respect to a total amount of the rare-earth element oxide. Thus, the durability of the $Al_2O_3$ can be improved, and at the same time the sulfur-poisoning resistance of the $ZrO_2$—$TiO_2$ solid solution can be inhibited from decreasing. The decrement is caused by the rare-earth element, which solves in the $ZrO_2$—$TiO_2$ solid solution. The rare-earth element oxide can furthermore desirably be solved in $Al_2O_3$ in an amount of 90 mol % or more with respect to a total amount of the rare-earth element oxide. As for the rare-earth element oxide, it is possible to exemplify the oxides of La, Nd, Sm, Pr, etc. Among them, however, $La_2O_3$ can be the most preferable option.

When the present catalyst is prepared by using the present composite oxide whose agglomerated particles include $Al_2O_3$, in which $La_2O_3$ is solved in an amount of 70 mol % or more with respect to a total amount of $La_2O_3$, and in which a $ZrO_2$—$TiO_2$ solid solution is present more in the surface of the agglomerated particles, it has a high sulfur-poisoning resistance, and at the same time can be upgraded remarkably in terms of the heat resistance. Hence, the present catalyst can exhibit high activities even after it is subjected to a durability test, which is carried out in an atmosphere containing $SO_x$ at an elevated temperature. In this case, in the surface of the agglomerated particles, an amount of the $ZrO_2$—$TiO_2$ solid solution can desirably fall in a range of from 60 to 90 mol % with respect to a total amount of the $ZrO_2$—$TiO_2$ solid solution. When the amount of the $ZrO_2$—$TiO_2$ solid solution deviates from this range in the surface, it is difficult to exhibit the aforementioned advantage.

In the present composite oxide or the present catalyst, when the plurality of metallic elements are Al and Ce, for instance, since $Al_2O_3$ and $CeO_2$ are present as fine particles having an average diameter of 50 nm or less, respectively, in the agglomerated particles, the sintering is inhibited by intervening different kinds of oxides so that the heat resistance is enhanced. Accordingly, the present composite oxide or the present catalyst for purifying an exhaust gas has a specific surface area of 40 $m^2/g$ or more after it is subjected to a durability test, which is carried out in air at 800° C. for 5 hours. Moreover, since $CeO_2$ is inhibited from growing granularly, it is possible to control the granular growth of the catalytic ingredient (e.g., Pt, especially) in an atmosphere fluctuating from a fuel-rich side to a fuel-lean side.

For example, when the surface of the agglomerated particles involves $Al_2O_3$ in a large amount, the surface concentration of $CeO_2$ decreases so that the degradation of Rh can be suppressed in a case where Rh is loaded on the surface of the agglomerated particles. In this case, in the surface of the agglomerated particles, an $Al_2O_3$ amount can desirably fall in a range of from 60 to 90 mol % with respect to a total $Al_2O_3$ amount. When the $Al_2O_3$ amount in the surface deviates from this range, it is difficult to exhibit the aforementioned advantage.

When the surface of the agglomerated particles involves $CeO_2$ in a large amount, the active oxygen species increase on the support surface so that it is possible to early activate the present catalyst. In this case, in the surface of the agglomerated particles, a $CeO_2$ amount can desirably fall in a range of from 60 to 90 mol % with respect to a total $CeO_2$ amount. When the $CeO_2$ amount in the surface deviates from this range, it is difficult to exhibit the aforementioned advantage.

In the present composite oxide or the present catalyst, the agglomerated particles can further involve a rare-earth element oxide, and the rare-earth element oxide can desirably be solved in $Al_2O_3$ in an amount of 70 mol % or more with respect to a total amount of the rare-earth element oxide. With this arrangement, the heat resistance of $Al_2O_3$ can be upgraded. The rare-earth element oxide can further desirably be solved in $Al_2O_3$ in an amount of 90 mol % or more with respect to a total amount of the rare-earth element oxide. As for the rare-earth element oxide, it is possible to exemplify the oxides of La, Nd, Sm, Pr, etc. Among them, however, $La_2O_3$ can be the most preferable option.

When $La_2O_3$ is solved in $Al_2O_3$ in an amount of 70 mol % or more with respect to a total amount of $La_2O_3$, and when a catalyst is prepared from the agglomerated particles in which $Al_2O_3$ with $La_2O_3$ solved therein is present more in the surface, the heat resistance of $Al_2O_3$ is enhanced remarkably, and $Al_2O_3$ with $La_2O_3$ solved therein exists stably as intervening substances between the $CeO_2$ fine particles. Accordingly, since the specific surface area of $CeO_2$ is kept high even after a high temperature durability test, it is possible to markedly suppress the granular growth of the catalytic ingredient. Thus, the durability of the present catalyst can be improved. In this case, in the surface of the agglomerated particles, an amount of $Al_2O_3$ with $La_2O_3$ solved therein can preferably fall in a range of from 60 to 90 mol % with respect to a total amount of $Al_2O_3$ with $La_2O_3$ solved therein. When the amount of $Al_2O_3$ with $La_2O_3$ solved therein deviates from this range in the surface, it is difficult to exhibit the aforementioned advantage.

In the present composite oxide or the present catalyst, for instance, it is preferred that the plurality of metallic elements can be Al, Ce, Zr and Y, that a solving ratio of $Y_2O_3$ in $CeO_2$ can be 10 mol % or less with respect to a total amount of $Y_2O_3$, and that a solving ratio of $Y_2O_3$ in $ZrO_2$ can be 90 mol % or more with respect to a total amount of $Y_2O_3$. In this case, since $CeO_2$—$Al_2O_3$ composite oxide fine particles and $ZrO_2$—$Y_2O_3$ solid solution fine particles coexist in a state of fine particles, the granular growth of the catalytic ingredient (e.g., Pt, especially) is inhibited even after a fuel-lean ordinary durability test. Thus, it is possible to make a catalyst which exhibits high activities.

In the present composite oxide or the present catalyst, since the metallic oxides or solid solutions, which are composed of $Al_2O_3$, $CeO_2$, $ZrO_2$ and $Y_2O_3$ and which have an average diameter of 50 nm or less respectively, are dispersed as fine particles in the agglomerated particles, which have an average particle diameter of 20 $\mu$m or less, the sintering is inhibited by intervening the different kinds of oxides. Thus, the durability is enhanced. Accordingly, the present composite oxide (or catalyst) has a specific surface area of 50 $m^2/g$ even after it is subjected to a durability test, which is carried out in air at 800° C. for 5 hours. Thus, the catalytic ingredient can be loaded in a much more highly dispersed manner, the granular growth of the catalytic ingredient can be furthermore suppressed, and at the same time the low temperature ignitability of HC can be upgraded markedly.

In the present composite oxide or the present catalyst, when the surface of the agglomerated particles involves, for instance, Al and Ce in a large amount, the activities are improved in a stoichiometric atmosphere. In this case, in the surface of the agglomerated particles, an $Al_2O_3$ amount and a $CeO_2$ amount can desirably fall in a range of from 60 to 90 mol s with respect to a total $Al_2O_3$ amount and a total $CeO_2$ amount, respectively. When the $Al_2O_3$ amount and the $CeO_2$ amount in the surface deviate from this range, it is difficult to exhibit the aforementioned advantage. While, when the surface of the agglomerated particles involves Zr and Y in a large amount, the activities are enhanced in a fuel-lean ordinary period. In this case, in the surface of the agglomerated particles, a $ZrO_2$ amount and a $Y_2O_3$ amount can desirably fall in a range of from 60 to 90 mol % with respect to a total $ZrO_2$ amount and a total $Y_2O_3$ amount, respectively. When the $ZrO_2$ amount and the $Y_2O_3$ amount in the surface deviate from this range, it is difficult to exhibit the aforementioned advantage.

In the present composite oxide or the present catalyst, the agglomerated particles can further involve an oxide of rare-earth elements, excepting Y, and the rare-earth element oxide can desirably be solved in $Al_2O_3$ in an amount of 70 mol % or more with respect to a total amount of the rare-earth element oxide. With this arrangement, the heat resistance of $Al_2O_3$ can be upgraded. The rare-earth element oxide can further desirably be solved in $Al_2O_3$ in an amount of 90 mol % or more with respect to a total amount of the rare-earth element oxide. As for the rare-earth element oxide, it is possible to exemplify the oxides of La, Nd, Sm, Pr, etc. Among them, however, $La_2O_3$ can be the most preferable option.

When $La_2O_3$ is solved in $Al_2O_3$ in an amount of 70 mol % or more with respect to a total amount of $La_2O_3$, the heat resistance of $Al_2O_3$ is enhanced remarkably, and $Al_2O_3$ with $La_2O_3$ solved therein exists stably as intervening substances between $CeO_2$ particles. Accordingly, since the specific surface area of $CeO_2$ is kept high even after a high temperature durability test, it is possible to furthermore suppress the granular growth of the catalytic ingredient. Thus, high activities can be maintained.

In another present composite oxide or present catalyst comprising agglomerated particles, which are composed of first oxide-phase fine particles having an average diameter of 50 nm or less and second oxide-phase particles being different from the first oxide-phase fine particles and having an average diameter of 50 nm or less, and which have an average particle diameter of 20 $\mu$m or less. The first fine particles, being composed of the first oxide phase and formed as a crystal having an aspect ratio of 30 or less, and are dispersed together with the second fine particles, being composed of the second oxide phase, in a highly dispersed manner so as to constitute the agglomerated particles. The present composite oxide or the present catalyst has such a characteristic that the crystalline diameters of the respective oxides are 10 nm or less after it is calcined in air at 700° C. for 5 hours. Thus, the present composite oxide or the present catalyst is inordinately good in terms of the heat resistance. Hereinafter, the first oxide phase is referred to as the phase "A", and the second oxide phase is referred to as the phase "B".

In the present composite oxide or the present catalyst, the phase "A" fine particles are present stably as crystals, having an aspect ratio of 30 or less, in the agglomerated particles, and intervene between the phase "B" fine particles. Consequently, the granular growths of the mutual phases are inhibited. Since the phase "A" fine particles are present stably as crystals, the stability is enhanced in the surfaces of the agglomerated particles. Hence, the present catalyst, in which the present composite oxide is used as a support, is improved in terms of the heat resistance as well as the sulfur-poisoning resistance. When the aspect ratio of the phase "A" fine particles exceeds 30, the stability of the phase "A" fine particles as crystals lowers. The lower limit of the aspect ratio is not limited in particular. The aspect ratio can preferably be 20 or less, and can further preferably be 10 or less.

The phase "A" and the phase "B" can preferably present in a ratio of phase "A": phase "B"=from 1:0.1 to 1:4 by total molar ratio of the metallic elements included in the respective phases. When the amounts of the phase "A" and the phase "B" deviate from this range, it is difficult to control the granular growth, and the stability tends to decrease as well.

It is preferable to constitute the agglomerated particles so that they include the phase "A" fine particles having an average diameter of 100 nm or less and the phase "B" fine particles having an average diameter of 30 nm or less, that the fine particles, being composed of the phase "A", have pores, having a pore diameter of from 5 to 20 nm and 50% or more of all the pores falling in a range of ±2 nm of the median pore diameter, between the fine particles, and that major portion of the fine particles, being composed of the phase "B", are dispersed in the pores. In such a composite oxide, since at least two fine particles, which differ with each other in the average particle and the phase, are dispersed in the agglomerated particles, the grain growths of the fine particles, which are composed of the respective phases, are suppressed. Moreover, since the phase "A" has the pores whose pore diameters are controlled, the specific surface area is inhibited from decreasing, and the solid phase reactions are suppressed between the phase "A" and the other phases. Hence, the present catalyst, employing the present composite oxide, is extremely good in terms of the heat resistance.

The present composite oxide or the present catalyst can further include fine particles, which are composed of a third oxide phase (i.e., phase "C") differing from the phase "A" and phase "B". It is preferred that the fine particles, being composed of the phase "C", can be dispersed in the pores of the phase "A".

The phase "A", the phase "B" or the phase "C" can preferably be a composite oxide or a solid solution, which is composed of at least two metals selected from the group consisting of Al, Ce, Zr, Si, Ti, Mg, La and Pr. For instance, when the phase "A" is an $Al_2O_3$ crystalline phase and the phase "B" is a $ZrO_2$—$TiO_2$ solid solution phase, the catalytic ingredient, being loaded on the phase "A", is stabilized so that the heat resistance is upgraded. Moreover, the sulfur-poisoning resistance is exhibited by the phase "B".

In the present composite oxide or the present catalyst, when the average diameter of the fine particles, being composed of the phase "B", exceeds 30 nm, the specific surface area lowers, and at the same time the dispersibility of the catalytic ingredient diminishes. Accordingly, such fine particles are not preferable, because the activities of the resulting catalyst degrade. While, when the average diameter of the fine particles, being composed of the phase "A", exceeds 100 nm, the volumes of the pores whose pore diameters are 100 nm or less are reduced so that the dispersibility of the catalytic ingredient diminishes to degrade the activities of the resulting catalyst.

When the pore diameter the pores of the fine particles, being composed of the phase "A", is less than 5 nm, the pores are likely to be enclosed. When it is more than 20 nm, it is not preferable, because the granular growth of the fine particles enlarges to diminish the specific surface area. When the pore-diameter distribution of the pores of the fine particles, being composed of the phase "A", broadens, there arises a drawback in that the loading efficiency of the catalytic ingredient reduces. Consequently, the pore-diameter distribution can desirably fall in a range of from 5 nm or more to 20 nm or less, can further desirably fall in a range of from 7 nm or more to 15 nm or less.

Also, in the present composite oxide or the present catalyst, the agglomerated particles can further involve a rare-earth element oxide, and the rare-earth element oxide can preferably be solved in $Al_2O_3$ in an amount of 70 mol % or more with respect to a total amount of the rare-earth element oxide. With this arrangement, the heat resistance of $Al_2O_3$ can be upgraded, and the decrement of the sulfur-poisoning resistance, which is caused, for example, by the solving of the rare-earth element oxide in a $ZrO_2$—$TiO_2$ solid solution, is inhibited. The rare-earth element oxide can further preferably be solved in $Al_2O_3$ in an amount of 90 mol % or more with respect to the total amount of the rare-earth element oxide. As for the rare-earth element oxide, it is possible to exemplify the oxides of La, Nd, Sm, Pr, etc. Among them, however, $La_2O_3$ can be the most preferable option.

For instance, when $La_2O_3$ is solved in $Al_2O_3$ in an amount of 70 mol % or more with respect to a total amount of $La_2O_3$, and when a catalyst is prepared from a support, which includes a $ZrO_2$—$TiO_2$ solid solution phase, the present catalyst has a high sulfur-poisoning resistance, and is simultaneously upgraded in terms of the durability remarkably. Therefore, such a catalyst exhibits markedly high activities even after it is subjected to a high temperature durability test, which is carried out in an atmosphere containing $SO_x$.

In another aspect of the present invention, the present catalyst for producing an exhaust gas can comprise: a support substrate; a first catalytic layer being formed on a surface of the support substrate, and being composed of a first support including the phase "A", and a catalytic ingredient being loaded on the first support; and a second catalytic layer being formed on a surface of the first catalytic layer, and being composed of a second support including the phase "B", and a catalytic ingredient being loaded on the second support; at least one of the first support and the second support including agglomerated particles having an average particle diameter of 20 μm or less, in which a plurality of metallic element oxides being in form of fine particles and having an average particle diameter of 50 nm or less are dispersed, the agglomerated particles having a surface and an inner portion whose metallic element distributions differ with each other.

The thickness of the first catalytic layer and second catalytic layer is not limited in particular. It is desirable, however, that both of the first catalytic layer and second catalytic layer have a thickness, which falls in a range of from 50 to 500 μm. When the thickness is less than the lower limit of the range, the durability of the resulting catalyst lowers because the catalytic ingredient is loaded with a high density. When the thickness is thicker than the upper limit of the range, there arises a drawback in that the exhaust gas is inhibited from diffusing into the catalytic layer and the first or second catalytic layer is come off by the vibrations in the service.

When the average diameter of the fine particles exceeds 50 nm, the specific surface areas of the oxides reduce so that the purifying activities degrades. The lower limit of the average diameter of the fine particles are not limited in particular. In accordance with the present production processes, however, the average diameter usually becomes 5 nm or more. Note that the average diameter of the fine particles can desirably be 30 nm or less, and that it can further desirably be 20 nm or less.

It is necessary that the average particle diameter of the agglomerated particles be 20 μm or less. When the average particle diameter of the agglomerated particles exceeds 20 μm, there might arise a case where the activities decrease and at the same time the strength of the support layer lowers. The lower limit of the average particle diameter of the agglomerated particles is not limited in particular. In accordance with the present production processes, however, the average particle diameter usually becomes 1 μm or more. Note that the average particle diameter of the agglomerated particles can desirably be 15 μm or less, and that it can further desirably be 8 μm or less.

The agglomerated particles can be included in either one of the first support and the second support. Due to the reasons that the characteristics are effectively exhibited mainly when Pt is loaded, and that Pt is likely to undergo the granular growth in a high temperature oxidizing atmosphere, it is preferred that the agglomerated particles can be included in the first support of the lower layer to form the first catalytic layer whose temperature is less likely to increase than that of the second catalytic layer. In this case, it is possible to use a variety of metallic oxides as the second support. For instance, when Rh is used as the catalytic ingredient, the metallic oxide can be θ-$Al_2O_3$, which is advantageous in view of the low solidphase reactivity between Rh and the resulting support. It is also desirable to use hollow $Al_2O_3$ as the metallic oxide. When hollow $Al_2O_3$ is used as the second support to constitute the second catalytic layer, the gas is not inhibited from diffusing into the first catalytic layer, being the lower layer, so that the initial activities can be improved. Moreover, the durability can be furthermore enhanced.

The hollow $Al_2O_3$ herein means hollow $Al_2O_3$ particles, which contain lanthanum in an amount of from 0.01 to 0.08 mol with respect to 1 mol of aluminum, whose primary particle diameter is 200 nm or more, whose specific surface area is 20 $m^2/g$ or more, and whose shell thickness is 100 nm or less. The hollow $Al_2O_3$ particles can be produced in the following manner. An aqueous solution is prepared in which a water-soluble aluminum compound and a water-soluble lanthanum compound are dissolved so that lanthanum is contained in an amount of from 0.01 to 0.08 mol with respect to 1 mol of aluminum. The aqueous solution is mixed with an organic solvent and a dispersing agent to form a W/O type emulsion. The W/O type emulsion is sprayed and burned to produce the hollow $Al_2O_3$ particles.

Note that the catalytic ingredient, which is to be loaded on the first oxide support and the second oxide support, can be the same species or different species with each other.

For example, when a catalyst is made by using a composite oxide, which includes agglomerated particles, being composed of $Al_2O_3$, $CeO_2$ and $ZrO_2$, and in which a $CeO_2$—$ZrO_2$ solid solution is present more in the surface than in the inner portion, as the first catalytic layer (i.e., the lower layer) of the support layer, it is possible to carry out relieving the atmosphere fluctuation over a wider range of from the proximity of the lower layer surface to the upper layer than the conventional two-layered coating catalysts. Thus, it possible to upgrade not only the activities of the lower layer but also those of the upper layer. In this case, in the surface of the agglomerated particles, an amount of the $CeO_2$—$ZrO_2$ solid solution can preferably fall in a range of from 60 to 90 mol % with respect to a total amount of the $CeO_2$—$ZrO_2$ solid solution in the agglomerated particles. When the amount of the $CeO_2$—$ZrO_2$ solid solution in the surface deviates from this range, it is difficult to exhibit the aforementioned advantage.

When a catalytic ingredient, which is less likely to react with the first support and the second support, is loaded in the lower layer and upper layer, respectively, it is possible to inhibit the deterioration of the activities, which is caused by the solid phase reactions between the catalytic ingredient and the first and second supports.

When a catalyst is made by using a composite oxide, which includes agglomerated particles, being composed of $Al_2O_3$, $CeO_2$ and $ZrO_2$, and in which $Al_2O_3$ is present more in the surface than in the inner portion, as the second catalytic layer (i.e., the upper layer) of the support layer, it is possible to control the degradation of the activities even if Rh, which is likely to lose the activities by the solid phase reaction with $CeO_2$, is loaded therein. In addition, since it is possible, adjacent to the outermost surface of the catalyst, to relieve the atmosphere fluctuation by the oxygen storage-and-relive activity. Accordingly, it is possible to light off the catalyst earlier. In this case, in the surface of the agglomerated particles, an $Al_2O_3$ amount can desirably fall in a range of from 60 to 90 mol % with respect to a total $Al_2O_3$ amount in the agglomerated particles. When the $Al_2O_3$ amount in the surface deviates from this range, it is difficult to exhibit the aforementioned advantage.

When a catalyst is made by using a composite oxide, which includes agglomerated particles, being composed of $Al_2O_3$, $ZrO_2$ and $TiO_2$, and in which $Al_2O_3$ is present more in the surface than in the inner portion, as the first catalytic layer (i.e., the lower layer) of the support layer, it is possible to furthermore stabilize the catalytic ingredient loaded in the lower layer. Thus, even if the second catalytic layer exists in the upper layer, it is possible to activate the lower-layer side catalytic ingredient from a low temperature range. In this case, in the surface of the agglomerated particles, an $Al_2O_3$ amount can desirably fall in a range of from 60 to 90 mol % with respect to a total $Al_2O_3$ amount in the agglomerated particles. When the $Al_2O_3$ amount in the surface deviates from this range, it is difficult to exhibit the aforementioned advantage.

When a catalyst is made by using a composite oxide, which includes agglomerated particles, being composed of $Al_2O_3$, $ZrO_2$ and $TiO_2$, and in which a $ZrO_2$—$TiO_2$ solid solution is present more in the surface than in the inner portion, as the second catalytic layer (i.e., the upper layer) of the support layer, it is possible to inhibit $SO_x$ from adhering onto the catalytic ingredient. Thus, it is possible to enhance the sulfur-poisoning resistance. In this case, in the surface of the agglomerated particles, an amount of the $ZrO_2$—$TiO_2$ solid solution can desirably fall in a range of from 60 to 90 mol % with respect to a total amount of the $ZrO_2$—$TiO_2$ solid solution in the agglomerated particles. When the amount of the $ZrO_2$—$TiO_2$ solid solution in the surface deviates from this range, it is difficult to exhibit the aforementioned advantage.

When a catalyst is made by using a composite oxide, which includes agglomerated particles, being composed of $Al_2O_3$ and $CeO_2$, and in which $CeO_2$ is present more in the surface than in the inner portion, as the first catalytic layer (i.e., the lower layer) of the support layer, it is possible to release active oxygen form a much deeper portion of the support layer. Thus, it is possible to earlier exhibit the purifying abilities of the lower-layer side, in which the catalytic ingredient is less likely to activate because the gas arrives therein later compared with the upper layer. In this case, in the surface of the agglomerated particles, a $CeO_2$ amount can desirably fall in a range of from 60 to 90 mol % with respect to a total $CeO_2$ amount of in the agglomerated particles. When the amount of $CeO_2$ in the surface deviates from this range, it is difficult to exhibit the aforementioned advantage.

When a catalyst is made by using a composite oxide, which includes agglomerated particles, being composed of $Al_2O_3$ and $CeO_2$, and in which $Al_2O_3$ is present more in the surface than in the inner portion, as the second catalytic layer (i.e., the upper layer) of the support layer, the heat resistance of $CeO_2$ on the upper side, which is subjected to a severer heat history compared with the lower layer, enhanced. Thus, it is possible to inhibit the catalytic ingredient of the upper layer from degrading. In this case, in the surface of the agglomerated particles, an $Al_2O_3$ amount can desirably fall in a range of from 60 to 90 mol % with respect to a total $Al_2O_3$ amount in the agglomerated particles. When the $Al_2O_3$ amount in the surface deviates from this range, it is difficult to exhibit the aforementioned advantage.

When a catalyst is made by using a composite oxide, in which a solving rate of $Y_2O_3$ in $CeO_2$ is 10 mol % or less with respect to a total $Y_2O_3$ amount, in which a solving ratio of $Y_2O_3$ in $ZrO_2$ is 90 mol % or more with respect to a total $Y_2O_3$ amount, and in which $Al_2O_3$ and $CeO_2$ are present more in the surface than in the inner portion, as the first catalytic layer (i.e., the lower layer) of the support layer, it is possible to raise the emission efficiency of oxygen from the lower layer at around the stoichiometric point. Thus, the low temperature activities of the catalyst are upgraded. In this case, in the surface of the agglomerated particles, a $CeO_2$ amount and an $Al_2O_3$ amount can desirably fall in a range of from 60 to 90 mol % with respect to a total $CeO_2$ amount and a total $Al_2O_3$ amount in the agglomerated particles, respectively. When the $CeO_2$ amount and $Al_2O_3$ amount in the surface deviate from this range, it is difficult to exhibit the aforementioned advantage.

When a catalyst is made by using a composite oxide, in which $ZrO_2$ and $Y_2O_3$ are present more in the surface than in the inner portion, as the first layer (i.e., the lower layer) of the support layer, it is possible to control the deterioration of the catalytic ingredient in a fuel-lean atmosphere. In this case, in the surface of the agglomerated particles, a $ZrO_2$ amount and a $Y_2O_3$ amount can desirably fall in a range of from 60 to 90 mol % with respect to a total $ZrO_2$ amount and a total $Y_2O_3$ amount in the agglomerated particles, respectively. When the $ZrO_2$ amount and $Y_2O_3$ amount in the surface deviate from this range, it is difficult to exhibit the aforementioned advantage.

When a catalyst is made by using a composite oxide, in which a solving rate of $Y_2O_3$ in $CeO_2$ is 10 mol % or less with respect to a total $Y_2O_3$ amount, in which a solving ratio of $Y_2O_3$ in $ZrO_2$ is 90 mol % or more with respect to a total $Y_2O_3$ amount, and in which $ZrO_2$ and $Y_2O_3$ are present more in the surface than in the inner portion, as the second catalytic layer (i.e., the upper layer) of the support layer, it is possible to inhibit the granular growth of the catalytic ingredient in the upper layer, which is exposed to a larger magnitude of the atmosphere fluctuation compared with the lower layer, and which contacts with an intense fuel-lean exhaust gas. Thus, it is possible to keep the catalytic ingredient from losing the activities. In this case, in the surface of the a glomerated particles, a $ZrO_2$ amount and a $Y_2O_3$ amount can desirably fall in a range of from 60 to 90 mol % with respect to a total $ZrO_2$ amount and a total $Y_2O_3$ amount in the agglomerated particles, respectively. When the $ZrO_2$ amount and $Y_2O_3$ in the surface deviate from this range, it is difficult to exhibit the aforementioned advantage.

Note that, when the solving rate of $Y_2O_3$ in $CeO_2$ exceeds 10 mol % with respect to the total $Y_2O_3$ amount, there arise a drawback in that the stability of the catalytic ingredient loaded on $ZrO_2$ decreases. Also note that, when the solving rate of $Y_2O_3$ in $ZrO_2$ is less than 90 mol % with respect to the total $Y_2O_3$ amount, there arises a drawback in that the thermal stability of $ZrO_2$ diminishes.

In a still further catalyst for purifying an exhaust gas according to the present invention, a novel support is used as a loading layer. The loading layer includes agglomerated particles and zeolite particles. The agglomerated particles include a plurality of metallic element oxides, which are formed and dispersed as fine particles having an average diameter of 50 nm or less, have a surface and an inner portion whose metallic element distributions differ with each other, and have an average particle diameter of 20 μm or less. Since the agglomerated particles are formed by agglomerating the fine particles, which have an average diameter of 50 nm or less, the granular growths of the respective fine particles are suppressed as described above. Moreover, the stability of the surface is enhanced. Consequently, the catalyst, in which the agglomerated particles are used to make a support, is improved in that the granular growth of the catalytic ingredient is inhibited in an elevated temperature atmosphere, and in that it exhibits a high heat resistance.

When the average diameter of the fine particles exceeds 50 nm, the specific surface areas of the oxides reduce, and at the same time the dispersibility of the catalytic ingredient lowers. As a result, the purifying activities diminish. The lower limit of the average diameter of the fine particles is not limited in particular. In accordance with the present production processes, however, the average particle usually becomes 5 nm or more. Note that the average diameter of the primary particles can desirably be 30 nm or less, and that it can further desirably be 20 nm or less.

It is necessary that the average particle diameter of the agglomerated particles be 20 $\mu$m or less. When the average particle diameter of the agglomerated particles exceeds 20 $\mu$m, there arises a case where the activities decrease and at the same time the strength of the support layer lowers. The lower limit of the average particle diameter of the agglomerated particles is not limited in particular. In accordance with the present production processes, however, the average particle diameter usually becomes 1 $\mu$m or more. Note that the average particle diameter of the agglomerated particles can desirably be 15 $\mu$m or less, and that it can further desirably be 8 $\mu$m or less.

Since the support includes the agglomerated particles and the zeolite particles, HC are adsorbed and held onto the zeolite particles in a low temperature range where the catalyst ingredient does not reach the activation temperature. Then, when the temperature is increased, the HC are released from the zeolite particles so that they are oxidized and purified by the catalytic ingredient, which is fully activated. Thus, it is possible to control the emission of HC from a low temperature range. Moreover, since the catalytic ingredient is inhibited from the granular growth as described above, a high HC conversion is exhibited even after a high temperature durability test.

A mixing ratio of the agglomerated particles to the zeolite particles can desirably fall in a range of the agglomerated particles: the zeolite particles=from 1:1 to 1:5 by weight. When the amount of the zeolite particles is less than this range, the HC adsorption amount becomes insufficient. When the amount of the agglomerated particles is less than this range, it is not possible to fully exhibit the effect for stabilizing the catalytic ingredient.

It is desired that the agglomerated particles can further include an oxide, which is composed of at least one element selected from the group consisting of La, Nd, Mg and Ca. With the inclusion of such an oxide, the heat resistance can be furthermore enhanced.

The support layer can be formed as a two-layered construction, which includes a lower layer and an upper layer at least. The lower layer can include the zeolite particles. The upper layer can be formed on a surface of the lower layer, and can include the agglomerated particles. The agglomerated particles can be composed of a plurality of metallic element oxides, which are formed and dispersed as fine particles and which have an average diameter of 50 nm or less, can have a surface and an inner portion whose metallic element distributions differ with each other, and can have an average particle diameter of 20 $\mu$m or less.

By making such a two-layered construction, since HC, which are adsorbed in and are thereafter released from the inner layer, pass surely through the upper layer, the contacting probability between the catalytic ingredient and HC increases so that the conversion of HC is enhanced. Moreover, when a fine oxide, such as minute $CeO_2$ particles, etc., having an oxygen storage-and-release ability, is present in the upper layer, it is possible to carry out the atmosphere adjustment over a wide temperature range. Accordingly, since it is possible to release and purify with an appropriate timing for oxidizing HC, the low temperature activity can be furthermore improved.

In this case, it is desired that the thickness of the upper layer can be from 10 to 500 $\mu$m. When the thickness of the upper layer is thickened more than the upper limit of this range, HC are inhibited from reaching the lower layer so that the HC adsorption amount reduces. When it is thinned less than the lower limit of this range, the catalytic ingredient is loaded in the support layer with a high density so that the catalytic ingredient is likely to grow granularly. It is desired that the thickness of the lower layer can be from 100 to 500 $\mu$m. When the thickness of the lower layer is thinner than the lower limit of this range, the HC adsorption amount decreases. When it is thicker than the upper limit of this range, there arises a drawback in that the lower layer is likely to come off, etc., in the service.

In the present catalyst with such a support layer, which is composed of the lower layer and the upper layer, it is preferred that different kinds of catalytic ingredients are loaded in the lower layer and the upper layer, respectively. With such an arrangement, it is possible to suppress the solid phase reaction between the catalytic ingredients so that the activities can be furthermore inhibited from decreasing.

As for a support substrate in the present catalyst for purifying an exhaust gas, a support substrate can be used which is made from cordierite, metals, or the like. The configuration of the support substrate can be a pellet shape, a honeycomb shape, or the like.

As for a catalytic ingredient, it is possible to use at least one member selected from the group consisting of Pt, Pd, Rh, Ir, Ru, Ni, Co, Cu and Au. Depending on the characteristics of a variety of the composite oxides, it is possible to distinctively use the resulting present catalysts for a lean-burned exhaust gas, for a stoichiometrically-burned exhaust gas, for a fluctuating-atmosphere exhaust gas, a low temperature exhaust gas, a high temperature exhaust gas, and so on. The loading amount can be from 0.1 to 20 g with respect to 1 liter of the present catalyst. When the loading amount of the catalyst ingredient is less than the lower limit of this range, the activities are low. When it is loaded more than the upper limit of this range, the activities saturate and the cost goes up.

In the present composite oxide or the present catalyst, when at least two kinds of the metallic oxide phases are defined as set forth above so that they are referred to as the phase "A" and the phase "B", and when a rare-earth element oxide or an oxide, which is composed of at least one member selected from the group consisting of Mg and Ca, is referred to as the phase "C", the ratio of the phase "A" with respect to the phase "B" is not limited in particular. It is desired, however, that the ratio can be the phase "A": the phase "B"=from 0.05:1 to 1:1 by molar ratio of the oxides. Moreover, it is desired that the ratio of the phase "A" with respect to the phase "C" can preferably be the phase "A" with respect to the phase "C"=from 1:0.005 to 1:0.05 by molar ratio of the oxides. When the phase "C" is included less than this range, the heat resistance lowers. When the phase "C" is included more than this range, the phase "A"

or the phase "B" is reduced relatively so that the activities come to degrade.

In addition, it is preferred that the forming amount of the support layer can fall in a range of from 50 to 500 g with respect to 1 liter of the support substrate. When the forming amounts of the respective layers are formed less than the lower limit of this range, it is difficult to exhibit the characteristics. When the respective layers are formed more than the upper limit of this range, there arises a drawback in that the support layer is likely to come off, etc., in the service. In the case of the present catalyst, which has a two-layered coating layer, the sum of the two layers can preferably fall in the aforementioned range.

In the present process for producing the above-described present composite oxides, a plurality of aqueous solutions of metallic acid salts are prepared; and a plurality of the aqueous solutions are added successively to an alkaline aqueous solution, which can neutralize the total amount of the metallic acid salts, thereby generating precipitates. This process will be hereinafter referred to as a "successive co-precipitation process". In accordance with the successive co-precipitation process, the acid salt of the aqueous solution, which is added in advance, is first neutralized to precipitate as a metallic hydroxide. Then, when the aqueous solutions, which are added thereafter, are neutralized, the resulting new hydroxides are precipitated preferentially onto the surfaces of the precipitates, which have been produced already and serve as the nuclei, and are deposited thereon. Alternatively, they can be precipitated as intervening substances in the grain boundaries, and are deposited therein. The present composite oxides can be produced by calcining the resulting precipitates.

In lieu of the above-described present production process, it is possible to produce the present composite oxides in the following manner. A plurality of aqueous solutions of metallic acid salts are prepared. The respective aqueous solutions of the metallic acid salts are mixed with an alkaline aqueous solution, thereby forming precipitates, respectively. The respective precipitates are mixed, thereby forming a precipitates mixture. The precipitates mixture is then calcined to produce the present composite oxides.

The present composite oxides, which are produced by the above-described production processes, comprise the agglomerated particles, in which a plurality of metallic element oxides, being formed as fine particles having an average diameter of 50 nm or less, are agglomerated, which have an average particle diameter of 20 $\mu$m or less, and whose surface and inner portion have different metallic element distributions with each other.

The specific examples of the precipitates productions and the desirable compositions of the precipitates in the present production processes will be exemplified as set forth below. The preferred composition ratios are all specified by molar ratio. Note that, in the following respective examples, carrying out the productions of the precipitates successively in the orders set forth below corresponds to carrying out the former successive co-precipitation production process, and mixing the resulting precipitates after carrying out the productions of the precipitates independently of each other corresponds to carrying out the later production process.

(1) First Precipitates including Al, Ce and Zr are generated from an aqueous solution including Al, Ce and Zr. Then, second precipitates including Al are generated from an aqueous solution including Al.

In the first precipitates, Al:Ce+Zr can preferably fall in a range of from 0.1:1 to 19:1, and Ce Zr can preferably fall in a range of from 0.95:0.05 to 0.2:0.8. Al:Ce+Zr can further preferably fall in a range of from 1:1 to 10:1, and Ce Zr can further preferably fall in a range of from 0.75:0.25 to 0.35:0.65. Moreover, when the ratio of the first precipitates with respect to the second precipitates is specified by total amounts of the metallic elements, the first precipitates: the second precipitates can preferably fall in a range of from 6:1 to 1:17, and can further preferably fall in a range of from 3.5:1 to 1:9.

(2) First Precipitates including Al are generated from an aqueous solution including Al. Then, second precipitates including Al, Ce and Zr are generated from an aqueous solution including Al, Ce and Zr.

In the second precipitates, Al:Ce+Zr can preferably fall in a range of from 0.1:1 to 19:1, and Ce:Zr can preferably fall in a range of from 0.95:0.05 to 0.2:0.8. Al:Ce+Zr can further preferably fall in a range of from 1:1 to 10:1, and Ce:Zr can further preferably fall in a range of from 0.75:0.25 to 0.35:0.65. Moreover, when the ratio of the first precipitates to the second precipitates are specified by total amounts of the metallic elements, the first precipitates: the second precipitates can preferably fall in a range of from 6:1 to 1:17, and can further preferably fall in a range of from 3.5:1 to 1:9.

(3) First Precipitates including Al are generated from an aqueous solution including Al. Then, second precipitates including Ce and Zr are generated from an aqueous solution including Ce and Zr.

In the second precipitates, Ce:Zr can preferably fall in a range of from 0.95:0.05 to 0.2:0.8. Ce:Zr can further preferably fall in a range of from 0.75:0.25 to 0.35:0.65. Moreover, when the ratio of the first precipitates with respect to the second precipitates are specified by total amounts of the metallic elements, the first precipitates: the second precipitates can preferably fall in a range of from 1:20 to 4:4, and can further preferably fall in a range of from 1:9.4 to 3:1.

(4) First Precipitates including Ce and Zr are generated from an aqueous solution including Ce and Zr. Then, second precipitates including Al are generated from an aqueous solution including Al.

In the first precipitates, Ce:Zr can preferably fall in a range of from 0.95:0.05 to 0.2:0.8. Ce:Zr can further preferably fall in a range of from 0.75:0.25 to 0.35:0.65. Moreover, when the ratio of the first precipitates with respect to the second precipitates are specified by total amounts of the metallic elements, the first precipitates: the second precipitates can preferably fall in a range of from 1:20 to 4:4, and can further preferably fall in a range of from 1:9.4 to 3:1.

(5) First Precipitates including a rare-earth element and Al are generated from an aqueous solution including the rare-earth element and Al. Then, second precipitates including Ce and Zr are generated from an aqueous solution including Ce and Zr.

In addition to the conditions set forth in (3) above, in the first precipitates, Al: the rare-earth element can preferably fall in a range of from 1:0.005 to 1:0.1, can further preferably fall in a range of from 1:0.008 to 1:0.05.

(6) First Precipitates including Ce and Zr are generated from an aqueous solution including Ce and Zr. Then, second precipitates including a rare-earth element and Al are generated from an aqueous solution including the rare-earth element and Al.

In addition to the conditions set forth in (4) above, in the second precipitates, Al: the rare-earth element can preferably fall in a range of from 1:0.005 to 1:0.05, can further preferably fall in a range of from 1:0.008 to 1:0.05.

(7) First Precipitates including a rare-earth element and Al are generated from an aqueous solution including the rare-earth element and Al. Then, second precipitates including Al, Ce and Zr are generated from an aqueous solution including Al, Ce and Zr.

In addition to the conditions set forth in (2) above, in the first precipitates, Al: the rare-earth element can preferably fall in a range of from 1:0.005 to 1:0.1, can further preferably fall in a range of from 1:0.008 to 1:0.05.

(8) First Precipitates including Al, Ce and Zr are generated from an aqueous solution including Al, Ce and Zr. Then, second precipitates including a rare-earth element and Al are generated from an aqueous solution including the rare-earth element and Al.

In addition to the conditions set forth in (1) above, in the second precipitates, Al: the rare-earth element can preferably fall in a range of from 1:0.005 to 1:0.1, can further preferably fall in a range of from 1:0.008 to 1:0.05.

(9) First Precipitates including Al, Zr and Ti are generated from an aqueous solution including Al, Zr and Ti. Then, second precipitates including Al are generated from an aqueous solution including Al.

In the first precipitates, Al:Zr+Ti can preferably fall in a range of from 0.1:1 to 19:1, and Zr:Ti can preferably fall in a range of from 0.9:0.1 to 0.2:0.8. Al:Zr+Ti can further preferably fall in a range of from 1:1 to 10:1, and Zr:Ti can further preferably fall in a range of from 0.75:0.25 to 0.35:0.65. Moreover, when the ratio of the first precipitates with respect to the second precipitates are specified by total amounts of the metallic elements, the first precipitates: the second precipitates can preferably fall in a range of from 6:1 to 1:17, and can further preferably fall in a range of from 3.5:1 to 1:9.

(10) First Precipitates including Al are generated from an aqueous solution including Al. Then, second precipitates including Al, Zr and Ti are generated from an aqueous solution including Al, Zr and Ti.

In the second precipitates, Al:Zr+Ti can preferably fall in a range of from 0.1:1 to 19:1, and Zr:Ti can preferably fall in a range of from 0.9:0.1 to 0.2:0.8. Al:Zr+Ti can further preferably fall in a range of from 1:1 to 10:1, and Zr:Ti can further preferably fall in a range of from 0.75:0.25 to 0.35:0.65. Moreover, when the ratio of the first precipitates with respect to the second precipitates are specified by total amounts of the metallic elements, the first precipitates: the second precipitates can preferably fall in a range of from 6:1 to 1:17, and can further preferably fall in a range of from 3.5:1 to 1:9.

(11) First Precipitates including Al, Zr and Ti are generated from an aqueous solution including Al, Zr and Ti. Then, second precipitates including a rare-earth element and Al are generated from an aqueous solution including the rare-earth element and Al.

In addition to the conditions set forth in (9) above, in the second precipitates, Al: the rare-earth element can preferably fall in a range of from 1:0.005 to 1:0.1, and can further preferably fall in a range of from 1:0.008 to 1:0.05.

(12) First Precipitates including a rare-earth element and Al are generated from an aqueous solution including the rare-earth element and Al. Then, second precipitates including Al, Zr and Ti are generated from an aqueous solution including Al, Zr and Ti.

In addition to the conditions set forth in (10) above, in the first precipitates, Al: the rare-earth element can preferably fall in a range of from 1:0.005 to 1:0.1, and can further preferably fall in a range of from 1:0.008 to 1:0.05.

(13) First Precipitates including Al are generated from an aqueous solution including Al. Then, second precipitates including Al and Ce are generated from an aqueous solution including Al and Ce.

In the second precipitates, Al:Ce can preferably fall in a range of from 1:0.5 to 1:10, and can further preferably fall in a range of from 1:1 to 1:5. Moreover, when the ratio of the first precipitates with respect to the second precipitates are specified by total amounts of the metallic elements, the first precipitates: the second precipitates can preferably fall in a range of from 1:5 to 9:1, and can further preferably fall in a range of from 1:2.5 to 5:1.

(14) First Precipitates including Al and Ce are generated from an aqueous solution including Al and Ce. Then, second precipitates including Al are generated from an aqueous solution including Al.

In the first precipitates, Al:Ce can preferably fall in a range of from 1:0.5 to 1:10, and can further preferably fall in a range of from 1:1 to 1:5. Moreover, when the ratio of the first precipitates with respect to the second precipitates are specified by total amounts of the metallic elements, the first precipitates: the second precipitates can preferably fall in a range of from 1:5 to 9:1, and can further preferably fall in a range of from 1:2.5 to 5:1.

(15) First Precipitates including a rare-earth element and Al are generated from an aqueous solution including the rare-earth element and Al. Then, second precipitates including Al and Ce are generated from an aqueous solution including Al and Ce.

In addition to the conditions set forth in (13) above, in the first precipitates, Al: the rare-earth element can preferably fall in a range of from 1:0.005 to 1:0.1, and can further preferably fall in a range of from 1:0.008 to 1:0.05.

(16) First Precipitates including Al and Ce are generated from an aqueous solution including Al and Ce. Then, second precipitates including a rare-earth element and Al are generated from an aqueous solution including the rare-earth element and Al.

In addition to the conditions set forth in (14) above, in the second precipitates, Al: the rare-earth element can preferably fall in a range of from 1:0.005 to 1:0.1, and can further preferably fall in a range of from 1:0.008 to 1:0.05.

(17) First Precipitates including Al and Ce are generated from an aqueous solution including Al and Ce. Then, second precipitates including Zr and Y are generated from an aqueous solution including Zr and Y.

In the first precipitates, Al:Ce can preferably fall in a range of from 1:0.5 to 1:10, and can further preferably fall in a range of from 1:1 to 1:5. In the second precipitates, Zr:Y can preferably fall in a range of from 0.8:0.2 to 0.2:0.8, and can further preferably fall in a range of from 0.7:0.3 to 0.3:0.7. Moreover, when the ratio of the first precipitates with respect to the second precipitates are specified by total amounts of the metallic elements, the first precipitates: the second precipitates can preferably fall in a range of from 1:0.5 to 1:4, and can further preferably fall in a range of from 1:1 to 1:2.

(18) First Precipitates including Zr and Y are generated from an aqueous solution including Zr and Y. Then, second precipitates including Al and Ce are generated from an aqueous solution including Al and Ce.

In the second precipitates, Al:Ce can preferably fall in a range of from 1:0.5 to 1:10, and can further preferably fall in a range of from 1:1 to 1:5. In the first precipitates, Zr:Y can preferably fall in a range of from 0.8:0.2 to 0.2:0.8, and can further preferably fall in a range of from 0.7:0.3 to 0.3:0.7. Moreover, when the ratio of the first precipitates with respect to the second precipitates are specified by total amounts of the metallic elements, the first precipitates: the second precipitates can preferably fall in a range of from 1:0.5 to 1:4, and can further preferably fall in a range of from 1:1 to 1:2.

(19) First Precipitates including Al and Ce are generated from an aqueous solution including Al and Ce. Then, second precipitates including Al, Zr and Y are generated from an aqueous solution including Al, Zr and Y.

In the first precipitates, Al:Ce can preferably fall in a range of from 1:0.5 to 1:10, and can further preferably fall in a range of from 1:1 to 1:5. In the second precipitates, Al:Zr+Y can preferably fall in a range of from 1:8 to 4:1, and can further preferably fall in a range of from 1:5 to 2:1. Also in the second precipitates, Zr:Y can preferably fall in a range of from 0.8:0.2 to 0.2:0.8, and can further preferably fall in a range of from 0.7:0.3 to 0.3:0.7. Moreover, when the ratio of the first precipitates with respect to the second precipitates are specified by total amounts of the metallic elements, the first precipitates the second precipitates can preferably fall in a range of from 1:0.6 to 1:4.2, and can further preferably fall in a range of from 1:1.2 to 1:2.2.

(20) First Precipitates including Al, Zr and Y are generated from an aqueous solution including Al, Zr and Y. Then, second precipitates including Al and Ce are generated from an aqueous solution including Al and Ce.

In the second precipitates, Al:Ce can preferably fall in a range of from 1:0.5 to 1:10, and can further preferably fall in a range of from 1:1 to 1:5. In the first precipitates, Al:Zr+Y can preferably fall in a range of from 1:8 to 4:1, and can further preferably fall in a range of from 1:5 to 2:1. Also in the first precipitates, Zr:Y can preferably fall in a range of from 0.8:0.2 to 0.2:0.8, and can further preferably fall in a range of from 0.7:0.3 to 0.3:0.7. Moreover, when the ratio of the first precipitates with respect to the second precipitates are specified by total amounts of the metallic elements, the first precipitates: the second precipitates can preferably fall in a range of from 1:0.6 to 1:4.2, and can further preferably fall in a range of from 1:1.2 to 1:2.2.

(21) First Precipitates including Al and Ce are generated from an aqueous solution including Al and Ce. Thereafter, second precipitates including a rare-earth element, excepting Y, and Al are generated from an aqueous solution including the rare-earth element, excepting Y, and Al. Then, third precipitates including Zr and Y are generated from an aqueous solution including Zr and Y.

In the first precipitates, Al:Ce can preferably fall in a range of from 1:0.5 to 1:10, and can further preferably fall in a range of from 1:1 to 1:5. In the second precipitates, Al can preferably be included in an amount of from 0.1 to 10 times of Al included in the first precipitates, and can further preferably be included in an amount of from 0.2 to 5 times thereof. Additionally, in the second precipitates, Al: the rare-earth element, excepting Y, can preferably fall in a range of from 1:0.005 to 1:0.1, and can further preferably fall in a range of from 1:0.008 to 1:0.05. In the third precipitates, Zr:Y can preferably fall in a range of from 0.8:0.2 to 0.2:0.8, and can further preferably fall in a range of from 0.7:0.3 to 0.3:0.7. Moreover, when the ratio of the first precipitates with respect to the third precipitates are specified by total amounts of the metallic elements, the first precipitates: the third precipitates can preferably fall in a range of from 1:0.5 to 1:4, and can further preferably fall in a range of from 1:1 to 1:2.

(22) First Precipitates including Zr and Y are generated from an aqueous solution including Zrandy. Thereafter, second precipitates including a rare-earth element, excepting Y, and Al are generated from an aqueous solution including the rare-earth element, excepting Y, and Al. Then, third precipitates including Al and Ce are generated from an aqueous solution including Al and Ce.

In the third precipitates, Al:Ce can preferably fall in a range of from 1:0.5 to 1:10, and can further preferably fall in a range of from 1:1 to 1:5. In the second precipitates, Al can preferably be included in an amount of from 0.1 to 10 times of Al included in the third precipitates, and can further preferably be included in an amount of from 0.2 to 5 times thereof. Additionally, in the second precipitates, Al: the rare-earth element, excepting Y, can preferably fall in a range of from 1:0.005 to 1:0.1, and can further preferably fall in a range of from 1:0.008 to 1:0.05. In the first precipitates, Zr:Y can preferably fall in a range of from 0.8:0.2 to 0.2:0.8, and can further preferably fall in a range of from 0.7:0.3 to 0.3:0.7. Moreover, when the ratio of the third precipitates with respect to the first precipitates are specified by total amounts of the metallic elements, the third precipitates: the first precipitates can preferably fall in a range of from 1:0.5 to 1:4, and can further preferably fall in a range of from 1:1 to 1:2.

(23) First Precipitates including Al and Ce are generated from an aqueous solution including Al and Ce. Thereafter, second precipitates including a rare-earth element, excepting Y, and Al are generated from an aqueous solution including the rare-earth element, excepting Y, and Al. Then, third precipitates including Al, Zr and Y are generated from an aqueous solution including Al, Zr and Y.

In the first precipitates, Al:Ce can preferably fall in a range of from 1:0.5 to 1:10, and can further preferably fall in a range of from 1:1 to 1:5. In the second precipitates, Al can preferably be included in an amount of from 0.1 to 10 times of Al included in the first precipitates, and can further preferably be included in an amount of from 0.2 to 5 times thereof. Additionally, in the second precipitates, Al: the rare-earth element, excepting Y, can preferably fall in a range of from 1:0.005 to 1:0.1, and can further preferably fall in a range of from 1:0.008 to 1:0.05. In the third precipitates, Al:Zr+Y can preferably fall in a range of from 1:8 to 4:1, and can further preferably fall in a range of from 1:5 to 2:1. Also, in the third precipitates, Zr:Y can preferably fall in a range of from 0.8:0.2 to 0.2:0.8, can further preferably fall in a range of from 0.7:0.3 to 0.3:0.7. Moreover, when the ratio of the first precipitates with respect to the third precipitates are specified by total amounts of the metallic elements, the first precipitates: the third precipitates can preferably fall in a range of from 1:0.5 to 1:4, and can further preferably fall in a range of from 1:1 to 1:2.

(24) First Precipitates including Al, Zr and Y are generated from an aqueous solution including Al, Zr and Y. Thereafter, second precipitates including a rare-earth element, excepting Y, and Al are generated from an aqueous solution including the rare-earth element, excepting Y, and Al. Then, third precipitates including Al and Ce are generated from an aqueous solution including Al and Ce.

In the third precipitates, Al:Ce can preferably fall in a range of from 1:0.5 to 1:10, and can further preferably fall in a range of from 1:1 to 1:5. In the second precipitates, Al can preferably be included in an amount of from 0.1 to 10 times of Al included in the third precipitates, and can further preferably be included in an amount of from 0.2 to 5 times thereof. Additionally, in the second precipitates, Al: the rare-earth element, excepting Y, can preferably fall in a range of from 1:0.005 to 1:0.1, and can further preferably fall in a range of from 1:0.008 to 1:0.05. In the first precipitates, Al:Zr+Y can preferably fall in a range of from 1:8 to 4:1, and can further preferably fall in a range of from 1:5 to 2:1. Also, in the first precipitates, Zr:Y can preferably fall in a range of from 0.8:0.2 to 0.2:0.8, can further preferably fall in a range of from 0.7:0.3 to 0.3:0.7. Moreover, when the ratio of the third precipitates with respect to the first precipitates are specified by total amounts of the metallic elements, the third precipitates: the first precipitates can preferably fall in a range of from 1:0.5 to 1:4, and can further preferably fall in a range of from 1:1 to 1:2.

In another production process according to the present invention, a plurality of aqueous solutions of metallic acid salts are prepared; the respective aqueous solutions of the metallic acid salts are mixed with an alkaline solution, thereby forming precipitates respectively; at least one of the respective formed precipitates is subjected to an aging treatment while putting it in a suspension state in which water or a solution containing water serves as a dispersion medium, or in a system in which water is present sufficiently; the respective precipitates are mixed, thereby preparing a precipitates mixture; and the precipitates mixture is calcined. It is possible to produce the present composite oxides by this process as well.

In a still another production process according to the present invention, a plurality of aqueous solutions of metallic acid salts are prepared; at least one of the aqueous solutions of the metallic acid salts was mixed with an alkaline solution, thereby forming precipitates; at least one of the precipitates is subjected to an aging treatment while putting it in a suspension state in which water or a solution containing water serves as a dispersion medium, or in a system in which water is present sufficiently; the rest of the aqueous solutions of the metallic acid salts are added to the formed precipitates thereafter, thereby further forming precipitates; and the resulting precipitates are calcined subsequently. It is possible to produce the present composite oxides by this process as well.

In the above-described production processes according to the present invention, it is preferred that, before the calcining step, they can further comprise: subjecting the resulting precipitates to an aging treatment while putting them in a suspension state in which water or a solution containing water serves as a dispersion medium, or in a system in which water is present sufficiently. It is possible to produce the present composite oxides by this process as well.

Namely, in the composite oxides produced by the present production processes, the metallic element distributions differ with each in the surface and inner portions of the agglomerated particles, which are generated by agglomerating the primary particles. Consequently, by adequately selecting a variety of metallic acid salts it is possible to produce the present composite oxides with ease.

As for the acid salts, they are not limited in particular as far as they exhibit a solubility to water or an alcohol, which is required in the present production processes. However, nitrates can preferably be used especially. As for an alkaline solution, it is possible to use an aqueous solution or an alcohol solution, in which ammonia, ammonium carbonate, sodium hydroxide, potassium hydroxide, sodium carbonate, or the like, is solved. Since ammonia and ammonium carbonate evaporate in calcination, they can preferably be used especially. Note that the pH of the alcohol solution can further preferably be 8 or more.

There are a variety of methods how to deposit the precipitates. For instance, there are a method of adding ammonia water, etc., spontaneously and stirring it heavily; a method of adjusting the pH, at which oxide precursors start depositing, by adding hydrogen peroxide and thereafter depositing the precipitates by using ammonia water, and so on. Moreover, there are the following methods: a method of extending the time required for neutralizing the aqueous solutions of the metallic acid salts by using ammonia water, etc., preferably neutralizing them for 10 minutes or more; a method of neutralizing the aqueous solutions of the metallic acid salts stepwise while monitoring the pH; adding a buffer solution so that the aqueous solutions of the metallic acid salts keep to exhibit a predetermined pH; and the like.

In the step of generating the precipitates, the mixture solutions can desirably be stirred always at a shear rate of 1,000 sec.$^{-1}$ Thus, the particle diameters of the generating oxide precursors can be made extremely finer, and accordingly the particle diameters of the agglomerated particles can be made much smaller. Note that it is desirable to make the particle diameters of the oxide precursors 3 $\mu$m or less. When the particle diameters are larger than the value, the particle diameters of the generating agglomerated particles enlarge so much that the activities are diminished by the decrement of the specific surface areas.

When adding the aqueous solutions of the metallic acid salts, they can preferably be added at once. Thus, it is possible to make the particles of the deposited particles much finer, and accordingly it is possible to easily produce the agglomerated particles, in which the composite oxide particles or solid solution particles, having an average diameter of 50 nm or less, are agglomerated. When adding the aqueous solutions of the metallic acid salts successively, it can be carried out by a plurality of stages, e.g., 2 stages or more. The upper limit of the number of the steps is not limited in particular.

It is furthermore desirable that the precipitates can be subjected to an aging treatment. In the aging treatment, the precipitates are heated while they are put in a suspension state, in which water or a solution containing water serves as a dispersion medium, or in a system, in which water is present sufficiently. By carrying out the aging treatment, though the mechanism has not been clear yet, it is possible to obtain the present composite oxides, which are composed of the agglomerated particles having an average particle diameter of 20 $\mu$m or less. The agglomerated particles are composed of the phase "A" fine particles having an average diameter of 100 nm or less and the phase "B" fine particles having an average diameter of 30 nm or less. The fine particles, being composed of the phase "A", have pores between the fine particles, and the pores exhibit a narrow pore diameter distribution, which falls in a range of from 5 to 20 nm. A major portion of the fine particles, being composed of the phase "B", are dispersed in the pores.

The aging treatment can be carried out in the following manner. The solution containing the precipitates are heated as a whole in a pressure-resistant and heat-resistant container, such as an autoclave, etc., while water is present sufficiently in the system. Thereafter, the solvent is evaporated, and the resulting precipitates are calcined. Alternatively, the filtered precipitates can be calcined in the presence of water vapor. In this case, the precipitates can preferably be calcined in a saturated water vapor atmosphere.

In the case where the above-described aging treatment is carried out, the solving and re-crystallizing of the precipitates are facilitated by the application of heat, and at the same time there arises the growth of the particles. In this case, it is desirable to neutralize the aqueous solutions of the metallic acids with a base in an equivalent amount or more for neutralizing all of the metallic acid salts. Thus, oxide precursors are aged more uniformly, and the pores are formed effectively. In addition, the formation of the solid solutions, for example, a $ZrO_2$—$TiO_2$ solid solution, etc., is furthermore facilitated.

The aging treatment can desirably be carried out at room temperature or more, further desirably at a temperature of from 100 to 200° C., furthermore desirably at a temperature of from 100 to 150° C. When the heat application is less than 100° C., the facilitating effect arises less, and the time required for the aging is prolonged too much. When it is more than 200° C., a synthesizing apparatus, which can endure a pressure of 10 atm (i.e., 1,013,250 Pa) or more, is required, and consequently the equipment cost goes up.

In the above-described present production processes, at least one of the precipitates is aged, and mixed with the other precipitates. Then, the precipitates mixture is calcined. The phase "A" fine particles are made from the aged precipitates. In the other present production process, at lease one of the precipitates, which are generated by the successive co-precipitation process, is aged. Thus, the phase "A" fine particles are made from the precipitates.

The resulting precipitates can desirably be calcined at a temperature of from 300 to 900° C. When the calcining temperature is less than 300° C., the granular growth of the catalytic ingredient is likely to occur when the precipitates are turned into a catalyst and the resulting catalyst is subjected to a high temperature durability test, and the catalytic ingredient is likely to grow granularly so that the resulting catalyst is degraded in terms of the sulfur-poisoning resistance. When the calcining temperature exceeds 900° C., such a calcining temperature is not preferable because there might arise a case where the specific surface area is reduced sharply.

By loading a catalytic ingredient on the present composite oxide, it is possible to obtain the present catalyst for purifying an exhaust gas. The present catalyst can be utilized in the purification of exhaust gases, which are emitted from gasoline engines, diesel engines, gas engines (or gas heat pumps (i.e., GHP)), etc. Moreover, when an $NO_x$ storage member is loaded in addition to the catalytic ingredient, it is possible to make an $NO_x$ storage-and-reduction type catalyst. Such an $NO_x$ storage-and-reduction type catalyst is extremely good in terms of the sulfur-poisoning resistance.

When loading an $NO_x$ storage member, the $NO_x$ storage member can be at least one element selected from a group consisting of alkali metals, alkaline-earth metals and rare-earth elements. Specifically, it can desirably be at least one member selected from the group consisting of Li, Na, K, Mg, Sr, Ba, Ce and Pr. The alkali metals exhibit a high $NO_x$ storage ability in a high temperature range. The alkaline-earth metals exhibit a high $NO_x$ storage ability in a low temperature range. Therefore, it is preferable to use them combindely. Among them, it is further preferable to use K and Ba combinedly. The $NO_x$ storage member is loaded on the present composite oxide in the states of salts, such as carbonate, etc., oxides, hydroxides, and so on.

The $NO_x$ storage member can desirably be loaded in an mount of from 0.1 to 1.2 mol with respect to 1 liter of the present catalyst. Note that, when the loading amount of the $NO_x$ storage member is too much, there might arise a phenomenon that the catalytic ingredient is covered with the $NO_x$ storage member so that the $NO_x$ purifying activity lowers.

When producing the present catalyst for purifying an exhaust gas, a catalytic ingredient can be loaded on the present composite oxide after the present composite oxide is prepared by either one of the present production processes. Moreover, like the present process for producing the present catalyst for purifying an exhaust gas, when a catalytic ingredient is included in at least one of the aqueous solutions of the metallic acid salts, it is possible to load the catalytic ingredient in the present composite oxide simultaneously with the production of the present composite oxide. The catalytic ingredient can be included in the aqueous solutions in the states of water-soluble compounds, such as nitrates, complexes, etc.

In accordance with such a production process, it is possible to generate precipitates, which take in the catalytic ingredient, and to obtain catalytic particles, in which the catalytic ingredient is included in the agglomerated particles of the present composite oxide, by calcining. Consequently, in the catalytic particles, the catalytic ingredient is present uniformly in a highly dispersed manner, and the catalytic ingredient particles are put in a state, in which the catalytic ingredient particles are enclosed by the oxide fine particles. Hence, the activities are enhanced, and the granular growth of the catalytic ingredient is furthermore inhibited.

The present invention will be hereinafter described in detail with reference to specific examples and comparative examples. Note that, in the descriptions set forth below, the hyphenated expressions, such as $CeO_2$—$ZrO_2$, etc., shall mean a composite oxide or a solid solution unless otherwise specified.

(1) Catalysts for Purifying Exhaust Gas Employing Supports Made from Al—Ce—Zr—La-based Composite Oxide Powders Table 1 summarizes the compositions of aqueous solutions, which were used to produce composite oxide powders of Example Nos. 1 through 11 and Comparative Example Nos. 1 and 2.

TABLE 1

| | Included Metallic Elements & Molar Ratios | | | | | | | |
|---|---|---|---|---|---|---|---|---|
| | Aq. Solution "A" | | | | Aq. Solution "B" | | | |
| | Al | Ce | Zr | La | Al | Ce | Zr | La |
| Ex. #1 | 1 | 1 | 1 | — | 8.4 | — | — | 0.12 |
| Ex. #2 | 8.4 | — | — | 0.12 | 1 | 1 | 1 | — |
| Ex. #3 | — | 1 | 1 | — | 9.4 | — | — | 0.12 |
| Ex. #4 | 9.4 | — | — | 0.12 | — | 1 | 1 | — |
| Ex. #5 | 0.5 | 1 | 1 | — | 8.9 | — | — | 0.12 |
| Ex. #6 | 2 | 1 | 1 | — | 7.4 | — | — | 0.12 |
| Ex. #7 | 3 | 1 | 1 | — | 6.4 | — | — | 0.12 |
| Ex. #8 | 1 | 1 | 1 | — | 8.4 | — | — | — |
| Ex. #9 | 8.4 | — | — | — | 1 | 1 | 1 | — |
| Ex. #10 | 9.4 | — | — | — | — | 1 | 1 | — |
| Ex. #11 | — | 1 | 1 | — | 9.4 | — | — | — |
| Comp. Ex. #1 | 9.4 | 1 | 1 | 0.12 | — | — | — | — |
| Comp. Ex. #2 | 9.4 | 1 | 1 | — | — | — | — | — |

EXAMPLE NO. 1

An aqueous solution "A" was prepared by solving 1.0 mol of aluminum nitrate nona-hydrate ($Al(NO_3)_3 \cdot 9H_2O$), 1.0 mol of cerium nitrate hexa-hydrate ($Ce(NO_3)_4 \cdot 6H_2O$), 1.0 mol of zirconyl oxynitrate di-hydrate ($ZrO(NO_3)_2 \cdot 2H_2O$) and 124 g of hydrogen peroxide water, having a concentration of 30% by weight (equivalent to a content of 1.1 mol as $H_2O_2$), in 2,500 cm³ of pure water.

While, an aqueous solution "B" was prepared by solving 8.4 mol of aluminum nitrate nona-hydrate and 0.12 mol of lanthanum nitrate hexa-hydrate (La(NO$_3$)$_3$.6H$_2$O) in 2,500 cm$^3$ of pure water.

Moreover, 2,500 cm$^3$ of a neutralizing aqueous solution was prepared which included NH$_3$ in an amount as much as 1.2 times by mol for neutralizing all the nitric acid radicals.

A total amount of the neutralizing aqueous solution was put in a reaction container, and the aqueous solution "A" was added thereto while stirring the neutralizing aqueous solution with a mechanical stirrer and a homogenizer. The mixture was kept stirred as it was for 1 hour. Thereafter, the aqueous solution "B" was added thereto, and the mixture was further stirred for 1 hour. Note that it is possible to stir the mixture at a shear rate of 1,000 sec.$^{-1}$ or more with the homogenizer. The resulting precipitates (i.e., oxide precursors) were filtered and washed, were dried in air at 300° C. for 3 hours, and were further calcined preliminarily at 500° C. for 1 hour. The resultant preliminarily-calcined powder was calcined in air at 700° C. for 5 hours, and was pulverized with a wet-type ball mill so that the median diameter was 10 $\mu$m approximately (i.e., D50≈10 $\mu$m). Thus, a composite oxide powder was prepared.

The resulting composite oxide powder was observed with an FE-TEM, and was analyzed by an EPMA. As a result, it was found to comprise agglomerated particles 1, which had an average article diameter of about 10 $\mu$m. The schematic structure of the composite oxide are illustrated in FIG. 1. The composite oxide powder was constituted mainly by three primary particles 10, 13 and 12, which had an average diameter of 10 nm or less. The primary particles 10 were composed of Al$_2$O$_3$. The primary particles 13 were composed of CeO$_2$—ZrO$_2$. The primary particles 12 were composed of an Al$_2$O$_3$—La$_2$O$_3$ composite oxide. As illustrated in FIG. 1, the primary particles 13 were distributed more in the inner portion of the agglomerated particles 1. The primary particles 12 were distributed more in the surface side of the agglomerated particles 1. The Al$_2$O$_3$ primary particles 10 were also distributed in the inner portion.

According to the results obtained by the EPMA analysis, the surface-side Al$_2$O$_3$ content was 70 mol % with respect to the total Al$_2$O$_3$ content. The surface-side La$_2$O$_3$ content was 70 mol % with respect to the total La$_2$O$_3$ content. The inner-portion CeO$_2$ content was 65 mol % with respect to the total CeO$_2$ content.

400 g of the composite oxide powder, 42 g of aluminum nitrate hexa-hydrate, 7.2 g of a pseud-boehmite and 300 g of pure water were pulverized and mixed with a wet-type ball mill. Thus, a slurry was prepared which had a median diameter D50=7 $\mu$m. The resultant slurry was coated in an amount of 200 g/L on a honeycomb support substrate, which was made from cordierite and which had 400 cells per square inch (i.e., in$^2$). After the honeycomb support substrate was dried by blowing an air to it at 110° C., it was calcined at 600° C. for 1 hour, thereby forming a coating layer. Thereafter, by using a Pt (NO$_2$)$_2$(NH$_3$)$_2$ aqueous solution and an Rh(NO$_3$)$_3$ aqueous solution, Pt and Rh were loaded successively in the coating layer, and the honeycomb support substrate was calcined in air. Thus, a catalyst of Example No. 1 was prepared. The calcining conditions were 300° C. for 1 hour in the case of Pt, and were 120° C. for 6 hours in the case of Rh. Pt was loaded in an amount of 1.5 g/L. Rh was loaded in an amount of 0.3 g/L.

EXAMPLE NO. 2

Except that an aqueous solution "A" and an aqueous solution "B", whose compositions are set forth in Table 1, were used, a composite oxide powder was prepared in the same manner as Example No. 1.

The resulting composite oxide powder was observed with an FE-TEM, and was analyzed by an EPMA. As a result, similarly to Example No. 1, it was found to comprise agglomerated particles, which had an average particle diameter of about 10 $\mu$m. The agglomerated particles were constituted mainly by primary particles, being composed of Al$_2$O$_3$, primary particles, being composed of CeO$_2$—ZrO$_2$, and primary particles, being composed of Al$_2$O$_3$—La$_2$O$_3$. The CeO$_2$—ZrO$_2$ primary particles were distributed more in the surface side of the agglomerated particles. The Al$_2$O$_3$—La$_2$O$_3$ primary particles were distributed more in the inner portion of the agglomerated particles.

According to the results obtained by the EPMA analysis, the surface-side CeO$_2$ content was 70 mol % with respect to the total CeO$_2$ content. The inner-portion La$_2$O$_3$ content was 70 mol % with respect to the total La$_2$O$_3$ content. The inner-portion Al$_2$O$_3$ content was 70 mol % with respect to the total Al$_2$O$_3$ content.

The resultant composite oxide was used to prepare a catalyst of Example No. 2 in the same manner as Example No. 1.

EXAMPLE NO. 3

An aqueous solution "A" was prepared by solving 1.0 mol of cerium nitrate hexa-hydrate, 1.0 mol of zirconyl oxynitrate di-hydrate and 124 g of hydrogen peroxide water, having a concentration of 30% by weight (equivalent to a content of 1.1 mol as H$_2$O$_2$), in 2,500 cm$^3$ of pure water.

An aqueous solution "B" was prepared by solving 9.4 mol of aluminum nitrate nona-hydrate and 0.12 mol of lanthanum nitrate hexa-hydrate (La(NO$_3$)$_3$.6H$_2$O) in 2,500 cm$^3$ of pure water.

Except that the aqueous solution "A" and the aqueous solution "B" were used, a composite oxide powder was prepared in the same manner as Example No. 1. The resulting composite oxide powder was observed with an FE-TEM, and was analyzed by an EPMA. As a result, similarly to Example No. 1, it was found to comprise agglomerated particles, which had an average particle diameter of about 10 $\mu$m. The agglomerated particles were constituted mainly by two primary particles, which had an average diameter of 10 nm or less. Primary particles, being composed of CeO$_2$—ZrO$_2$, and primary particle, being composed of Al$_2$O$_3$—La$_2$O$_3$. The primary particles, being composed of Al$_2$O$_3$—La$_2$O$_3$, were distributed more in the surface of the agglomerated particles. The primary particles, being composed of CeO$_2$—ZrO$_2$, were distributed more in the inner portion of the agglomerated particles.

According to the results obtained by the EPMA analysis, the surface-side Al$_2$O$_3$ content was 80 mol % with respect to the total Al$_2$O$_3$ content. The surface-side La$_2$O$_3$ content was 80 mol % with respect to the total La$_2$O$_3$ content. The inner-portion CeO$_2$ content was 75 mol % with respect to the total CeO$_2$ content.

The resultant composite oxide was used to prepare a catalyst of Example No. 3 in the same manner as Example No. 1.

EXAMPLE NO. 4

Except that an aqueous solution "A" and an aqueous solution "B", whose compositions are set forth in Table 1, were prepared in the same fashion as Example No. 3 to use, a composite oxide powder was prepared in the same manner as Example No. 1.

The overall composition of the resulting composite oxide powder was the same as that of Example No. 3. According to the results of an observation with an FE-TEM and an analysis with an EPMA, however, it was found that primary particles, being composed of $CeO_2$—$ZrO_2$, were distributed more in the surface of the agglomerated particles, and that primary particle, being composed of $Al_2O_3$—$La_2O_3$, were distributed more in the inner portion of the agglomerated particles.

According to the results obtained by the EPMA analysis, the surface-side $CeO_2$ content was 75 mol % with respect to the total $CeO_2$ content. The inner-portion $La_2O_3$ content was 75 mol % with respect to the total $La_2O_3$ content. The inner-portion $Al_2O_3$ content was 80 mol % with respect to the total $Al_2O_3$ content.

The resultant composite oxide was used to prepare a catalyst of Example No. 4 in the same manner as Example No. 1.

EXAMPLE NOS. 5 THROUGH 7

Except that, as set forth in Table 1, the aluminum nitrate concentrations in an aqueous solution "A" and an aqueous solution "B" were different from those in Example No. 1, composite oxide powders were prepared in the same fashion as Example No. 1, and catalysts were prepared in the same manner as Example No. 1, respectively. The respective composite oxide powders were analyzed in the same fashion as Example No. 1. As a result, except that the $Al_2O_3$ contents in the surface and inner portion of the agglomerated particles differ from those of Example No. 1, the constitutions were the same as that of Example No. 1. Note that, in all of Example Nos. 5 through 7, the surface-side metallic-element distributions of the agglomerated particles and the inner-portion metallic-element distributions thereof differed with each other.

EXAMPLE NO. 8

Except that lanthanum nitrate was not used, and except that an aqueous solution "A" and an aqueous solution "B", whose compositions are set forth in Table 1, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$, and second primary particles were composed of $CeO_2$—$ZrO_2$. Moreover, the $CeO_2$—$ZrO_2$ was distributed more in the inner portion of the agglomerated particles, and the $Al_2O_3$ was distributed more on the surface side of the agglomerated particles.

According to the results obtained by the EPMA analysis, the surface-side $Al_2O_3$ content was 65 mol % with respect to the total $Al_2O_3$ content. The inner-portion $CeO_2$ content was 70 mol % with respect to the total $CeO_2$ content.

The resultant composite oxide powder was used to prepare a catalyst of Example No. 8 in the same manner as Example No. 1.

EXAMPLE NO. 9

Except that lanthanum nitrate was not used, and except that an aqueous solution "A" and an aqueous solution "B", whose compositions are set forth in Table 1, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$, and second primary particles were composed of $CeO_2$—$ZrO_2$. Moreover, the $CeO_2$—$ZrO_2$ was distributed more in the surface side of the agglomerated particles, and the $Al_2O_3$ was distributed more in the inner portion of the agglomerated particles.

According to the results obtained by the EPMA analysis, the inner-portion $Al_2O_3$ content was 70 mol % with respect to the total $Al_2O_3$ content. The surface-side $CeO_2$ content was 75 mol % with respect to the total $CeO_2$ content.

The resultant composite oxide powder was used to prepare a of Example No. 9 in the same manner as Example No. 1.

EXAMPLE NO. 10

Except that lanthanum nitrate was not used, and except that an aqueous solution "A" and an aqueous solution "B", whose compositions are set forth in Table 1, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of a $CeO_2$—$ZrO_2$ solid solution, and second primary particles were composed of $Al_2O_3$. Moreover, the $CeO_2$—$ZrO_2$ solid solution was distributed more in the surface side of the agglomerated particles, and the $Al_2O_3$ was distributed more in the inner portion of the agglomerated particles.

According to the results obtained by the EPMA analysis, the inner-portion $Al_2O_3$ content was 80 mol % with respect to the total $Al_2O_3$ content. The surface-side $CeO_2$ content was 75 mol % with respect to the total $CeO_2$ content.

The resultant composite oxide powder was used to prepare a catalyst of Example No. 10 in the same manner as Example No. 1.

EXAMPLE NO. 11

Except that lanthanum nitrate was not used, and except that an aqueous solution "A" and an aqueous solution "B", whose compositions are set forth in Table 1, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $CeO_2$—$ZrO_2$, and second primary particles were composed of $Al_2O_3$. Moreover, the $CeO_2$—$ZrO_2$ was distributed more in the inner portion of the agglomerated particles, and the $Al_2O_3$ was distributed more in the surface side of the agglomerated particles.

According to the results obtained by the EPMA analysis, the surface-side $Al_2O_3$ content was 80 mol % with respect to the total $Al_2O_3$ content. The inner-portion $CeO_2$ content was 70 mol % with respect to the total $CeO_2$ content.

The resultant composite oxide powder was used to prepare a catalyst of Example No. 11 in the same manner as Example No. 1.

COMPARATIVE EXAMPLE NO. 1

An aqueous solution "A" was prepared by solving 4.7 mol of aluminum nitrate nona-hydrate, 1.0 mol of cerium nitrate hexa-hydrate, 1.0 mol of zirconyl oxynitrate di-hydrate, 0.12 mol of lanthanum nitrate hexa-hydrate ($La(NO_3)_3.6H_2O$) and 124 g of hydrogen peroxide water, having a concentration of 30% by weight (equivalent to a content of 1.1 mol as $H_2O_2$), in 1,400 $cm^3$ of pure water.

Moreover, 2,000 $cm^3$ of a neutralizing aqueous solution was prepared which included $NH_3$ in an amount as much as 1.2 times by mol for neutralizing all the nitric acid radicals.

A total amount of the neutralizing aqueous solution was put in a reaction container. Then, except that only the aqueous solution "A" was added thereto while stirring the neutralizing aqueous solution with a mechanical stirrer and a homogenizer, a composite oxide powder was prepared in the same manner as Example No. 1.

Figure 2:
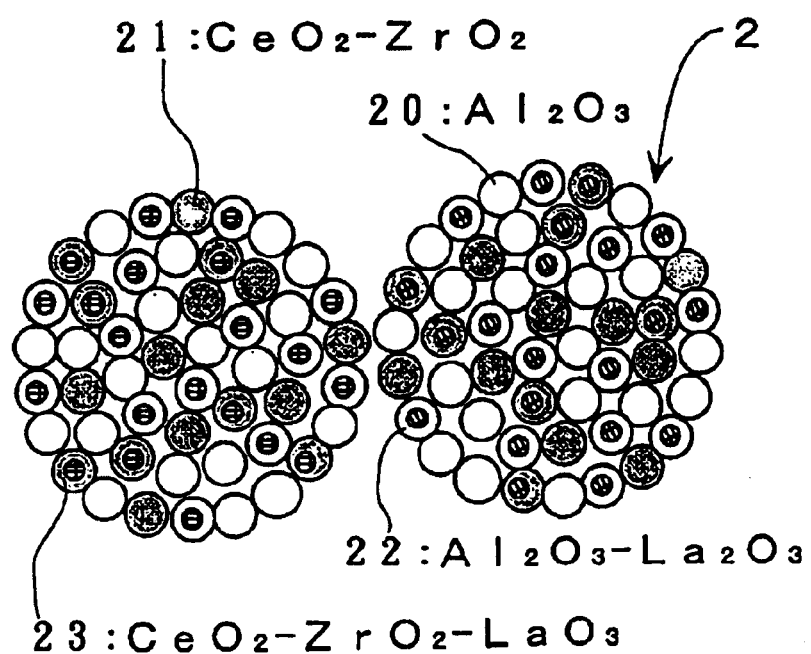
FIG. 2 is a schematic explanatory diagram for illustrating a composite oxide, which was prepared in Comparative Example No. 1.

FIG. 2 shows a schematic structure of the resulting composite oxide powder. As illustrated in FIG. 2, the composite oxide powder comprised agglomerated particles 2, which had an average particle diameter of about 10 μm. The composite oxide powder was observed with an FE-TEM, and was analyzed by an EPMA. As a result, it was found that the agglomerated particles were constituted mainly by four primary particles 20, 21, 22 and 23, which had an average diameter of 10 nm or less, and which were dispersed substantially uniformly. First primary particles 20 were composed of $Al_2O_3$, second primary particles 21 were composed of $CeO_2$—$ZrO_2$, third primary particles 22 were composed of $Al_2O_3$—$La_2O_3$, and fourth primary particles 23 were composed of $CeO_2$—$ZrO_2$—$La_2O_3$. According to the results obtained by the EPMA analysis, the agglomerated particles had a substantially uniformmetallic element distribution from the surface side to the inner portion. Note that the content of the $Al_2O_3$—$La_2O_3$ was less, and that a major part of the $La_2O_3$ was solved in the $CeO_2$—$ZrO_2$.

The resultant composite oxide powder was used to prepare a catalyst of Comparative Example No. 1 in the same manner as Example No. 1.

COMPARATIVE EXAMPLE NO. 2

An aqueous solution "A" was prepared by solving 4.7 mol of aluminum nitrate nona-hydrate, 1.0 mol of cerium nitrate hexa-hydrate, 1.0 mol of zirconyl oxynitrate di-hydrate and 124 g of hydrogen peroxide water, having a concentration of 30% by weight (equivalent to a content of 1.1 mol as $H_2O_2$), in 5,000 $cm^3$ of pure water.

Moreover, 2,000 $cm^3$ of a neutralizing aqueous solution was prepared which included $NH_3$ in an amount as much as 1.2 times by mol for neutralizing all the nitric acid radicals.

A total amount of the neutralizing aqueous solution was put in a reaction container. Then, except that only the aqueous solution "A" was added thereto while stirring the neutralizing aqueous solution with a mechanical stirrer and a homogenizer, a composite oxide powder was prepared in the same manner as Example No. 1.

Similarly to Comparative Example No. 1, the resulting composite oxide powder comprised agglomerated particles, which had an average particle diameter of about 10 μm. It was observed with an FE-TEM, and was analyzed by an EPMA. As a result, the agglomerated particles were found to be constituted mainly by two primary particles, which had an average diameter of 10 nm or less, which were composed of $Al_2O_3$ and $CeO_2$—$ZrO_2$, and which were dispersed uniformly According to the results obtained by the EPMA analysis, the agglomerated particles had a substantially uniform metallic element distribution from the surface side to the inner portion.

The resultant composite oxide powder was used to prepare a catalyst of Comparative Example No. 2 in the same manner as Example No. 1.

(2) Catalysts for Purifying Exhaust Gas Employing Supports Made from Al—Zr—Ti—La-based Composite Oxide Powders Table 2 summarizes the compositions of aqueous solutions, which were used to produce composite oxide powders of Example Nos. 12 through 15 and Comparative Example Nos. 3 and 4.

TABLE 2

| | Included Metallic Elements & Molar Ratios | | | | | | | |
| | Aq. Solution "A" | | | | Aq. Solution "B" | | | |
| | Al | Zr | La | Ti | Al | Zr | La | Ti |
| Ex. #12 | 1 | 0.6 | — | 0.4 | 3.7 | — | — | — |
| Ex. #13 | 3.7 | — | — | — | 1 | 0.6 | — | 0.4 |
| Ex. #14 | 1 | 0.6 | — | 0.4 | 3.7 | — | 0.06 | — |
| Ex. #15 | 3.7 | — | 0.06 | — | 1 | 0.6 | — | 0.4 |
| Comp. Ex. #3 | 4.7 | 0.6 | — | 0.4 | — | — | — | — |
| Comp. Ex. #4 | 4.7 | 0.6 | 0.06 | 0.4 | — | — | — | — |

EXAMPLE NO. 12

Except that a titanium tetrachloride ($TiCl_4$) solution was used as a Ti source, and that an aqueous solution "A" and an aqueous solution "B", whose compositions are set forth in Table 2, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by four primary particles, which had an average diameter of 10 nm or less. First primary particles were composed of $ZrO_2$—$TiO_2$, second primary particles were composed of $Al_2O_3$, third primary particles were composed of $ZrO_2$, and fourth primary particles were composed of $TiO_2$. Moreover, the primary particles, being composed of $ZrO_2$—$TiO_2$, $ZrO_2$ and $TiO_2$, were distributed more in the inner portion of the agglomerated particles, and the primary particles, being composed of $Al_2O_3$, were distributed more on the surface side of the agglomerated particles.

According to the results obtained by the EPMA analysis, the surface-side $Al_2O_3$ content was 60 mol % with respect to the total $Al_2O_3$ content. The inner-portion $TiO_2$ content was 65 mol % with respect to the total $TiO_2$ content.

The resultant composite oxide powder was used to prepare a catalyst of Example No. 12 in the same manner as Example No. 1.

EXAMPLE NO. 13

Except that a titanium tetrachloride solution was used as a Ti source, and that an aqueous solution "A" and an aqueous solution "B", whose compositions are set forth in Table 2, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 $\mu$m. The agglomerated particles, similarly to those of Example No. 12, were constituted mainly by four primary particles, which had an average diameter of 10 nm or less. The primary particles, being composed of $ZrO_2$—$TiO_2$, $ZrO_2$ and $TiO_2$, were distributed more on the surface side of the agglomerated particles, and the primary particles, being composed of $Al_2O_3$, were distributed more in the inner portion of the agglomerated particles.

According to the results obtained by the EPMA analysis, the surface-side $TiO_2$ content was 70 mol % with respect to the total $TiO_2$ content. The inner-portion $Al_2O_3$ content was 70 mol % with respect to the total $Al_2O_3$ content.

The resultant composite oxide powder was used to prepare a catalyst of Example No. 13 in the same manner as Example No. 1.

EXAMPLE NO. 14

Except that a titanium tetrachloride solution was used as a Ti source, and that an aqueous solution "A" and an aqueous solution "B", whose compositions are set forth in Table 2, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 $\mu$m. The agglomerated particles were constituted mainly by five primary particles, which had an average diameter of 10 nm or less. First primary particles were composed of $ZrO_2$—$TiO_2$, second primary particles were composed of $Al_2O_3$—$La_2O_3$, third primary particles were composed of $Al_2O_3$, fourth primary particles were composed of $TiO_2$, and fifth primary particles were composed of $ZrO_2$. Moreover, the primary particles, being composed of $ZrO_2$—$TiO_2$, $ZrO_2$ and $TiO_2$, were distributed more in the inner portion of the agglomerated particles, and the primary particles, being composed of $Al_2O_3$—$La_2O_3$, were distributed more in the surface side of the agglomerated particles.

According to the results obtained by the EPMA analysis, the surface-side $Al_2O_3$ content was 60 mol % with respect to the total $Al_2O_3$ content. The surface-side $La_2O_3$ content was 60 mol % with respect to the total $La_2O_3$ content. The inner-portion $TiO_2$ content was 65 mol % with respect to the total $TiO_2$ content.

The resultant composite oxide powder was used to prepare a catalyst of Example No. 14 in the same manner as Example No. 1.

EXAMPLE NO. 15

Except that a titanium tetrachloride solution was used as a Ti source, and that an aqueous solution "A" and an aqueous solution "B", whose compositions are set forth in Table 2, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 $\mu$m. The agglomerated particles were constituted mainly by five primary particles, which had an average diameter of 10 nm or less. First primary particles were composed of $ZrO_2$—$TiO_2$. Second primary particles were composed of $Al_2O_3$—$La_2O_3$. Third primary particles were composed of $Al_2O_3$. Fourth primary particles were composed of $TiO_2$. Fifth primary particles were composed of $ZrO_2$. The first primary particles, being composed of $ZrO_2$—$TiO_2$, were distributed more in the surface side of the agglomerated particles, and the second primary particles, being composed of $Al_2O_3$—$La_2O_3$, were distributed more in the inner portion of the agglomerated particles.

According to the results obtained by the EPMA analysis, the surface-side $TiO_2$ content was 65 mol % with respect to the total $TiO_2$ content. The inner-portion $La_2O_3$ content was 60 mol % with respect to the total $La_2O_3$ content. The inner-portion $Al_2O_3$ content was 60 mol % with respect to the total $Al_2O_3$ content.

The resultant composite oxide powder was used to prepare a catalyst of Example No. 15 in the same manner as Example No. 1.

COMPARATIVE EXAMPLE NO. 3

Except that a titanium tetrachloride solution was used as a Ti source, and that only an aqueous solution "A", whose composition is set forth in Table 2, was used, a composite oxide powder was prepared in the same manner as Comparative Example No. 1.

Similarly to Comparative Example No. 1, the resulting composite oxide powder comprised agglomerated particle, which had an average particle diameter of 10 $\mu$m or less. The composite oxide powder was observed with an FE-TEM, and was analyzed by an EPMA. As a result, similarly to Example No. 12, the agglomerated particles were found to be constituted mainly by four primary particles, which had an average diameter of 10 nm or less, and which were dispersed substantially uniformly. According to the results obtained by the EPMA analysis, the agglomerated particles had a substantially uniform metallic element distribution from the surface side to the inner portion.

The resultant composite oxide powder was used to prepare a catalyst of Comparative Example No. 3 in the same manner as Example No. 1.

COMPARATIVE EXAMPLE NO. 4

Except that a titanium tetrachloride solution was used as a Ti source, and that only an aqueous solution "A", whose composition is set forth in Table 2, was used, a composite oxide powder was prepared in the same manner as Comparative Example No. 1.

The resulting composite oxide powder comprised agglomerated particle, which had an average particle diameter of 10 $\mu$m or less. The composite oxide powder was observed with an FE-TEM, and was analyzed by an EPMA. As a result, the agglomerated particles were found to be constituted mainly by five primary particles, which had an average diameter of 10 nm or less, and which were dispersed substantially uniformly. First primary particles were composed of $ZrO_2$—$TiO_2$—$La_2O_3$. Second primary particles were composed of $Al_2O_3$. Third primary particles were composed of $Al_2O_3$—$La_2O_3$. Fourth primary particles were composed of $TiO_2$. Fifth primary particles were composed of $ZrO_2$. According to the results obtained by the EPMA analysis, the agglomerated particles had a substantially uniform metallic element distribution from the surface side to the inner portion.

The resultant composite oxide powder was used to prepare a catalyst of Comparative Example No. 4 in the same manner as Example No. 1.

(3) Catalysts for Purifying Exhaust Gas Employing Supports Made from Al—Ce—La-based Composite Oxide Powders Table 3 summarizes the compositions of aqueous solutions, which were used to produce composite oxide powders of Example Nos. 16 through 19 and Comparative Example Nos. 5 and 6.

TABLE 3

|  | Included Metallic Elements & Molar Ratios | | | | | |
|  | Aq. Solution "A" | | | Aq. Solution "B" | | |
|  | Al | Ce | La | Al | Ce | La |
| --- | --- | --- | --- | --- | --- | --- |
| Ex. #16 | 1 | 5 | — | 1 | — | 0.03 |
| Ex. #17 | 1 | — | 0.03 | 1 | 5 | — |
| Ex. #18 | 1 | 5 | — | 1 | — | — |
| Ex. #19 | 1 | — | — | 1 | 5 | — |
| Comp. Ex. #5 | 2 | 5 | 0.03 | — | — | — |
| Comp. Ex. #6 | 2 | 5 | — | — | — | — |

EXAMPLE NO. 16

Except that an aqueous solution "A" and an aqueous solution "B", whose compositions are set forth in Table 3, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by three primary particles, which had an average diameter of 10 nm or less. First primary particles were composed of $Al_2O_3$—$La_2O_3$. Second primary particles were composed of $Al_2O_3$. Third primary particles were composed of $CeO_2$. The $Al_2O_3$—$La_2O_3$ was distributed more in the surface side of the agglomerated particles, and the $CeO_2$ was distributed more in the inner portion of the agglomerated particles.

According to the results obtained by the EPMA analysis, the surface-side $La_2O_3$ content was 60 mol % with respect to the total $La_2O_3$ content. The inner-portion $CeO_2$ content was 70 mol % with respect to the total $CeO_2$ content.

The resultant composite oxide powder was used to prepare a catalyst of Example No. 16 in the same manner as Example No. 1.

EXAMPLE NO. 17

Except that an aqueous solution "A" and an aqueous solution "B", whose compositions are set forth in Table 3, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by three primary particles, which had an average diameter of 10 nm or less. First primary particles were composed of $Al_2O_3$—$La_2O_3$. Second primary particles were composed of $Al_2O_3$. Third primary particles were composed of $CeO_2$. The $CeO_2$ was distributed more in the surface side of the agglomerated particles, and the $Al_2O_3$—$La_2O_3$ was distributed more in the inner portion of the agglomerated particles.

According to the results obtained by the EPMA analysis, the inner-portion $La_2O_3$ content was 60 mol % with respect to the total $La_2O_3$ content. The surface-side $CeO_2$ content was 70 mol % with respect to the total $CeO_2$ content.

The resultant composite oxide powder was used to prepare a of Example No. 17 in the same manner as Example No. 1.

EXAMPLE NO. 18

Except that an aqueous solution "A" and an aqueous solution "B", whose compositions are forth in Table 3, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$. The $CeO_2$ was distributed more in the inner portion of the agglomerated particles, and the $Al_2O_3$ was distributed more in the surface side of the agglomerated particles.

According to the results obtained by the EPMA analysis, the surface-side $Al_2O_3$ content was 65 mol % with respect to the total $Al_2O_3$ content. The inner-portion $CeO_2$ content was 65 mol % with respect to the total $CeO_2$ content.

The resultant composite oxide powder was used to prepare a catalyst of Example No. 17 in the same manner as Example No. 1.

EXAMPLE NO. 19

Except that an aqueous solution "A" and an aqueous solution "B", whose commpositions are set forth in Table 3, were used, a composite oxide powder was prepared in the same manner as Example No. 1.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$. The $CeO_2$ was distributed more in the surface side of the agglomerated particles, and the $Al_2O_3$ was distributed more in the inner portion of the agglomerated particles.

According to the results obtained by the EPMA analysis, the inner inner-portion $Al_2O_3$ content was 60 mol % with respect to the total $Al_2O_3$ content. The surface-side $CeO_2$ content was 60 mol % with respect to the total $CeO_2$ content.

The resultant composite oxide powder was used to prepare a catalyst of Example No. 19 in the same manner as Example No. 1.

COMPARATIVE EXAMPLE NO. 5

Except that only an aqueous solution "A", whose composition is set forth in Table 3, was used, a composite oxide powder was prepared in the same manner as Comparative Example No. 1. The resulting composite oxide powder was observed with an FE-TEM, and was analyzed by an EPMA.

As a result, the composite oxide powder was found to comprise agglomerated particles, which had an average particle diameter of 10 μm or less. The agglomerated particles were constituted mainly by four primary particles, which had an average diameter of 10 nm or less, and which were dispersed substantially uniformly. First primary particles were composed of $Al_2O_3$. Second primary particles were composed of $CeO_2$. Third primary particles were composed of $Al_2O_3$—$CeO_2$. Fourth primary particles were composed of $CeO_2$—$La_2O_3$. According to the results obtained by the EPMA analysis, the agglomerated particles had a substantially uniform metallic element distribution from the surface side to the inner portion.

The resultant composite oxide powder was used to prepare a catalyst of Comparative Example No. 5 in the same manner as Example No. 1.

COMPARATIVE EXAMPLE NO. 6

Except that only an aqueous solution "A", whose composition is set forth in Table 3, was used, a composite oxide powder was prepared in the same manner as Comparative Example No. 1. The resulting composite oxide powder was observed with an FE-TEM, and was analyzed by an EPMA. As a result, the composite oxide powder was found to comprise agglomerated particles, which had an average particle diameter of 10 μm or less. The agglomerated particles were constituted mainly by two primary particles, which had an average diameter of 10 nm or less, and which were dispersed substantially uniformly. First primary particles were composed of $Al_2O_3$. Second primary particles were composed of $CeO_2$. According to the results obtained by the EPMA analysis, the agglomerated particles had a substantially uniform metallic element distribution from the surface side to the inner portion.

The resultant composite oxide powder was used to prepare a catalyst of Comparative Example No. 6 in the same manner as Example No. 1.

(4) Catalysts for Purifying Exhaust Gas Employing Supports Made from Al—Ce—Zr—Y-based Composite Oxide Powders Table 4 summarizes the compositions of aqueous solutions, which were used to produce composite oxide powders of Example Nos. 20 through 27 and Comparative Example Nos. 7 and 8.

TABLE 4

| | Included Metallic Elements & Molar Ratios | | | | | | | | | | | | | | |
|---|---|---|---|---|---|---|---|---|---|---|---|---|---|---|---|
| | Aq. Solution "A" | | | | | Aq. Solution "B" | | | | | Aq. Solution "C" | | | | |
| | Al | Ce | Zr | La | Y | Al | Ce | Zr | La | Y | Al | Ce | Zr | La | Y |
| Ex. #20 | 0.4 | 1 | — | — | — | — | — | 0.6 | — | 0.4 | — | — | — | — | — |
| Ex. #21 | — | — | 0.6 | — | 0.4 | 1 | 0.4 | — | — | — | — | — | — | — | — |
| Ex. #22 | 0.2 | 1 | — | — | — | 0.2 | — | 0.6 | — | 0.4 | — | — | — | — | — |
| Ex. #23 | 0.2 | — | 0.6 | — | 0.4 | 0.2 | 1 | — | — | — | — | — | — | — | — |
| Ex. #24 | 0.2 | 1 | — | — | — | 0.2 | — | — | 0.01 | — | — | — | 0.6 | — | 0.4 |
| Ex. #25 | — | — | 0.6 | — | 0.4 | 0.2 | — | — | 0.01 | — | 0.2 | 1 | — | — | — |
| Ex. #26 | 0.2 | 1 | — | — | — | 0.1 | — | — | 0.01 | — | 0.1 | — | 0.6 | — | 0.4 |
| Ex. #27 | 0.5 | — | 0.6 | — | 0.4 | 0.1 | — | — | 0.01 | — | 0.2 | 1 | — | — | — |
| C. Ex. #7 | 0.4 | — | 0.6 | — | 0.4 | — | — | — | — | — | — | — | — | — | — |
| C. Ex. #8 | 0.4 | 1 | 0.6 | 0.01 | 0.4 | — | — | — | — | — | — | — | — | — | — |

EXAMPLE NO. 20

Except that yttrium nitrate hexa-hydrate ($Y(NO_3)_3 \cdot 6H_2O$) was used as a Y source, and that an aqueous solution "A" and an aqueous solution "B", whose compositions are set forth in Table 4, were used, a composite oxide powder was prepared in the same manner as Example No. 1. The resulting composite oxide powder was observed with an FE-TEM, and was analyzed by an EPMA. As a result, it was found to comprise agglomerated particles, which had an average particle diameter of about 10 μm. The agglomerated particles were constituted mainly by four primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $ZrO_2$—$Y_2O_3$. The $CeO_2$ was distributed more in the inner portion of the agglomerated particles, and the fourth primary particles, being composed of $ZrO_2$—$Y_2O_3$, were distributed more in the surface side of the agglomerated particles.

According to the results obtained by the EPMA analysis, the inner-portion $CeO_2$ content was 65 mol % with respect to the total $CeO_2$ content. The surface-side $Y_2O_3$ content was 65 mol % with respect to the total $Y_2O_3$ content.

The resultant composite oxide powder was used to prepare a catalyst of Example No. 20 in the same manner as Example No. 1.

EXAMPLE NO. 21

Except that yttrium nitrate hexa-hydrate was used as a Y source, and that an aqueous solution "A" and an aqueous solution "B", whose compositions are set forth in Table 4, were used, a composite oxide powder was prepared in the same manner as Example No. 1. The resulting composite oxide powder was observed with an FE-TEM, and was analyzed by an EPMA. As a result, it was found to comprise agglomerated particles, which had an an average particle diameter of about 10 μm. The agglomerated particles were constituted mainly by four primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $ZrO_2$—$Y_2O_3$. The $CeO_2$ was distributed more in the surface side of the agglomerated particles, and the fourth primary particles, being composed of $ZrO_2$—$Y_2O_3$, were distributed more in the inner portion of the agglomerated particles.

According to the results obtained by the EPMA analysis, the surface-side $CeO_2$ content was 70 mol % with respect to the total $CeO_2$ content. The inner-portion $Y_2O_3$ content was 65 mol % with respect to the total $Y_2O_3$ content.

The resultant composite oxide powder was used to prepare a catalyst of Example No. 21 in the same manner as Example No. 1.

EXAMPLE NO. 22

Except that yttrium nitrate hexa-hydrate was used as a Y source, and that an aqueous solution "A" and an aqueous solution "B", whose compositions are set forth in Table 4, were used, a composite oxide powder was prepared in the same manner as Example No. 1. The resulting composite oxide powder was observed with an FE-TEM, and was analyzed by an EPMA. As a result, it was found to comprise agglomerated particles, which had an average particle diameter of about 10 μm. The agglomerated particles were constituted mainly by four primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $ZrO_2$—$Y_2O_3$. The $CeO_2$ was distributed more in the inner portion of the agglomerated particles, and the fourth primary particles, which were composed of $ZrO_2$—$Y_2O_3$, were distributed more in the surface side of the agglomerated particles.

According to the results obtained by the EPMA analysis, the inner-portion $CeO_2$ content was 65 mol % with respect to the total $CeO_2$ content. The surface-side $Y_2O_3$ content was 60 mol % with respect to the total $Y_2O_3$ content.

The resultant composite oxide powder was used to prepare a catalyst of Example No. 22 in the same manner as Example No. 1.

EXAMPLE NO. 23

Except that yttrium nitrate hexa-hydrate was used as a Y source, and that an aqueous solution "A" and an aqueous solution "B", set forth in Table 4, were used, a composite oxide powder was prepared in the same manner as Example No. 1. The resulting composite oxide powder was observed with an FE-TEM, and was analyzed by an EPMA. As a result, it was found to comprise agglomerated particles, which had an average particle diameter of about 10 μm. The agglomerated particles were constituted mainly by four primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $ZrO_2$—$Y_2O_3$. The $CeO_2$ was distributed more on the surface side of the agglomerated particles, and the fourth primary particles, being composed of $ZrO_2$—$Y_2O_3$, were distributed more in the inner portion of the agglomerated particles.

According to the results obtained by the EPMA analysis, the surface-side $CeO_2$ content was 65 mol % with respect to the total $CeO_2$ content. The inner-portion $Y_2O_3$ content was 70 mol % with respect to the total $Y_2O_3$ amount.

The resultant composite oxide powder was used to prepare a catalyst of Example No. 22 in the same manner as Example No. 1.

EXAMPLE NO. 24

An aqueous solution "A" was prepared by solving 0.2 mol of aluminum nitrate nona-hydrate, 1.0 mol of cerium nitrate hexa-hydrate and 124 g of hydrogen peroxide water, having a concentration of 30% by weight (equivalent to a content of 1.1 mol as $H_2O_2$), in 1,500 cm³ of pure water.

Further, an aqueous solution "B" was prepared by solving 0.2 mol of aluminum nitrate nona-hydrate and 0.01 mol of lanthanum nitrate hexa-hydrate in 500 cm³ of pure water.

Furthermore, an aqueous solution "C" was prepared by solving 0.6 mol of zirconyl oxynitrate di-hydrate and 0.4 mol of yttrium nitrate in 1,000 cm³ of pure water.

Moreover, 1,000 cm³ of a neutralizing aqueous solution was prepared which included $NH_3$ in an amount as much as 1.2 times by mol for neutralizing all the nitric acid radicals.

A total amount of the neutralizing aqueous solution was put in a reaction container, and the aqueous solution "A" was added thereto while stirring the neutralizing aqueous solution with a mechanical stirrer and a homogenizer. The mixture was kept stirred as it was for 1 hour. Subsequently, the aqueous solution "B" was added thereto, and the mixture was further stirred for 1 hour. Thereafter, the aqueous solution "C" was added to the mixture, and the mixture was furthermore stirred for 1 hour. The resulting precipitates (i.e., oxide precursors) were filtered and washed, were dried in air at 300° C. for 3 hours, and were further calcined preliminarily at 500° C. for 1 hour. The resultant preliminarily-calcined powder was calcined in air at 700° C. for 5 hours, and was pulverized with a wet-type ball mill so that the median diameter was 10 μm approximately (i.e., D50≈10 μm). Thus, a composite oxide powder was prepared.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by five primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $Al_2O_3$—$La_2O_3$. Fifth primary particles are composed of $ZrO_2$—$Y_2O_3$. The $Al_2O_3$, $CeO_2$ and $Al_2O_3$—$La_2O_3$ were distributed more in the inner portion of the agglomerated particles. The fifth primary particles, being composed of $ZrO_2$—$Y_2O_3$, were distributed more in the surface side of the agglomerated particles.

According to the results obtained by the EPMA analysis, the inner-portion $CeO_2$ content was 70 mol % with respect to the total $CeO_2$ content. The surface-side $Y_2O_3$ content was 70 mol % with respect to the total $Y_2O_3$ content.

The resultant composite oxide powder was used to prepare a catalyst of Example No. 24 in the same manner as Example No. 1.

EXAMPLE NO. 25

Except that an aqueous solution "A", an aqueous solution "B" and an aqueous solution "C", whose compositions are set forth in Table 4, a composite oxide was prepared in the same manner as Example No. 24. The resulting composite oxide powder was observed with an FE-TEM, and was analyzed by an EPMA. As a result, it was found to comprise agglomerated particles, which had an average particle diameter of about 10 μm. The agglomerated particles were constituted mainly by five primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $Al_2O_3$—$La_2O_3$. Fifth primary particles are composed of $ZrO_2$—$Y_2O_3$. The $CeO_2$ was distributed more in the surface side of the agglomerated particles, the fifth primary particles, being composed of $ZrO_2$—$Y_2O_3$, were distributed more in the inner portion of the agglomerated particles.

According to the results obtained by the EPMA analysis, the surface-side $CeO_2$ content was 65 mol % with respect to the total $CeO_2$ content. The inner-portion $Y_2O_3$ content was 65 mol % with respect to the total $Y_2O_3$ content.

The resultant composite oxide powder was used to prepare a catalyst of Example No. 25 in the same manner as Example No. 1.

EXAMPLE NO. 26

Except that an aqueous solution "A", an aqueous solution "B" and an aqueous solution "C", whose compositions are set forth in Table 4, were used, a composite oxide powder was prepared in the same manner as Example No. 24. The resulting composite oxide powder was observed with an FE-TEM, and was analyzed by an EPMA. As a result, it was found to comprise agglomerated particles, which had an average particle diameter of about 10 µm. The agglomerated particles were constituted mainly by five primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $Al_2O_3$—$La_2O_3$. Fifth primary particles were composed of $ZrO_2$—$Y_2O_3$. The $CeO_2$ was distributed more in the inner portion of the agglomerated particles, and the fifth primary particles, being composed of $ZrO_2$—$Y_2O_3$, were distributed more in the surface side of the agglomerated particles.

According to the results obtained by the EPMA analysis, the inner-portion $CeO_2$ content was 70 mol % with respect to the total $CeO_2$ content. The surface-side $Y_2O_3$ content was 65 mol % with respect to the total $Y_2O_3$ content.

The resultant composite oxide powder was used to prepare a catalyst of Example No. 26 in the same manner as Example No. 1.

EXAMPLE NO. 27

Except that only an aqueous solution "A", an aqueous solution "B" and an aqueous solution "C", whose composition are set forth in Table 4, were used, a composite oxide powder was prepared in the same manner as Example No. 24. The resulting composite oxide powder was observed with an FE-TEM, and was analyzed by an EPMA. As a result, it was found to comprise agglomerated particles, which had an average particle diameter of about 10 µm. The agglomerated particles were constituted mainly by five primary particles, which had an average diameter of 10 nm or less. First primary particles were composed of $Al_2O_3$. Second primary particles were composed of $CeO_2$. Third primary particles were composed of $Y_2O_3$—$CeO_2$. Fourth primary particles were composed of $Al_2O_3$—$La_2O_3$. Fifth primary particles were composed of $ZrO_2$—$Y_2O_3$. The $CeO_2$ was distributed more in the surface side of the agglomerated particles, and the fifth primary particles, being composed of $ZrO_2$—$Y_2O_3$, were distributed more in the inner portion of the agglomerated particles.

According to the results obtained by the EPMA, the surface-side $CeO_2$ content was 70 mol % with respect to the total $CeO_2$ content. The inner-portion $Y_2O_3$ content was 60 mol % with respect to the total $Y_2O_3$ content.

The resultant composite oxide powder was used to prepare a catalyst of Example No. 27 in the same manner as Example No. 1.

COMPARATIVE EXAMPLE NO. 7

Except that only an aqueous solution "A", whose composition is set forth in Table 4, was used, a composite oxide powder was prepared in the same manner as Comparative Example No. 1. The resulting composite oxide powder was observed with an FE-TEM, and was analyzed by an EPMA. As a result, the composite oxide powder was found to comprise agglomerated particles, which had an average particle diameter of 10 µm or less. The agglomerated particles were constituted mainly by two primary particles, which had an average diameter of 10 nm or less, and which were dispersed substantially uniformly. First primary particles were composed of $Al_2O_3$. Second primary particles were composed of $CeO_2$—$ZrO_2$—$Y_2O_3$. According to the results obtained by the EPMA analysis, the agglomerated particles had a substantially uniform metallic element distribution from the surface side to the inner portion.

The resultant composite oxide powder was used to prepare a catalyst of Comparative Example No. 7 in the same manner as Example No. 1.

COMPARATIVE EXAMPLE NO. 8

Except that only an aqueous solution "A", whose composition is set forth in Table 4, was used, a composite oxide powder was prepared in the same manner as Comparative Example No. 1. The resulting composite oxide powder was observed with an FE-TEM, and was analyzed by an EPMA. As a result, the composite oxide powder was found to comprise agglomerated particles, which had an average particle diameter of 10 µm or less. The agglomerated particles were constituted mainly by two primary particles, which had an average diameter of 10 nm or less, and which were dispersed substantially uniformly. First primary particles were composed of $Al_2O_3$—$La_2O_3$. Second primary particles were composed of $CeO_2$—$ZrO_2$—$La_2O_3$—$Y_2O_3$. According to the results obtained by the EPMA analysis, the agglomerated particles had a substantially uniform metallic element distribution from the surface side to the inner portion.

The resultant composite oxide powder was used to prepare a catalyst of Comparative Example No. 8 in the same manner as Example No. 1.

EXAMINATION AND EVALUATION

The respective catalysts were cut out into a test sample configuration, which had a diameter of 20 mm, a length of 41 mm and a volume of 35 cm$^3$. The test samples were subjected to a durability test, in which model gases were flowed through them, respectively.

Regarding the catalysts of Example Nos. 1 through 11 and Comparative Example Nos. 1 and 2, the respective catalysts were subjected to a durability test, in which they were held at 1,050° C. for 10 hours while alternately flowing model gases, set forth in Table 5, under the conditions, set forth in Table 5, through the respective catalysts for every 10 seconds.

TABLE 5

| | CO (75%)/ H$_2$ (25%) (%) | O$_2$ (%) | CO$_2$ (%) | H$_2$O (%) | N$_2$ (%) | Fluctuating Time (sec.) | Flow Rate (L/min.) |
|---|---|---|---|---|---|---|---|
| Rich | 1 | 0 | 3 | 3 | B* | 10 | 20 |
| Lean | 1 | 4 | 3 | 3 | B* | 10 | 20 |

Note: B* stands for "Balance".

Regarding the catalysts of Example Nos. 12 through 15 and Comparative Example Nos. 3 and 4, the respective catalysts were subjected to a durability test, in which they were held at 800° C. for 5 hours while alternately flowing model gases, set forth in Table 6, under the conditions, set forth in Table 6, through the respective catalysts for every 10 seconds.

TABLE 6

| | CO (75%)/ H$_2$ (25%) (%) | O$_2$ (%) | CO$_2$ (%) | SO$_2$ (ppm) | H$_2$O (%) | N$_2$ (%) | Fluctuating Time (sec.) | Flow Rate (L/min.) |
|---|---|---|---|---|---|---|---|---|
| Rich | 1 | 0 | 3 | 200 | 3 | B* | 10 | 20 |
| Lean | 1 | 4 | 3 | 200 | 3 | B* | 10 | 20 |

Note: B* stands for "Balance".

Regarding the catalysts of Example Nos. 16 through 19 and Comparative Example Nos. 5 and 6, the respective catalysts were subjected to a durability test, in which they were held at 800° C. for 5 hours while alternately flowing model gases, set forth in Table 5, under the conditions, set forth in Table 5, through the respective catalysts for every 10 seconds.

Regarding the catalysts of Example Nos. 20 through 27 and Comparative Example Nos. 7 and 8, the respective catalysts were subjected to a durability test, in which they were held at 800° C. for 5 hours while flowing a model gases, set forth in Table 7, under the condition, set forth in Table 7, through the respective catalysts.

TABLE 7

| | CO (75%)/ H$_2$ (25%) (%) | O$_2$ (%) | CO$_2$ (%) | H$_2$O (%) | N$_2$ (%) | Flow Rate (L/min.) |
|---|---|---|---|---|---|---|
| Lean | 1 | 4 | 3 | 3 | B* | 20 |

Note: B* stands for "Balance".

After the durability tests, the respective catalysts were placed in an ordinary-pressure fixed-bed flow-system catalyst testing apparatus. Regarding Example Nos. 1 through 19 and Comparative Example Nos. 1 through 6, the respective catalysts were heated in a range of from 100° C. to 400° C. By at a temperature increment rate of 10° C./min. while alternately flowing model gases, set forth in Table 8, under the conditions, set forth in Table 8, through the respective catalysts for every 1 second. Regarding Example Nos. 20 through 27 and Comparative Example Nos. 7 and 8, the respective catalysts were heated in a range of from 100° C. to 400° C. at a temperature increment rate of 10° C./min. while flowing a model gas, set forth in Table 9, under the condition, set forth in Table 9, through the respective catalysts.

TABLE 8

| | CO (75%)/ H$_2$ (25%) (%) | C$_3$H$_8$ (%) | NO$_x$ (%) | O$_2$ (%) | CO$_2$ (%) | H$_2$O (%) | N$_2$ | Fluctuating Time (sec.) | Flow Rate (L/min.) |
|---|---|---|---|---|---|---|---|---|---|
| Rich | 2 | 0.1 | 0.16 | 0.325 | 3 | 3 | B* | 1 | 20 |
| Lean | 1 | 0.1 | 0.16 | 1.325 | 3 | 3 | B* | 1 | 20 |

Note: B* stands for "Balance".

TABLE 9

| | CO (75%)/ H$_2$ (25%) (%) | C$_3$H$_8$ (%) | NO$_x$ (%) | O$_2$ (%) | CO$_2$ (%) | H$_2$O (%) | N$_2$ | Flow Rate (L/min.) |
|---|---|---|---|---|---|---|---|---|
| Lean | 1 | 0.1 | 0.16 | 0.325 | 3 | 3 | B* | 20 |

Note: B* stands for "Balance".

The respective catalysts were measured continuously for the HC, CO and NO$_x$ conversions when the temperature was raised. The temperatures, at which the HC, CO and NO$_x$ were purified by 50% (50% conversion temperatures), were determined, respectively. Among them, the activities difference was the most distinctive in the 50%-HC conversion temperature. Therefore, the results of the 50%-HC conversion temperature measurement are set forth in Table 10.

In addition, the respective catalysts were examined for the BET specific surface areas before and after the durability tests. The results of the examination are also set forth in Table 10. Note that, in Table 10, "Fresh" specifies the BET specific surface areas before the durability tests and "Aged" specifies the BET specific surface areas after the durability tests.

TABLE 10

|  | Metallic Elements Constituting Composite Oxide | BET S. S. A.* (m²/g) | | 50%-HC Conversion Temp. (° C.) |
| --- | --- | --- | --- | --- |
|  |  | Fresh | Aged |  |
| Ex. #1 | Al, Ce, Zr & La | 150 | 78 | 244 |
| Ex. #2 | Al, Ce, Zr & La | 155 | 83 | 261 |
| Ex. #3 | Al, Ce, Zr & La | 148 | 79 | 266 |
| Ex. #4 | Al, Ce, Zr & La | 145 | 79 | 261 |
| Ex. #5 | Al, Ce, Zr & La | 150 | 76 | 241 |
| Ex. #6 | Al, Ce, Zr & La | 147 | 75 | 248 |
| Ex. #7 | Al, Ce, Zr & La | 145 | 72 | 250 |
| Ex. #8 | Al, Ce & Zr | 151 | 72 | 258 |
| Ex. #9 | Al, Ce & Zr | 153 | 76 | 262 |
| Ex. #10 | Al, Ce & Zr | 156 | 75 | 268 |
| Ex. #11 | Al, Ce & Zr | 152 | 71 | 263 |
| Comp. Ex. #1 | Al, Ce, Zr & La | 140 | 65 | 272 |
| Comp. Ex. #2 | Al, Ce & Zr | 170 | 65 | 270 |
| Ex. #12 | Al, Zr & Ti | 145 | 84 | 237 |
| Ex. #13 | Al, Zr & Ti | 148 | 83 | 239 |
| Ex. #14 | Al, Zr, Ti & La | 160 | 87 | 232 |
| Ex. #15 | Al, Zr, Ti & La | 157 | 88 | 235 |
| Comp. Ex. #3 | Al, Zr & Ti | 150 | 72 | 245 |
| Comp. Ex. #4 | Al, Zr, Ti & La | 152 | 75 | 244 |
| Ex. #16 | Al, Ce & La | 81 | 52 | 205 |
| Ex. #17 | Al, Ce & Zr | 85 | 58 | 210 |
| Ex. #18 | Al & Ce | 80 | 50 | 212 |
| Ex. #19 | Al & Ce | 82 | 51 | 214 |
| Comp. Ex. #5 | Al, Ce & La | 71 | 40 | 218 |
| Comp. Ex. #6 | Al & Ce | 70 | 39 | 217 |
| Ex. #20 | Al, Ce, Zr & Y | 130 | 56 | 207 |
| Ex. #21 | Al, Ce, Zr & Y | 120 | 52 | 206 |
| Ex. #22 | Al, Ce, Zr & Y | 122 | 55 | 204 |
| Ex. #23 | Al, Ce, Zr & Y | 128 | 51 | 205 |
| Ex. #24 | Al, Ce, Zr, Y & La | 135 | 62 | 203 |
| Ex. #25 | Al, Ce, Zr, Y & La | 131 | 60 | 202 |
| Ex. #26 | Al, Ce, Zr, Y & La | 128 | 63 | 200 |
| Ex. #27 | Al, Ce, Zr, Y & La | 127 | 59 | 199 |
| Comp. Ex. #7 | Al, Ce, Zr & Y | 127 | 46 | 215 |
| Comp. Ex. #8 | Al, Ce, Zr, Y & La | 124 | 45 | 214 |

*"BET S. S. A." stands for "BET Specific Surface Area".

First of all, when Example No. 1 is compared with Comparative Example No. 1, Example No. 1 had a specific surface area, which was reduced by smaller extent than that of Comparative Example No. 1 after the durability test, and exhibited an extremely high heat resistance, though the support of the catalyst of Example No. 1 had the same composition as that of the support of the catalyst of Comparative Example No. 1. As a result, Example No. 1 exhibited the low 50%-HC conversion temperature after the durability test, and its high activity was maintained thereafter. This results from the arrangement that the support of Example No. 1 was produced by the successive co-precipitation process. The advantages were produced, because the La$_2$O$_3$ are included mainly in the Al$_2$O$_3$.

Further, when Example No. 2 is compared with Comparative Example No. 1 after the durability test, Example No. 2 exhibited a higher activity than Comparative Example No. 1. Accordingly, it is seen that the activities are hardly influenced by the order of depositing the precipitates by the successive co-precipitation process.

However, when Example No. 1 is compared with Example No. 2, Example No. 1 was superior to Example No. 2. Namely, in the successive co-precipitation process, it is understood that the first primary particles 12, which are composed of the Al$_2$O$_3$—La$_2$O$_3$ composite oxide, can desirably be distributed more in the surface side of the agglomerated particles 1, and the primary particles 11, which are composed of the CeO$_2$—ZrO$_2$ solid solution, can desirably be distributed more in the inner portion of the agglomerated particles 1, by first depositing the precipitates from an aqueous solution, which includes Al, Ce and Zr, and by thereafter depositing the precipitates from an aqueous solution, which includes Al and La.

Furthermore, when comparing Example No. 1, Example No. 2 and Example Nos. 3 through 7, it is apprehended that the Al content in the aqueous solution "A" can desirably be 0.5 or more by molar ratio when Ce/Zr=1/1 by molar ratio, and that the rest of Al can desirably be included in the aqueous solution "B". This is believed that the content of Al$_2$O$_3$, in which La$_2$O$_3$ is selectively solved to enhance the heat resistance, and the content of Al$_2$O$_3$, which intervenes to highly disperse the CeO$_2$—ZrO$_2$ solid solution, are well balanced.

Then, when Example Nos. 8 through 11 are compared with Comparative Example No. 2, Example Nos. 8 through 9 showed higher activities after the durability test than Comparative Example No. 2. It is apparent that the advantage resulted from the production of the supports by the successive co-precipitation process.

Subsequently, when Example No. 13 is compared with Comparative Example No. 3, Example No. 13 exhibited a higher activity after the durability test than Comparative Example No. 3. It is evident that the advantage resulted from the production of the support by the co-precipitation process. In Example No. 13, the ZrO$_2$—TiO$_2$ solid solution was distributed more in the surface side of the agglomerated particles. Thus, it is believed that the advantage resulted from the sulfur-poisoning suppression, which was brought about by the arrangement.

Moreover, when Example No. 12 is compared with Example No. 14, Example No. 14 had a higher activity after the durability test. The advantage derived from the arrangement that La was further included in the aqueous solution "B". Namely, it is believed that the advantage is effected in the following manner. For instance, by selectively solving La$_2$O$_3$ in Al$_2$O$_3$, the heat resistance of Al$_2$O$_3$ was enhanced, and the sulfur-poisoning resistance of the ZrO$_2$—TiO$_2$ solid solution was inhibited from decreasing.

While, Example No. 16 was superior to Comparative Example No. 5 in terms of the activity after the durability test, and Example No. 18 was superior to Comparative Example No. 6 in terms of the activity after the durability test. This advantage was apparently effected by producing the supports by the successive co-precipitation process. In Example No. 16 and Example No. 18, since the Al$_2$O$_3$ was distributed more in the surface side of the agglomerated particles, the superficial CeO$_2$ concentration was lowered. Consequently, it is believed that Rh was inhibited from deteriorating.

In addition, by comparing Example Nos. 16 through 19, it is appreciable that the heat resistance was improved by selectively solving the La$_2$O$_3$ in the Al$_2$O$_3$.

Still further, Example Nos. 20 through 23 were superior to Comparative Example No. 7 in terms of the activity after the durability test, and Example Nos. 24 through 27 were superior to Comparative Example No. 8 in terms of the activity after the durability test. It is evident that the advantage was derived from the production of the supports by the successive co-precipitation process. In Example Nos. 20 through 27, three oxides, i.e., $Al_2O_3$, $CeO_2$ and $ZrO_2$—$Y_2O_3$ composite oxide, were present independently. On the other hand, in Comparative Example Nos. 7 and 8, the $CeO_2$ was solved in the $ZrO_2$—$Y_2O_3$. Accordingly, it is believed that Comparative Example Nos. 7 and 8 exhibited low activities.

Then, when Example Nos. 20 through 23 are compared with Example Nos. 24 through 27, it is apparent that, by selectively solving the $La_2O_3$ in the $Al_2O_3$, the activities were upgraded much more after the durability test.

Still furthermore, Example Nos. 20 through 23 showed substantially equal activities after the durability test, and Example Nos. 24 through 27 also showed substantially equal activities. Consequently, it is understood that the order of the precipitates deposition did not matter in the successive co-precipitation process.

(5) Two-layered Structure Catalyst for Purifying Exhaust Gas Table 11 summarizes the compositions of aqueous solutions, which were used to produce composite oxide powders employed in Example Nos. 28 through 37 and Comparative Example Nos. 9 and 10.

TABLE 11

| | Included Metallic Elements & Molar Ratios | | | | | | | |
|---|---|---|---|---|---|---|---|---|
| | Aq. Solution "A" | | | | Aq. Solution "B" | | | |
| | Al | Ce | Zr | La | Al | Ce | Zr | La |
| Ex. #28 | 0.25 | 0.25 | 0.25 | — | 0.25 | — | — | — |
| Ex. #29 | 0.25 | 0.25 | 0.25 | — | 0.25 | — | — | 0.01 |
| Ex. #30 | 0.10 | 0.25 | 0.25 | — | 0.40 | — | — | — |
| Ex. #31 | 0.40 | 0.25 | 0.25 | — | 0.10 | — | — | — |
| Ex. #32 | 0.25 | 0.25 | 0.25 | — | 1.00 | — | — | — |
| Ex. #33 | 0.25 | 0.25 | 0.25 | — | 2.00 | — | — | — |
| Ex. #34 | 1.25 | 0.25 | 0.25 | — | 1.00 | — | — | — |
| Ex. #35 | 2.00 | 0.25 | 0.25 | — | 0.25 | — | — | — |
| Ex. #36 | 0.25 | — | — | — | 0.25 | 0.25 | 0.25 | — |
| Ex. #37 | 0.25 | 0.25 | 0.25 | — | 0.25 | — | — | — |
| Comp. Ex. #9 | 0.50 | 0.25 | 0.25 | — | — | — | — | — |
| Comp. Ex. #10 | 0.50 | 0.25 | 0.25 | 0.01 | — | — | — | — |

EXAMPLE NO. 28

As set forth-in Table 11, an aqueous solution "A" was prepared by solving 0.25 mol of aluminum nitrate nona-hydrate, 0.25 mol of cerium nitrate hexa-hydrate, 0.25 mol of zirconyl oxynitrate di-hydrate and 31 cm$^3$ of hydrogen peroxide water, having a concentration of 30% by weight (equivalent to a content of 0.275 mol as $H_2O_2$), in 700 cm$^3$ of pure water.

While, an aqueous solution "B" was prepared by solving 0.25 mol of aluminum nitrate nona-hydrate in 500 cm$^3$ of pure water.

Moreover, 500 cm$^3$ of an aqueous solution was prepared which included $NH_3$ in an amount as much as 1.2 times by mol for neutralizing all the nitric acid radicals, and was employed as aneutralizing solution.

A total amount of the neutralizing aqueous solution was put in a beaker, and the aqueous solution "A" was added thereto while stirring the neutralizing aqueous solution with a mechanical stirrer and a homogenizer. The mixture was kept stirred as it was for 1 hour. Thereafter, the aqueous solution "B" was added thereto, and the mixture was further stirred for 1 hour. The resulting precipitates (i.e., oxide precursors) were filtered and washed, were dried in air at 300° C. for 3 hours, and were further calcined preliminarily at 500° C. for 1 hour. The resultant preliminarily-calcined powder was calcined in air at 700° C. for 5 hours, and was pulverized with a wet-type ball mill so that the median diameter was 10 μm approximately (i.e., D50≈10 μm). Thus, a composite oxide powder was prepared.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, which were composed of $CeO_2$—$ZrO_2$, were distributed more in the inner portion of the agglomerated particles.

According to the results obtained by the EPMA analysis, the inner-portion $CeO_2$ content was 60 mol % with respect to the total $CeO_2$ content. The surface-side $Al_2O_3$ content was 60 mol % with respect to the total $Al_2O_3$ content.

200 g of the composite oxide powder, 200 g of an activated alumina powder, 42 g of aluminum nitrate hexa-hydrate, 7.2 g of a pseud-boehmite and 300 g of pure water were pulverized and mixed with a wet-type ball mill. The activated alumina powder exhibited a specific surface area of 190 m$^2$/g. Thus, a slurry was prepared which had a median diameter D50=7 μm. The resultant slurry was coated in an amount of 160 g/L on a honeycomb support substrate, which was made from cordierite and which had 400 cells per square inch (i.e., in$^2$). After the honeycomb support substrate was dried by blowing an air to it at 110° C., it was calcined at 600° C. for 1 hour, thereby forming a coating layer. Depending on the requirements, the coating operation was carried out for a plurality of times.

Thereafter, by using a $Pt(NO_2)_2(NH_3)_2$ aqueous solution, Pt was loaded in the coating layer. The honeycomb support substrate, which had the coating layer with loaded Pt, was calcined in air at 300° C. for 1 hour. Thus, a first catalytic layer was prepared. Pt was loaded in an amount of 1.5 g/L.

Subsequently, a θ-$Al_2O_3$ powder was prepared whose BET specific surface area was 75 m$^2$/g. Then, by using a rhodium nitrate aqueous solution, Rh was loaded on the θ-$Al_2O_3$ powder. The θ-$Al_2O_3$ powder was calcined in air at 300° C. for 1 hour. The loading amount of Rh was 0.3 g with respect to 40 g of the θ-$Al_2O_3$ powder. Then, 100 g of the resulting catalytic powder, 30 g of aluminum nitrate hexa-hydrate, 5 g of a pseud-boehmite and 140 g of pure water were pulverized and mixed with a wet-type ball mill. Thus, a slurry was prepared which had a median diameter D50=7 μm. The resultant slurry was coated on a surface of the first catalytic layer, and was calcined at 600° C. for 1 hour, thereby forming a second catalytic layer. The second catalytic layer was formed in an amount of 40 g with respect to 1 L of the honeycomb support substrate.

EXAMPLE NO. 29

Except that, as set forth in Table 11, an aqueous solution "B" was used which was prepared by solving 0.25 mol of aluminum nitrate nona-hydrate and 0.01 mol of lanthanum nitrate hexa-hydrate in 500 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$, were distributed more in the inner portion of the agglomerated particles.

Then, the first catalytic layer and the second catalytic layer were formed in the same fashion as Example No. 28.

EXAMPLE NO. 30

Except that, as set forth in Table 11, an aqueous solution "A" was used which was prepared by solving 0.40 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 700 cm³ of pure water, and that an aqueous solution "B" was used which was prepared by solving 0.10 mol of aluminum nitrate nona-hydrate in 500 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$, were distributed more in the inner portion of the agglomerated particles.

Then, the first catalytic layer and the second catalytic layer were formed in the same fashion as Example No. 28.

EXAMPLE NO. 31

Except that, as set forth in table 11, an aqueous solution "A" was used which was prepared by solving 0.40 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 700 cm³ of pure water, and that as an aqueous solution "B" was used which was prepared by solving 0.10 mol of aluminum nitrate nona-hydrate in 500 cm³ of pure water, a composite oxide powder was prepared in the same manner as Example No. 28.

The resulting composite oxide powder was observed with an FE-TEM, and was anylyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$, were distributed more in the inner portion of the agglomerated particles.

Then, the first catalytic layer and the second catalytic layer were formed in the same fashion as Example No. 28.

EXAMPLE NO. 32

Except that, as set forth in Table 11, an aqueous solution "B" was used which was prepared by solving 1.00 mol of aluminum nitrate nona-hydrate in 500 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particle, being composed of $CeO_2$—$ZrO_2$, were distributed more in the inner portion of the agglomerated particles.

Then, except that the first catalytic layer was formed so as to include 110 g/L of the resultant composite oxide powder and 50 g/L of the activated alumina powder, the first catalytic layer and the second catalytic layer were formed in the same fashion as Example No. 28.

EXAMPLE NO. 33

Except that, as set forth in Table 11, an aqueous solution "B" was used which was prepared by solving 2.00 mol of aluminum nitrate nona-hydrate in 500 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$, were distributed more in the inner portion of the agglomerated particles.

Then, except that the first catalytic layer was formed without using the activated alumina powder, and that it was formed so as to include 160 g/L of the resultant composite oxide powder, the first catalytic layer and the second catalytic layer were formed in the same fashion as Example No. 28.

EXAMPLE NO. 34

Except that, as set forth in Table 11, an aqueous solution "A" was used which was prepared by solving 1.25 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 700 cm³ of pure water, and that an aqueous solution "B" was used which was prepared by solving 1.00 mol of aluminum nitrate nona-hydrate in 500 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm more less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particle, being composed of $CeO_2$—$ZrO_2$, were distributed more in the inner portion of the agglomerated particles.

Then, except that the first catalytic layer was formed without using the activated alumina powder, and that it was formed so as to include 160 g/L of the resultant composite oxide powder, the first catalytic layer and the second catalytic layer were formed in the same fashion as Example No. 28.

EXAMPLE NO. 35

Except that, as set forth in Table 11, an aqueous solution was used which was prepared by solving 2.00 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 700 cm³ of pure water, a composite oxide powder was prepared in the same manner as Example No. 28.

The resulting composite powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$ were distributed more in the inner portion of the agglomerated particles.

Then, except that the first catalytic layer was formed without using the activated alumina powder, and that it was formed so as to include 160 g/L of the resultant composite oxide powder, the first catalytic layer and the second catalytic layer were formed in the same fashion as Example No. 28.

EXAMPLE NO. 36

Except that, as set forth in Table 11, an aqueous solution "A" was used which was prepared by solving 0.25 mol of aluminum nitrate nona-hydrate in 500 cm³ of pure water, and that an aqueous solution "B" was used which was prepared by solving 0.25 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 700 cm³ of pure water, a composite oxide powder was prepared in the same manner as Example No. 28.

The resulting composite oxide powder was observed with an FE-TEM, and was analyzed by an EPMA. As a result, it was found to comprise agglomerated particles, which had an average particle diameter of about 10 μm. The agglomerated particles were constituted mainly by two primary particles, which had an average diameter of 10 nm or less. First primary particles were composed of $Al_2O_3$. Second primary particles were composed of $CeO_2$—$ZrO_2$. The first primary particles, being composed of $Al_2O_3$, were distributed more in the surface side of the agglomerated particles, and the second primary particles, being composed of $CeO_2$—$ZrO_2$, were distributed more in the inner portion of the agglomerated particles.

Then, the first catalytic layer and the second catalytic layer were formed in the same fashion as Example No. 28.

EXAMPLE NO. 37

Except that the second catalytic layer was prepared by using a hollow $Al_2O_3$ powder instead of the θ-alumina powder, and that it was formed in an amount of 30 g/L, the first catalytic layer and the second catalytic layer were prepared in the same manner as Example No. 28.

COMPARATIVE EXAMPLE NO. 9

Except that, as set forth in Table 11, an aqueous solution "A" was used which was prepared by solving 0.50 mol of aluminum nitrate nona-hydrate, 0.25 mol of cerium nitrate hexa-hydrate, 0.25 mol of zirconyl oxynitrate di-hydrate and 31 cm³ of hydrogen peroxide water, having a concentration of 30% by weight (equivalent to a content of 0.275 mol as $H_2O_2$), in 1,200 cm³ of pure water, that no aqueous solution "B" was used, and that the resulting aqueous solution "A" was added to the neutralizing aqueous solution at once, a composite oxide powder was prepared in the same manner as Example No. 28.

The resulting composite powder was observed with an FE-TEM, and was analyzed by an EPMA. As a result, the composite oxide powder was found to comprise agglomerated particles, which had an average particle diameter of about 10 μm. The agglomerated particles were constituted mainly by two primary particles, which had an average diameter of 10 nm or less, and which were dispersed substantially uniformly. First primary particles were composed of $Al_2O_3$. Second primary particles were composed of $CeO_2$—$ZrO_2$. According to the results obtained by the EPMA analysis, the agglomerated particles had a substantially uniform metallic element distribution from the surface side to the inner portion.

Then, the resultant composite oxide was used to form the first catalytic layer and the second catalytic layer in the same fashion as Example No. 28.

COMPARATIVE EXAMPLE NO. 10

Except that, as set forth in Table 11, an aqueous solution "A" was used which was prepared by solving 0.50 mol of aluminum nitrate nona-hydrate, 0.25 mol of cerium nitrate hexa-hydrate, 0.25 mol of zirconyl oxynitrate di-hydrate, 0.01 mol of lanthanum nitrate hexa-hydrate and 31 cm³ of hydrogen peroxide water, having a concentration of 30% by weight (equivalent to a content of 0.275 mol as $H_2O_2$), in 1,200 cm³ of pure water, that no aqueous solution "B" was used, and that the resulting aqueous solution "A" was added to the neutralizing aqueous solution at once, a composite oxide powder was prepared in the same manner as Example No. 28.

The resulting composite powder was observed with an FE-TEM, and was analyzed by an EPMA. As a result, the composite oxide powder was found to comprise agglomerated particles, which had an average particle diameter of about 10 μm. The agglomerated particles were constituted mainly by two primary particles, which had an average diameter of 10 nm or less, and which were dispersed substantially uniformly. First primary particles were composed of $Al_2O_3$—$La_2O_3$. Second primary particles were composed of $CeO_2$—$ZrO_2$—$La_2O_3$. According to the results obtained by the EPMA analysis, the agglomerated particles had a substantially uniform metallic element distribution from the surface side to the inner portion.

temperature was increased. The temperatures (e.g., 50% conversion temperature), at which each of HC, CO and NO, was purified by 50%, were determined, respectively. The results are summarized in Table 13.

TABLE 12

| | $C_3H_8$ (C %) | CO (%) | NO (%) | $CO_2$ (%) | $O_2$ (%) | $H_2O$ (%) | $N_2$ | Alternating Time (sec.) |
|---|---|---|---|---|---|---|---|---|
| Rich | 0.1 | 3 | 0.16 | 3 | 0.325 | 3 | Balance | 1 |
| Lean | 0.1 | 3 | 0.16 | 3 | 1.325 | 3 | Balance | 1 |

Note:
The total flow rate was 20 L/min.

TABLE 13

| | 1st C.L.*¹ (L.L.*²) | | | 2nd C.L.*¹ (U.L.*³) | 50% C.T.⁻⁴ (° C.) | | |
|---|---|---|---|---|---|---|---|
| | C.O.*⁵ (g) | A.A.*⁶ (g) | S.S.*⁷ | C.A.*⁸ (g/L) | HC | NO | CO |
| Ex. #28 | 80 | 80 | θ-$Al_2O_3$ | 40 | 324 | 271 | 272 |
| Ex. #29 | 80 | 80 | θ-$Al_2O_3$ | 40 | 316 | 264 | 262 |
| Ex. #30 | 80 | 80 | θ-$Al_2O_3$ | 40 | 328 | 275 | 274 |
| Ex. #31 | 80 | 80 | θ-$Al_2O_3$ | 40 | 327 | 272 | 270 |
| Ex. #32 | 110 | 50 | θ-$Al_2O_3$ | 40 | 321 | 268 | 267 |
| Ex. #33 | 160 | — | θ-$Al_2O_3$ | 40 | 323 | 267 | 265 |
| Ex. #34 | 160 | — | θ-$Al_2O_3$ | 40 | 319 | 264 | 264 |
| Ex. #35 | 160 | — | θ-$Al_2O_3$ | 40 | 318 | 264 | 263 |
| Ex. #36 | 80 | 80 | θ-$Al_2O_3$ | 40 | 326 | 273 | 271 |
| Ex. #37 | 80 | 80 | H. θ-$Al_2O_3$*⁹ | 30 | 314 | 258 | 259 |
| Comp. Ex. #9 | 80 | 80 | θ-$Al_2O_3$ | 40 | 336 | 290 | 285 |
| Comp. Ex. #10 | 80 | 80 | θ-$Al_2O_3$ | 40 | 335 | 288 | 285 |

Note:
*¹ "C.L." stands for "Catalytic Layer".
*² "L.L." stands for "Lower Layer".
*³ "U.L." stands for "Upper Layer".
*⁴ "C.T." stands for "Conversion Temperature.
*⁵ "C.O." stands for "Composite Oxide".
*⁶ "A.A." stands for "Activated Alumina".
*⁷ "S.S." stands for "Support Species".
*⁸ "C.A." stands for "Coating Amount".
*⁹ "H. $Al_2O_3$" stands for "Hollow $Al_2O_3$".

Then, the resultant composite oxide was used to form the first catalytic layer and the second catalytic layer in the same fashion as Example No. 28.

Examination and Evaluation

The respective catalysts were cut out into a test sample configuration, which had a diameter of 20 mm, a length of 41 mm and a volume of 35 cm³. The catalysts of Example Nos. 28 through 37 and Comparative Example Nos. 9 and 10 were subjected to a durability test, in which they were held at 1,050° C. for 10 hours while alternately flowing the fuel-rich model gas and fuel-lean model gas, set forth in Table 6 above, under the conditions, set forth in Table 6 above, through the respective catalysts for every 10 seconds.

After the durability test, the respective catalysts were placed in an ordinary-pressure fixed-bed flow-system catalyst testing apparatus. The respective catalysts were heated in a range of from 100° C. to 400° C. at a temperature increment rate of 10° C./min. while alternately flowing model gases, set forth in Table 12, under the conditions, set forth in Table 12, through the respective catalysts for every 1 second. Then, the respective catalysts were measured continuously for the HC, CO and $NO_x$ conversions when the According to Table 13, the catalyst of Example No. 28 was superior to the catalyst of Comparative Example No. 9 in terms of the purifying performance, and the catalyst of Example No. 29 was superior to the catalyst of Comparative Example No. 10 in terms of the purifying performance. Namely, the aqueous solution "A" and the aqueous solution "B" were used so as to carry out the co-precipitation successively. As a result, the supports were made from the thus formed composite oxides, in which the $Al_2O_3$ were present more in the surface side and the $CeO_2$—$ZrO_2$ were present more in the inner portion. It is apparent that the purifying activities were improved by using such supports.

Further, Example No. 29 was enhanced more than Example No. 28 in terms of the activities. On the other hand, the activities differences were little appreciated between Comparative Example No. 9 and Comparative Example No. 10. Namely, the advantage, resulting from $La_2O_3$, can be effected by the successive co-precipitation process. However, the advantage, resulting from $La_2O_3$, cannot be effected by the ordinary full co-precipitation process. It is assumed that this phenomenon resulted from the competition between the heat-resistance upgrading of $Al_2O_3$, effected by the addition of $La_2O_3$, and the oxygen storage-and-release ability downgrading of $CeO_2$, effected by solving $La_2O_3$ in $CeO_2$, in Comparative Example No. 10. In Example No. 29, however, it is believed that $La_2O_3$ solved selectively in $Al_2O_3$ so as to inhibit the oxygen storage-and-release ability of $CeO_2$ from degrading.

When Example Nos. 28, 30 and 31 are compared, Example No. 28 was especially good in terms of the low temperature activity. It is believed that there is an optimum value concerning the ratios of aluminum nitrate, which is included in the aqueous solutions "A" and "B". For instance, aluminum nitrate can preferably be included in both of the aqueous solutions "A" and "B" in an identical concentration. Likewise, when Example Nos. 28, 32 and 33 are compared, it is also believed that there are optimum values regarding the contents of aluminum nitrate, which is included in the aqueous solutions "A" and "B", and regarding the content of activated alumina powder added to the respective composite oxides.

Furthermore, according to the results, exhibited by Example Nos. 33, 34 and 35, it is understood that, when the activated alumina powder was not used, the higher the ratio of aluminum nitrate, included in the aqueous solution "A", was, the higher the resulting catalysts exhibited the activities. It is believed that this phenomenon took place in the following manner: the $Al_2O_3$ primary particles intervened more between the $CeO_2$—$ZrO_2$ primary particles; and thereby the $CeO_2$—$ZrO_2$ primary particles were inhibited from agglomerating.

Moreover, by comparing Example No. 28 with Example No. 36, it is appreciated that the order of the co-precipitation slightly influenced the purifying activities of the resulting catalysts. For instance, it is preferred that, like Example No. 28, the $Al_2O_3$—$CeO_2$—$ZrO_2$ oxide precursors can be co-precipitated first and the $Al_2O_3$ precursors can be precipitated thereafter.

In addition, by comparing Example No. 28 with Example No. 37, it is seen that the hollow $Al_2O_3$ can serve more preferably as the support of the second catalytic layer (i.e., the upper layer) than the $\theta$-$Al_2O_3$.

(6) Catalyst for Purifying Exhaust Gas Employing Composite Oxide, Formed by Way of Aging Treatment, as Support Table 14 summarizes the compositions of aqueous solutions, which were used to produce composite oxide powders employed in Example Nos. 38 through 49 and Comparative Example No. 11. Note that, in Table 14, the compositions of the aqueous solutions are expressed as compositions of the resulting oxides.

TABLE 14

| | Oxide Made from Aq.S.[1] "A" (A.W.R. of M.E.[2]) | | | | | Oxide Made from Aq.S.[1] "B" (A.W.R. of M.E.[2]) | | | | Oxide Made from Aq.S.[1] "C" (A.W.R. of M.E.[2]) | |
|---|---|---|---|---|---|---|---|---|---|---|---|
| | Al | Zr | Ti | La | A.T.[3] | Al | Zr | Ti | A.T.[3] | Ti | A.T.[3] |
| Ex. #38 | 1 | — | — | — | Done | 1 | 0.6 | 0.4 | Done | — | N.D.[4] |
| Ex. #39 | 1 | — | — | — | Done | 1 | 0.6 | 0.4 | N.D.[4] | — | N.D.[4] |
| Ex. #40 | 1 | — | — | — | N.D.[4] | 1 | 0.6 | 0.4 | Done | — | N.D.[4] |
| Ex. #41 | 1 | 0.6 | 0.4 | — | Done | 1 | — | — | N.D.[4] | — | N.D.[4] |
| Ex. #42 | 2 | — | — | — | Done | — | 0.6 | 0.4 | N.D.[4] | — | N.D.[4] |
| Ex. #43 | — | 0.6 | 0.4 | — | Done | 2 | — | — | N.D.[4] | — | N.D.[4] |
| Ex. #44 | 2 | — | — | — | Done | — | 0.6 | — | Done | 0.4 | Done |
| Ex. #45 | 1 | — | — | — | N.D.[4] | 1 | 0.6 | 0.4 | N.D.[4] | — | N.D.[4] |
| Ex. #46 | 2 | 0.6 | 0.4 | — | Done | — | — | — | N.D.[4] | — | N.D.[4] |
| Ex. #47 | 1 | 0.6 | 0.4 | — | Done | 1 | — | — | Done | — | N.D.[4] |
| Ex. #48 | 1 | 0.6 | 0.4 | — | N.D.[4] | 1 | — | — | Done | — | N.D.[4] |
| Ex. #49 | 1 | — | — | 0.03 | Done | 1 | 0.6 | 0.4 | Done | — | N.D.[4] |
| Comp. Ex. #11 | 2 | 0.6 | 0.4 | — | N.D.[4] | — | — | — | N.D.[4] | — | N.D.[4] |

Note:
[1] "Aq.S." stands for "Aqueous Solution".
[2] "A.W.R. of M.E." stands for "Atomic Weight Ratio of Metallic Element".
[3] "A.T." stands for "Aging Treatment".
[4] "N.D." stands for "Not Done".

EXAMPLE NO. 38

An aqueous solution (i.e., a solution "A"), which included 1 mol of aluminum nitrate nona-hydrate, was put in a beaker. While stirring the aqueous solution "A" with a mechanical stirrer and a homogenizer, precipitates were deposited by adding ammonia water to the aqueous solution in an amount as much as 1.2 times of the neutralizing equivalent. Together with the mixture solution, the precipitates were aged by carrying out a hydrothermal treatment under 0.12 MPa at 110° C. for 2 hours.

Subsequently, ammonium water, which had a concentration as much as 1.2 times of the neutralizing equivalent with respect to the following components to be neutralized, was added to the aqueous solution, which included precipitates undergone the aging treatment. Then, an aqueous solution (i.e., a solution "B"), which included 1 mol of aluminum nitrate hexa-hydrate, 0.6 mol of zirconyl oxynitrate and 0.4 mol of titanium tetrachloride, was added to the mixture, thereby depositing precipitates. In addition, together with the mixture solution, the precipitates were aged by carrying out a hydrothermal treatment under 0.12 MPa at 110° C. for 2 hours.

Thereafter, after the resulting precipitates were calcined preliminarily at 300° C. for 3 hours or more, and were calcined in air at 500° C. for 5 hours. Then, the precipitates were pulverized with a wet-type ball mill so that the median diameter was 10 $\mu$m approximately (i.e., D50≈10 $\mu$m). Thus, a composite oxide powder was prepared. The composition of the respective oxides was Al:Zr:Ti=1:0.6:0.4 by atomic weight ratio of the metallic elements.

The resulting composite powder was observed with an FE-TEM, and was analyzed by an EPMA. As a result, it was found to comprise agglomerated particles, which had an average particle diameter of about 10 µm. The agglomerated particles comprised $Al_2O_3$ primary particles, having an average crystalline diameter of 8 nm, $ZrO_2$—$TiO_2$ solid solution particles, having an average crystalline particle diameter of 9 nm, and amorphous $Al_2O_3$, intervening in the interfaces between the $ZrO_2$—$TiO_2$ solid solution particles. Further, the composite oxide powder had a median pore diameter of 8 nm, and had a narrow pore volume distribution in which 90% or more of the pores, having a pore diameter of 50 nm or less, existed in a range of 8±3 nm. Furthermore, the composite oxide powder was formed as a granular crystal whose aspect ratio was 2.5.

The $Al_2O_3$ primary particles were distributed more in the inner portion of the agglomerated particles, and the $ZrO_2$—$TiO_2$ solid solution particles were distributed more on the surface side of the agglomerated particles. According to the results obtained by the EPMA analysis, the inner-portion $Al_2O_3$ content was 65 mol % with respect to the total $Al_2O_3$ content. The surface-side $TiO_2$ content was 70 mol % with respect to the total $TiO_2$ content.

Moreover, the composite oxide powder had such a characteristic that the crystalline diameters of the respective oxides were 10 nm or less after the composite oxide was calcined in air at 700° C. for 5 hours.

400 g of the resulting composite oxide powder, 42 g of aluminum nitrate hexa-hydrate, 7.2 g of a pseud-boehmite and 300 g of pure water were mixed and pulverized with a wet-type ball mill. Thus, a slurry was prepared which had a median diameter D50=7 µm. The resultant slurry was coated in an amount of 200 g/L on a monolithic honeycomb substrate, which was made from cordierite and which had 400 cells per square inch (i.e., $in^2$). After the honeycomb support substrate was dried by blowing an air to it at 110° C., it was calcined at 500° C. for 1 hour, thereby forming a coating layer. Depending on the requirements, the coating operation was carried out repeatedly. Thus, the coating layer was formed in an amount of 200 g with respect to 1 L of the monolithic honeycomb support.

Thereafter, Pt was loaded in the coating layer by adsorption by using a platinum dinitrodiammine aqueous solution, and the monolithic honeycomb substrate was calcined in air at 300° C. for 1 hour. Subsequently, Rh was loaded in the coating layer by adsorption by using a rhodium nitrate aqueous solution, and the monolithic honeycomb substrate was calcined in air at 120° C. for 6 hours. Further, Ba was loaded in the coating layer by absorption by using a barium nitrate aqueous solution, and the monolithic honeycomb substrate was calcined in air at 300° C. for 3 hours. Furthermore, K was loaded in the coating layer by absorption by using a potassium nitrate aqueous solution, and the monolithic honeycomb substrate was calcined in air at 300° C. for 3 hours. The loading amounts of the respective components were 2 g for Pt, 0.1 g for Rh, 0.2 mol for Ba and 0.1 mol for K with respect to 1 L of the monolithic honeycomb substrate, respectively.

EXAMPLE NO. 39

Except that the aging treatment was not carried out after the solution "B" was added, a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the inner portion of the agglomerated particles, and the $ZrO_2$—$TiO_2$ was distributed more in the surface side of the agglomerated particles.

A catalyst of Example No. 39 was prepared by using the resultant composite oxide powder in the same fashion as Example No. 38.

EXAMPLE NO. 40

Except that the aging treatment was not carried out after the precipitates were deposited from the solution "A", a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the inner portion of the agglomerated particles, and the $ZrO_2$—$TiO_2$ was distributed more in the surface side of the agglomerated particles.

A catalyst of Example No. 40 was prepared by using the resultant composite oxide powder in the same fashion as Example No. 38.

EXAMPLE NO. 41

Except that an aqueous solution, in which 1 mol of aluminum nitrate nona-hydrate, 0.6 mol of zirconyl oxynitrate and 0.4 mol of titanium tetrachloride were solved, was used as an aqueous solution "A", that an aqueous solution, in which 1 mol of aluminum nitrate nona-hydrate was solved, was used as an aqueous solution "B", and that the aging treatment was not carried out after the aqueous solution "B" was added, a composite oxide powder was prepared in the same manner as Example No. 38.

The resulting composite powder was observed with an FE-TEM, and was analyzed by an EPMA. As a result, it was found to comprise agglomerated particles, which had an average particle diameter of about 10 µm. The $Al_2O_3$ was distributed more in the surface side of the agglomerated particles, and the $ZrO_2$—$TiO_2$ was distributed more in the inner portion of the agglomerated particles.

A catalyst of Example No. 41 was prepared by using the resultant composite oxide powder in the same fashion as Example No. 38.

EXAMPLE NO. 42

Except that the content of aluminum nitrate nona-hydrate was increased to 2.0 mol in the aqueous solution ""A", that an aqueous solution, in which 0.6 mol of zirconyl oxynitrate and 0.4 mol of titanium tetrachloride were solved, was used as an aqueous solution "B", and that the aging treatment was not carried out after the aqueous solution "B" was added, a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the inner portion of the agglomerated particles, and the $ZrO_2$—$TiO_2$ was distributed more in the surface side of the agglomerated particles.

A catalyst of Example No. 42 was prepared by using the resultant composite oxide powder in the same fashion as Example No. 38.

EXAMPLE NO. 43

Except that an aqueous solution, in which 0.6 mol of zirconyl oxynitrate and 0.4 mol of titanium tetrachloride were solved, was used as an aqueous solution "A", that an aqueous solution, in which 2 mol of aluminum nitrate nona-hydrate was solved, was used as an aqueous solution "B", and that the aging treatment was not carried out after the aqueous solution "B" was added, a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the surface side of the agglomerated particles, and the $ZrO_2$—$TiO_2$ was distributed more in the inner portion of the agglomerated particles.

A catalyst of Example No. 43 was prepared by using the resultant composite oxide powder in the same fashion as Example No. 38.

EXAMPLE NO. 44

The content of aluminum nitrate nona-hydrate was increased to 2.0 mol in the aqueous solution "A". An aqueous solution, in which only 0.6 mol of zirconyl oxynitrate was solved, was used as an aqueous solution "B". Precipitates were deposited in the same manner as Example No. 38. Then, ammonium water, which had a concentration as much as 1.2 times of the neutralizing equivalent with respect to the components to be neutralized, was added to the mixture of the aqueous solutions. Subsequently, an aqueous solution (i.e., a solution "C"), in which 0.4 mol of titanium tetrachloride was solved, was added to the mixture to deposit precipitates. In addition, together with the mixture solution, the resulting precipitates were aged by carrying out a hydrothermal treatment under 0.12 MPa at 110° C. for 2 hours. Thereafter, a composite oxide powder was prepared in the manner as Example No. 38.

The resulting composite powder was observed with an FE-TEM, and was analyzed by an EPMA. As a result, it was found to comprise agglomerated particles, which had an average particle diameter of about 10 µm. The $Al_2O_3$ was distributed more in the inner portion of the agglomerated particles, and the $ZrO_2$ was distributed more in the surface side of the agglomerated particles.

A catalyst of Example No. 44 was prepared by using the resultant composite oxide powder in the same fashion as Example No. 38.

EXAMPLE NO. 45

Except that the aging treatment was not carried out after the precipitates were deposited from the solution "A", and that the aging treatment was not carried out after the solution "B" was added, a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the inner portion of the agglomerated particles, and the $ZrO_2$—$TiO_2$ was distributed more in the surface side of the agglomerated particles.

A catalyst of Example No. 45 was prepared by using the resultant composite oxide powder in the same fashion as Example No. 38.

EXAMPLE NO. 46

Except that the ammonia water was added to an aqueous solution the mixture of the aqueous solution "A" and the aqueous solution "B" to deposit precipitates, and that the aging treatment was carried out onto the resultant mixture in the same fashion as Example No. 38, a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the surface side of the agglomerated particles, and the $ZrO_2$—$TiO_2$ was distributed more in the inner portion of the agglomerated particles.

A catalyst of Example No. 46 was prepared by using the resultant composite oxide powder in the same fashion as Example No. 38.

EXAMPLE NO. 47

Except that an aqueous solution, in which 1 mol of aluminum nitrate nona-hydrate, 0.6 mol of zirconyl oxynitrate and 0.4 mol of titanium tetrachloride were solved, was used as an aqueous solution "A", and that an aqueous solution, in which 1 mol of aluminum nitrate nona-hydrate was solved, was used as an aqueous solution "B", a composite oxide powder was prepared in the same manner as ExampleNo. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the surface side of the agglomerated particles, and the $ZrO_2$—$TiO_2$ was distributed more in the inner portion of the agglomerated particles.

A catalyst of Example No. 47 was prepared by using the resultant composite oxide powder in the same fashion as Example No. 38.

EXAMPLE NO. 48

Except that an aqueous solution, in which 1 mol of aluminum nitrate nona-hydrate, 0.6 mol of zirconyl oxynitrate and 0.4 mol of titanium tetrachloride were solved, was used as an aqueous solution "B", that an aqueous solution, in which 1 mol of aluminum nitrate nona-hydrate was solved, was used as an aqueous solution "B", and that the aging treatment was not carried out after the precipitates were deposited from the solution "A", a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 µm. The $Al_2O_3$ was distributed more in the surface side of the agglomerated particles, and the $ZrO_2$—$TiO_2$ was distributed more in the inner portion of the agglomerated particles.

A catalyst of Example No. 48 was prepared by using the resultant composite oxide powder in the same fashion as Example No. 38.

EXAMPLE NO. 49

Except that an aqueous solution, in which 1 mol of aluminum nitrate nona-hydrate and 0.03 mol of lanthanum nitrate hexa-hydrate were solved, was used as an aqueous solution "A", and that an aqueous solution, in which 0.6 mol of zirconyl oxynitrate, 0.4 mol of titanium tetrachloride and 1 mol of aluminum nitrate nona-hydrate were solved, was used as an aqueous solution "B", a composite oxide powder was prepared in the same manner as Example No. 38. The resulting composite oxide powder was observed with an FE-TEM, and was analyzed by an EPMA. As a result, it was found to comprise agglomerated particles, which had an average particle diameter of about 10 μm. The $Al_2O_3$ was distributed more in the inner portion of the agglomerated particles, and the $ZrO_2$—$TiO_2$ was distributed more in the surface side of the agglomerated particles.

A catalyst of Example No. 49 was prepared by using the resultant composite oxide powder in the same fashion as Example No. 38.

COMPARATIVE EXAMPLE NO. 11

Except that the ammonia water was added to an aqueous solution mixture of the aqueous solution "A" and the aqueous solution "B" to deposit precipitates, and that the aging treatment was not carried out onto the mixture of the aqueous solutions, including the deposited precipitates, a composite oxide powder was prepared in the same manner as Example No. 38. The resulting composite oxide powder was constituted by agglomerated particles, in which primary particles of the respective oxides were dispersed substantially uniformly. The agglomerated particles comprised $Al_2O_3$ primary particles and $ZrO_2$—$TiO_2$ primary particles, which were dispersed substantially uniformly with each other, and had a substantially uniform metallic distribution from the surface side to the inner portion.

A catalyst of Comparative Example No. 11 was prepared by using the resultant composite oxide powder.

Example of Testing

The catalysts of Example Nos. 38 through 49 and Comparative Example No. 11 were installed in a testing apparatus for evaluation. The catalysts were subjected to a sulfur-poisoning durability test, in which they were held at 600° C. for 5 hours while alternately flowing a fuel-lean gas and a fuel-rich gas, whose compositions are set forth in Table 15, for every 30 seconds.

TABLE 15

| | $C_3H_6$ (C %) | CO (%) | NO (ppm) | $CO_2$ (%) | $O_2$ (%) | $H_2O$ (%) | $N_2$ |
|---|---|---|---|---|---|---|---|
| Rich | 0.34 | 5.60 | 0.005 | 11 | — | 3 | Balance |
| Lean | 0.07 | — | 0.08 | 11 | 6.63 | 3 | Balance |

Further, catalysts of Example Nos. 38 through 49 and Comparative Example No. 11 were installed in another testing apparatus for evaluation. The catalysts were subjected to a heat-resistant durability test, in which they were held in a fluctuating atmosphere at 800° C. for 5 hours while alternately flowing a fuel-lean gas and a fuel-rich gas whose compositions are set forth in Table 16. In the fluctuating atmosphere, the fuel-rich model gas and fuel-rich gas were flowed for 4 minutes and 1 minute, respectively.

TABLE 16

| | $C_3H_6$ (C %) | CO (%) | $CO_2$ (ppm) | $SO_2$ (%) | $H_2$ (%) | $O_2$ (%) | $H_2O$ (%) | $N_2$ (%) |
|---|---|---|---|---|---|---|---|---|
| Rich | 0.48 | 0.1 | 10 | 0.1 | 1.5 | — | 3 | B* |
| Lean | 0.45 | 0.1 | 10 | 0.096 | — | 7.7 | 3 | B* |

Note:
"B*" stands for "Balance".

Then, the catalysts, which had been subjected to the sulfur-poisoning durability test and the heat-resistance durability test, were equipped in an ordinary-pressure fixed-bed flow-system catalyst testing apparatus, respectively. The respective catalysts were examined for the $NO_x$ storage amounts at the respective temperatures, 300° C., 400° C. and 500° C., while flowing a fuel-lean model gas and a fuel-rich model gas whose compositions are set forth in Table 17. Specifically, after the respective catalysts were first subjected to a pre-treatment by using the fuel-rich gas, the catalysts were subjected to an oxidizing treatment in which the fuel-lean gas was flowed through the catalysts at each of the temperatures at a flow rate of 50 L/min. Thereafter, the fuel-rich gas was flowed through the catalysts for 3 seconds, and was switched to the fuel-lean gas. In the meantime, $NO_x$ concentrations were measured in the catalyst-outlet exhaust gases, respectively.

TABLE 17

| | $C_3H_6$ (C %) | CO (%) | $CO_2$ (%) | NO (%) | $H_2$ (%) | $O_2$ (%) | $H_2O$ (%) | $N_2$ |
|---|---|---|---|---|---|---|---|---|
| Rich | 0.21 | 0.69 | 10 | 0.17 | 1.5 | 0.18 | 3 | Balance |
| Lean | 0.20 | 0.08 | 10 | 0.16 | — | 6.7 | 3 | Balance |

Figure 3:
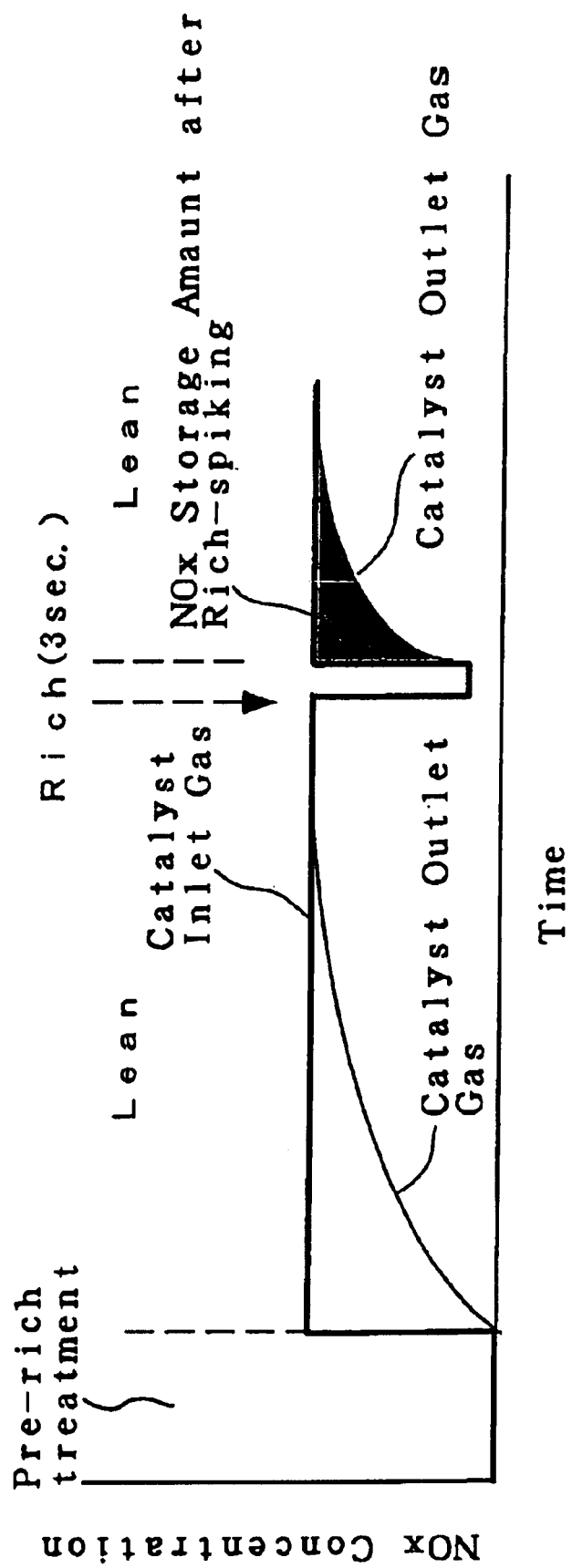
FIG. 3 is an explanatory diagram for illustrating how an $NO_x$ storage amount was evaluated after carrying out rich-spiking.

Moreover, the $NO_x$ storage amounts after rich-spiking (hereinafter simply referred to as "$RSNO_x$ storage amounts") were calculated from the blackened-out area of FIG. 3. The results of the calculation are set forth in Table 18. Since it has been known that the higher the $RSNO_x$ is, the higher the $NO_x$ purifying performance is, the $RSNO_x$ was taken as a major index of the NO, purifying performance.

In addition, the respective catalysts were measured for the BET specific surface areas initially and after the heat-resistance durability. The results are also summarized in Table 18.

TABLE 18

| | $RSNO_x$ Storage Amount (μmol per 0.5 g of Catalyst) | | | | | | BET S.S.A.*[1] | |
|---|---|---|---|---|---|---|---|---|
| | After S.D.T*[2] | | | After H.D.T.*[3] | | | ($m^2$/g) | |
| | 300° C. | 400° C. | 500° C. | 400° C. | 500° C. | 600° C. | I*[4] | A.D.T.*[5] |
| Ex. #38 | 22 | 51 | 36 | 24 | 40 | 26 | 298 | 165 |
| Ex. #39 | 19 | 48 | 33 | 25 | 38 | 25 | 300 | 154 |
| Ex. #40 | 19 | 50 | 32 | 23 | 36 | 25 | 295 | 160 |
| Ex. #41 | 20 | 48 | 31 | 24 | 37 | 25 | 290 | 150 |
| Ex. #42 | 17 | 45 | 30 | 22 | 35 | 26 | 302 | 161 |
| Ex. #43 | 16 | 46 | 32 | 24 | 39 | 23 | 288 | 145 |
| Ex. #44 | 15 | 44 | 33 | 22 | 41 | 26 | 295 | 148 |

TABLE 18-continued

|  | RSNO$_x$ Storage Amount ($\mu$mol per 0.5 g of Catalyst) | | | | | | BET S.S.A.*[1] (m$^2$/g) | |
|---|---|---|---|---|---|---|---|---|
|  | After S.D.T*[2] | | | After H.D.T.*[3] | | | | |
|  | 300° C. | 400° C. | 500° C. | 400° C. | 500° C. | 600° C. | I*[4] | A.D.T.*[5] |
| Ex. #45 | 15 | 43 | 31 | 21 | 39 | 24 | 285 | 136 |
| Ex. #46 | 16 | 46 | 30 | 22 | 38 | 24 | 279 | 140 |
| Ex. #47 | 23 | 52 | 36 | 26 | 43 | 23 | 285 | 155 |
| Ex. #48 | 20 | 47 | 34 | 25 | 36 | 26 | 287 | 152 |
| Ex. #49 | 23 | 52 | 33 | 24 | 42 | 27 | 292 | 168 |
| Comp. Ex. #11 | 12 | 38 | 27 | 19 | 30 | 20 | 274 | 127 |

Note:
*[1] "BET S.S.A." stands for "BET Specific Surface Area".
*[2] "S.D.T." stands for "Surface-poisoning Durability Test".
*[3] "H.D.T." stands for "Heat-resistance Durability Test".
*[4] "I." Stands for "Initial".
*[5] "A.D.T." stands for "After Durability Test".

Evaluation

As can be understood from Table 18, it is apparent that the catalysts of the respective examples exhibited the specific surface areas, which were lowered by the heat-resistance durability test by a smaller extent than that of the catalyst of Comparative Example No. 11, and that they were good in terms of the heat resistance. The advantage resulted from the fact that the inner-portion metallic element distributions were different from the surface-side metallic element distributions in the agglomerated particles, and the fact that the aging treatment was carried out.

Further, by comparing Example Nos. 38 through 40 with Example Nos. 47 through 49, Example No. 38, Example No. 47 and Example No. 49 exhibited particularly large RSNO$_x$ storage amounts. It is appreciated that the aging treatment of the precipitates can preferably be carried out for every time after the precipitates are deposited, respectively. When the specific surface areas are compared, Example Nos. 38 through 39 are more preferred than Example No. 40. Accordingly, it is seen that the deposited Al$_2$O$_3$ precursors can preferably be aged. These imply that the Al$_2$O$_3$ primary particles exhibited low solid-phase reactivities to the other primary particles, and that they exist between the other primary particles to act as barriers so as to secure the specific surface areas.

Furthermore, by comparing Example No. 38 with Example No. 49, it is recognized that, when Al and La were included in the solution "A", the resulting support was furthermore improved in terms of the heat resistance, and the activities were enhanced as well.

It is admitted that the larger the specific surface areas of the supports, which were employed by the catalysts, were, the higher the catalysts tended to exhibit the activities after the sulfur-poisoning durability test. This is believed to take place in the following manner. By enlarging the specific surface area, the distensibilities of components, which exhibit high sulfur-poisoning resistance and which are contained in the TiO$_2$ or ZrO$_2$—TiO$_2$ solid solution being included in the support, are heightened. Accordingly, the granular growth is inhibited. As a result, the sulfur-poisoning resistance is improved.

In addition, the catalysts of the respective examples exhibited larger RSNO$_x$ storage amounts than that of the catalyst of Comparative Example No. 11 after the heat-resistance durability test. Consequently, it is understood that the heat-resistance improvement of the support contributed to the durabilities of the catalytic activities greatly. It is believed that this advantage resulted from the following operations. For instance, the granular growths of the novel metals and NO$_x$ storage members were inhibited by the heat-resistance improvement of the supports. The distensibilities of the TiO$_2$ and ZrO$_2$—TiO$_2$ solid solution in the supports were enhanced, TiO$_2$ and ZrO$_2$—TiO$_2$ solid solution which were the components inhibiting the solid-phase reactions between the support and the NO$_x$ storage members. As a result, the solid-phase reactions between the supports and the NO$_x$ storage members were inhibited.

(7) Catalyst for Purifying Exhaust Gas Having Zeolite Layer

Table 19 summarizes the compositions of aqueous solutions, which were used to produce composite oxide powders employed in Example Nos. 50 through 62 and Comparative Example Nos. 12 and 13.

TABLE 19

|  | Upper Layer | | | | Mixing | Lower |
|---|---|---|---|---|---|---|
|  | Solution "A" | | Solution "B" | | | |
|  | Molar Ratio | Aging | Molar Ratio | Aging | ZSM-5 | Layer |
| Ex. #50 | Al/Ce = 0.2/1 | N.D.* | Al = 0.2 | N.D.* | N.D.* | ZSM-5 |
| Ex. #51 | Al/Ce = 0.2/1 | N.D.* | Al/La = 0.2/0.006 | N.D.* | N.D.* | ZSM-5 |
| Ex. #52 | Al/Ce = 0.2/0.006 | N.D.* | Al/Ce = 0.2 | N.D.* | N.D.* | ZSM-5 |
| Ex. #53 | Al/Ce = 0.2/1 | Done | Al = 0.2 | N.D.* | N.D.* | ZSM-5 |
| Ex. #54 | Al/Ce = 0.2/1 | Done | Al = 0.2 | Done | N.D.* | ZSM-5 |

TABLE 19-continued

|  | Upper Layer | | | | Mixing | Lower |
|---|---|---|---|---|---|---|
|  | Solution "A" | | Solution "B" | | | |
|  | Molar Ratio | Aging | Molar Ratio | Aging | ZSM-5 | Layer |
| Ex. #55 | Al/Ce = 0.2/1 | Done | Al/La = 0.2/0.006 | N.D.* | N.D.* | ZSM-5 |
| Ex. #56 | Al/La = 0.2/0.006 | Done | Al/Ce = 0.2/1 | N.D.* | N.D.* | ZSM-5 |
| Ex. #57 | Al/Ce = 0.1/1 | N.D.* | Al = 0.3 | N.D.* | N.D.* | ZSM-5 |
| Ex. #58 | Al/Ce = 0.3/1 | N.D.* | Al = 0.1 | N.D.* | N.D.* | ZSM-5 |
| Ex. #59 | Al/Ce = 0.5/1 | N.D.* | Al = 0.5 | N.D.* | N.D.* | ZSM-5 |
| Ex. #60 | Al/Ce = 0.4/1 | N.D.* | Al = 1 | N.D.* | N.D.* | ZSM-5 |
| Ex. #61 | Al/Ce = 1/1 | N.D.* | Al = 0.4 | N.D.* | N.D.* | ZSM-5 |
| Ex. #62 | Al/Ce = 0.2/1 | N.D.* | Al = 0.2 | N.D.* | Done | None |
| Comp. Ex. #12 | Ce = 0.2 | N.D.* | None | N.D.* | N.D.* | ZSM-5 |
| Comp. Ex. #13 | Al/Ce = 0.2/1 | N.D.* | Al = 0.2 | N.D.* | N.D.* | ZSM-5 |

Note:
*"N.D." stands for "Not Done".

EXAMPLE NO. 50

Figure 4:
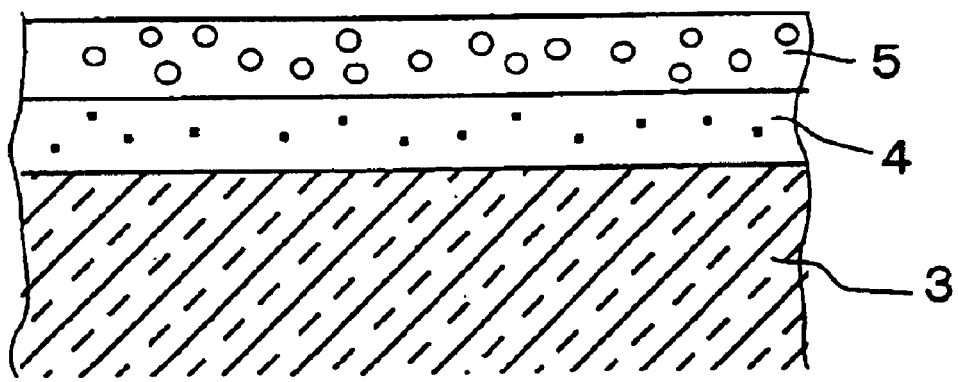
FIG. 4 is a schematic enlarged cross sectional view for illustrating one of the examples of a catalyst for purifying an exhaust gas according to the present invention.

In FIG. 4, there is illustrated a schematic enlarged cross sectional view of a catalyst of Example No. 50 for purifying an exhaust gas. This catalyst comprises a honeycomb substrate 3 made from cordierite, a lower layer 4 formed on a surface of the honeycomb substrate 3 and including a zeolite, and an upper layer 5 formed on a surface of the lower layer 4 and including an $Al_2O_3$—$CeO_2$ composite oxide. Pt and Rh are loaded in the upper layer 5. Hereinafter, a production process of the catalyst will be described so that it substitutes for a detailed description on the construction.

100 g of a ZSM-5, a predetermined amount of a silica sol and 120 g of pure water were mixed and pulverized, there by preparing a slurry. In the ZSM-5, the Si/Al molar ratio was 1,900. The silica sol was prepared so that, when it was dried, it contained $SiO_2$ as a solid component in an amount of 10% by weight with respect to the ZSM-5. While, a monolithic honeycomb substrate 3 was prepared. The monolithic honeycomb substrate 3 was made from cordierite, and had 400 cells per an inch. The slurry was coated on the monolithic honeycomb substrate 3 in an amount of 180 g with respect to 1 L of the monolithic honeycomb substrate 3. After the honeycomb support substrate 3 was dried by blowing an air to it at 110° C., it was calcined at 600° C. for 1 hour, thereby forming the lower layer 4. Depending on the requirements, the coating operation was carried out repeatedly.

Subsequently, a solution "A" was prepared by solving 0.2 mole of aluminum nitrate nona-hydrate, 1.0 mol of cerium nitrate hexa-hydrate and 31 cm³ of hydrogen peroxide water, having a concentration of 30% by weight (equivalent to a content of 1.1 mol as $H_2O_2$), in 1,500 cm³ of pure water. Further, a solution "B" was prepared by solving 0.2 mol of aluminum nitrate nona-hydrate in 250 cm³ of pure water. Furthermore, an aqueous solution, which included $NH_3$ in an amount as much as 1.2 times by mol for neutralizing all the nitric acid radicals, was prepared in an amount of 500 cm³, and was used as a neutralizing solution.

The neutralizing aqueous solution was put in a beaker, and the solution "A" was added thereto while stirring the neutralizing aqueous solution with a mechanical stirrer and a homogenizer. The mixture was kept stirred as it was for 1 hour. Thereafter, the solution "B" was added thereto, and the mixture was further stirred for 1 hour. The resulting oxide precursors were dried in air at 300° C. for 3 hours, and were further calcined preliminarily at 500° C. for 1 hour. The resultant powder was calcined in air at 600° C. for 5 hours, and was pulverized with a wet-type ball mill so that the median diameter was 10 μm approximately (i.e., D50≈10 μm). Thus, a composite oxide powder was prepared.

The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the inner portion of the agglomerated particles, and $Al_2O_3$ was present more in the surface side of the agglomerated particles. According to the results obtained by the EPMA analysis, the surface-side $Al_2O_3$ content was 65 mol % with respect to the total $Al_2O_3$ content. The inner-portion $CeO_2$ content was 70 mol % with respect to the total $CeO_2$ content.

74 g of the composite oxide powder, 120 g of an activated alumina powder, 20.8 g of aluminum nitrate hexa-hydrate, 3.6 g of apseud-boehmite and 190 g of pure water were mixed and pulverized with a wet-type ball mill. The activated alumina powder exhibited a specific surface area of 190 m²/g. Thus, a slurry was prepared which had a median diameter D50=7 μm. The resultant slurry was coated in an amount of 160 g/L on a surface of the honeycomb substrate 3 on which the lower layer 4 was formed. After the honeycomb substrate 3 was dried by blowing an air to it at 110° C., it was calcined at 600° C. for 1 hour, thereby forming the upper layer 5. Depending on the requirements, the coating operation was carried out repeatedly.

Thereafter, Pt was loaded in an amount of 1.5 g/L by using a dinitrodiammine platinum aqueous solution. Then, Rh was loaded in an amount of 0.3 g/L by using a rhodium nitrate aqueous solution.

EXAMPLE NO. 51

Except that a solution "B" was used in which 0.2 mol of aluminum nitrate nona-hydrate and 0.006 mole of lanthanum nitrate nona-hydrate were solved in 250 cm³ of pure water, a composite oxide was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover,it was analyzed by an EPMA, $CeO_2$ was present more in the inner portion of the agglomerated particles, and $Al_2O_3$ was present more on the surface side of the agglomerated particles.

A catalyst of Example No. 51 was prepared by using the resultant composite oxide powder in the same fashion as Example No. 50.

EXAMPLE NO. 52

Except that a solution "A" was used in which 0.2 mol of aluminum nitrate nona-hydrate and 0.006 mol of lanthanum nitrate nona-hydrate were solved in 250 cm$^3$, and that a solution "B" was used in which 0.2 mol of aluminum nitrate nona-hydrate, 1.0 mol of cerium nitrate hexa-hydrate and 31 cm$^3$ of hydrogen peroxide water, having a concentration of 30% by weight (equivalent to a content of 1.1 mol as $H_2O_2$), in 1,500 cm$^3$ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the surface side of the agglomerated particles, and $Al_2O_3$ was present more in the inner portion of the agglomerated particles.

A catalyst of Example No. 52 was prepared by using the resultant composite oxide powder in the same fashion as Example No. 50.

EXAMPLE NO. 53

400 cm$^3$ of a neutralizing solution was put in a beaker, neutralizing solution which included $NH_3$ in an amount as much as 1.2 times for being capable of neutralizing the nitric acid radicals of the same solution "A" as that of Example 50. While stirring the neutralizing solution with a mechanical stirrer and a homogenizer, the solution "A", being identical with that of Example No. 50, was added thereto. After the mixture was stirred as it was for 1 hour, the resulting oxide precursors were subjected to an aging treatment by carrying out a hydrothermal treatment under 0.12 MPa at 110° C. for 2 hours.

Then, ammonia water, which included $NH_3$ in an amount as much as 1.2 times for being capable of neutralizing the nitric acid radicals of the same solution "B" as that of Example 50, was added to the oxide precursors. While stirring the ammonium water, the solution "B", being identical with that of Example No. 50, was added thereto, and the mixture was stirred for 1 hour. The resulting oxide precursors were dried in air at 300° C. for 3 hours, and were further calcined preliminarily at 500° C. for 1 hour. The resultant powder was calcined in air at 600° C. for 5 hours, and was pulverized with a wet-type ball mill so that the median diameter was 10 μm approximately (i.e., D50≈10 μm). Thus, a composite oxide powder was prepared.

The resulting composite powder was observed with an FE-TEM, the composite oxide powder was found to comprise a glomerated particles, in which fine particles, having an average diameter of 9 nm, were agglomerated. Moreover, it was analyzed by an EPMA, an $Al_2O_3$—$CeO_2$ composite oxide was present more in the inner portion of the agglomerated particles, and $Al_2O_3$ was present more in the surface side of the agglomerated particles.

By using the above-described composite oxide powder, the upper layer 5 was formed by coating on a surface of the honeycomb substrate 3, which had the lower layer 4, being identical with that of Example No. 50, in the same manner as Example No. 50.

EXAMPLE NO. 54

Except that, after one hour passed since the solution "B" had been added, the resulting oxide precursors were subjected to an aging treatment by carrying out a hydrothermal treatment under 0.12 MPa at 110° C. for 2 hours, a composite oxide was prepared in the same manner as Example No. 53. The resulting composite oxide powder was observed with an FE-TEM, the composite oxide powder was found to comprise agglomerated particles, in which fine particles, having an average diameter of 9 nm, were agglomerated. Moreover, it was analyzed by an EPMA, an $Al_2O_3$—$CeO_2$ composite oxide was present more in the inner portion of the agglomerated particles, and $Al_2O_3$ was present more in the surface side of the agglomerated particles.

A catalyst of Example No. 54 was prepared by using the resultant composite oxide powder in the same fashion as Example No. 53.

EXAMPLE NO. 55

Except that an aqueous solution B" was used in which 0.2 mol of aluminum nitrate nona-hydrate and 0.006 mol of lanthanum nitrate nona-hydrate were solved in 250 cm$^3$ of pure water, a composite oxide was prepared in the same manner as Example No. 53. The resulting composite oxide powder was observed with an FE-TEM, the composite oxide powder was found to comprise agglomerated particles, in which fine particles, having an average diameter of 9 nm, were agglomerated. Moreover, it was analyzed by an EPMA, an $Al_2O_3$—$CeO_2$ composite oxide was present more in the inner portion of the agglomerated particles, and $Al_2O_3$ was present more in the surface side of the agglomerated particles.

A catalyst of Example No. 55 was prepared by using the resultant composite oxide powder in the same fashion as Example No. 53.

EXAMPLE NO. 56

Except that a solution "A" was used in which 0.2 mol of aluminum nitrate nona-hydrate and 0.006 mol of lanthanum nitrate nona-hydrate were solved in 250 cm$^3$ of pure water, and that a solution "B" was used in which 0.2 mol of aluminum nitrate nona-hydrate, 1.0 mol of cerium nitrate hexa-hydrate and 31 cm$^3$ of hydrogen peroxide water, having a concentration of 30% by weight (equivalent to a content of 1.1 mol as $H_2O_2$), in 1,500 cm$^3$ of pure water, a composite oxide powder was prepared in the same manner as Example No. 53. The resulting composite oxide powder was observed with an FE-TEM, the composite oxide powder was found to comprise agglomerated particles, in which fine particles, having an average diameter of 9 nm, were agglomerated. Moreover, it was analyzed by an EPMA, an $Al_2O_3$—$CeO_2$ composite oxide was present more in the surface side of the agglomerated particles, and $Al_2O_3$ was present more in the inner portion of the agglomerated particles.

A catalyst of Example No. 56 was prepared by using the resultant composite oxide powder in the same fashion as Example No. 53.

EXAMPLE NO. 57

Except that a solution "A" was used in which 0.1 mol of aluminum nitrate nona-hydrate, 1.0 mol of cerium nitrate hexa-hydrate and 31 cm$^3$ of hydrogen peroxide water, having a concentration of 30% by weight (equivalent to a content of 1.1 mol as $H_2O_2$), were solved in 1,500 cm$^3$ of pure water, and that a solution "B" was used in which 0.3 mol of aluminum nitrate nona-hydrate was solved in 250 cm$^3$ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the inner portion of the agglomerated particles, and $Al_2O_3$ was present more in the surface side of the agglomerated particles.

A catalyst of Example No. 57 was prepared by using the resultant composite oxide powder in the same fashion as Example No. 50.

EXAMPLE NO. 58

Except that a solution "A" was used in which 0.3 mol of aluminum nitrate nona-hydrate, 1.0 mol of cerium nitrate hexa-hydrate and 31 cm³ of hydrogen peroxide water, having a concentration of 30% by weight (equivalent to a content of 1.1 mol as $H_2O_2$), were solved in 1,500 cm³ of pure water, and that a solution "B" was used in which 0.1 mol of aluminum nitrate nona-hydrate was solved in 250 cm³ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomated. Moreover, it was analyzed by an EPMA, $CeO_2$ was present more in the inner portion of the agglomerated particles, and $Al_2O_3$ was present more in the surface side of the agglomerated particles.

A catalyst of Example No. 58 was prepared by using the resultant composite oxide powder in the same fashion as Example No. 50.

EXAMPLE NO. 59

Except that a solution "A" was used in which 0.5 mol of aluminum nitrate nona-hydrate, 1.0 mol of cerium nitrate hexa-hydrate and 31 cm³ hydrogen peroxide water, having a concentration of 30% by weight (equivalent to a content of 1.1 mol as $H_2O_2$), were solved in 1,500 cm³ of pure water, and that a solution "B" was used in which 0.5 mol of aluminum nitrate nona-hydrate was solved in 250 cm³ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the inner portion of the agglomerated particles, and $Al_2O_3$ was present more in the surface side of the agglomerated particles.

A catalyst of Example No. 59 was prepared by using the resultant composite oxide powder in the same fashion as Example No. 50.

EXAMPLE NO. 60

Except that a solution "A" was used in which 0.4 mol of aluminum nitrate nona-hydrate, 1.0 mol of cerium nitrate hexa-hydrate and 31 cm³ hydrogen peroxide water, having a concentration of 30% by weight (equivalent to a content of 1.1 mol as $H_2O_2$), were solved in 1,500 cm³ of pure water, and that a solution "B" was used in which 1.0 mol of aluminum nitrate nona-hydrate was solved in 250 cm³ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the inner portion of the agglomerated particles, and $Al_2O_3$ was present more in the surface side of the agglomerated particles.

A catalyst of Example No. 60 was prepared by using the resultant composite oxide powder in the same fashion as Example No. 50.

EXAMPLE NO. 61

Except that a solution "A" was used in which 1.0 mol of aluminum nitrate nona-hydrate, 1.0 mol of cerium nitrate hexa-hydrate and 31 cm³ of hydrogen peroxide water, having a concentration of 30% by weight (equivalent to a content of 1.1 mol as $H_2O_2$), were solved in 1,500 cm³ of pure water, and that a solution "B" was used in which 0.4 mol of aluminum nitrate nona-hydrate was solved in 250 cm³ of pure water, a composite oxide powder was prepared in the same manner as Example No. 50. The resulting composite oxide powder was observed with an FE-TEM, the composite oxide powder was found to comprise agglomerated particles, in which fine particles, having an average diameter of 7 nm, were agglomerated. Moreover, it was analyzed by an EPMA, $CeO_2$ was present more in the inner portion of the agglomerated particles, and $Al_2O_3$ was present more in the surface side of the agglomerated particles.

A catalyst of Example No. 61 was prepared by using the resultant composite oxide powder in the same fashion as Example No. 50.

EXAMPLE NO. 62

74 g of the same composite oxide powder as prepared in Example No. 50, 120 g of an activated alumina powder, 20.8 g of aluminum nitrate hexa-hydrate, 3.6 gofapseud-boehmite, 218 g of a ZSM-5, a predetermined amount of a silica sol and 452 g of pure water were mixed and pulverized with a wet-type ball mill. The activated alumina powder exhibited a specific surface area of 190 m²/g. In the ZSM-5, the Si/Al molar ratio was 1,900. The silica sol was prepared so that, when it was dried, its solid $SiO_2$ content was 10% by weight with respect to the ZSM-5. Thus, a slurry was prepared which had a median diameter D50=7 µm. Then, the same honeycomb substrate 3 as that of Example No. 50 was prepared. The resultant slurry was coated in an amount of 340 g/L on a surface of the honeycomb substrate 3. After the honeycomb substrate 3 was dried by blowing an air to it at 100° C., it was calcined at 600° C. for 1 hour, thereby forming a support layer. Depending on the requirements, the coating operation was carried out repeatedly.

Note that, in the resulting catalyst, the lower layer 4was not formed.

COMPARATIVE EXAMPLE NO. 12

Except that only a solution, in which 0.25 mol of cerium nitrate hexa-hydrate and 31 cm³ of hydrogen peroxide water, having a concentration of 30% by weight (equivalent to a content of 1.1 mol as $H_2O_2$), was added to the neutralizing solution at once, a composite oxide powder was prepared in the same manner as Example No. 50. The resultant composite oxide was constituted by agglomerated particles, in which $CeO_2$ primary particles were agglomerated, and had a substantially uniform metallic element distribution from the surface side to the inner portion.

Then, a catalyst of Comparative Example No. 12 was prepared by using the resultant composite oxide powder in the same manner as Example No. 5. Note that, in the catalyst of Comparative Example No. 12, Al$_2$O$_3$ was not included in the upper layer 5.

COMPARATIVE EXAMPLE NO. 13

Except that the lower layer 4 was not formed, and that the upper layer 5 was formed directly on a surface of a monolithic honeycomb substrate 3, a catalyst as well as a composite oxide powder were prepared in the same manner as Example No. 50.

Then, by using the composite oxide powder, a catalyst of Comparative Example No. 13 was prepared in the same manner as Example No. 50. Note that the zeolite was not included in the resulting catalyst.

Test and Evaluation

The respective catalysts were cut out into a test sample configuration, which had a diameter of 20 mm, a length of 41 mm and a volume of 35 cm$^3$ and were subjected to a durability test, in which they were held at 900° C. for 10 hours while alternately flowing the fuel-rich model gas and the fuel-lean model gas, set forth in Table 5 above, through the respective catalysts for every 10 seconds. The total flow rate was 20 L/min. After the respective catalysts were subjected to the durability test, they were heated at a temperature increment rate of 10° C./min. while alternately flowing the fuel-rich model gas and the fuel-lean model gas, set forth in Table 12 above, through the respective catalysts for every 1 second. In the meantime, the respective catalysts were measured for the ordinary purifying performance, respectively. The 50% conversion temperatures of NO, CO and C$_3$H$_8$ were calculated, respectively. The results are summarized in Table 20. In addition, in order to compare the early-stage igniting performance of the respective catalysts, a fuel-lean model gas, which was heated to 500° C., was flowed through the respective catalysts instantaneously, and the catalysts were measured for the average HC-emission amounts within 1 minute from the beginning of the fuel-lean model-gas flow. The results are also summarized in Table 20.

TABLE 20

| | 50% Conversion Temp. (° C.) | | | Average HC Emission |
|---|---|---|---|---|
| | NO$_x$ | O | C$_3$H$_6$ | (ppm/sec.) |
| Ex. #50 | 220 | 224 | 229 | 245 |
| Ex. #51 | 217 | 221 | 227 | 234 |
| Ex. #52 | 222 | 225 | 231 | 254 |
| Ex. #53 | 216 | 221 | 226 | 238 |
| Ex. #54 | 205 | 210 | 215 | 210 |
| Ex. #55 | 208 | 209 | 216 | 220 |
| Ex. #56 | 219 | 223 | 227 | 242 |
| Ex. #57 | 225 | 228 | 234 | 262 |
| Ex. #58 | 224 | 225 | 232 | 275 |
| Ex. #59 | 226 | 227 | 236 | 291 |
| Ex. #60 | 227 | 230 | 239 | 311 |
| Ex. #61 | 226 | 229 | 236 | 308 |
| Ex. #62 | 221 | 224 | 232 | 258 |
| Comp. Ex. #12 | 230 | 232 | 240 | 350 |
| Comp. Ex. #13 | 219 | 224 | 230 | 300 |

Since the catalyst of Comparative Example No. 13 exhibited lower temperature activities than the catalyst of Comparative Example No. 12, the catalyst, which had the support layer being prepared by the production process according to the present invention, was better than the catalyst, which had the support layer being composed of CeO$_2$ only, in terms of the purifying activities. In addition, since the catalyst of Comparative Example No. 13 exhibited the average HC emission less, it is understood that the catalyst is activated early. However, the average HC emission, exhibited by the catalyst of Comparative Example No. 13, was still larger than those, exhibited by the catalysts of examples. Accordingly, it was necessary to further reduce the average HC emission, which was exhibited by the catalyst of Example No. 13.

By comparing Example No. 50 with Comparative Example No. 13, it is seen that the average HC emission was improved remarkably by forming the lower layer, which was composed of the zeolite. This advantage is effected because HC are adsorbed in the lower layer while the temperature of the catalyst increases to the activation temperature.

By comparing Example No. 50 with Example No. 62 as well as Comparative Example No. 13, the advantage could be appreciated when the zeolite was mixed with the composite oxide powder. However, it is apparent that a zeolite can preferably be included in the lower layer rather than it is included in the upper layer.

Further, by comparing Example Nos. 50, 53 and 54 or Example Nos. 51, 55 and 56, it is appreciated that the activities were enhanced by subjecting the oxide precursors to the aging treatment. The reasoning has not been verified yet. However, it is assumed as follows. The surfaces of the primary particles are stabilized by the aging treatment. Consequently, the granular growth, which results from the agglomeration, is inhibited. As a result, it is possible to maintain the interfaces, which contact with the catalytic ingredients, much more greatly.

Furthermore, by comparing Example Nos. 51 and 52 with Comparative Example No. 12, there might be a possibility of an optimum order in the preparations of the precipitates. However, it is apparent that, even if the precipitates were prepared in either of the orders, the resulting catalyst exhibited higher activities than the catalyst of Comparative Example No. 12 did. Since the catalyst of Example No. 51 was upgraded more than the catalyst of Example No. 50 in terms of the activities, it is evident that Al$_2$O$_3$—La$_2$O$_3$ can preferably be further included in the upper layer 5.

Note that, by comparing Example No. 50 with Example Nos. 57 through 61, there was an optimum range for the metallic element composition ratio in the composite oxide powder. It is understood that ratio of Al with respect to Ce, i.e., Al:Ce, can preferably a range of from 1:0.5 to 1:10 and can further preferably a range of from 1:1 to 1:5.

Having now fully described the present invention, it will be to one of ordinary skill in the art that many changes and modifications can be made thereto without departing from the spirit or scope of the present invention as set forth herein including the appended claims.

What is claimed is:

1. A composite oxide, comprising: agglomerated particles, each agglomerated particle comprising a plurality of fine particles, the agglomerated particles having an average particle diameter of 20 μm or less and the fine particles having an average diameter of 50 nm or less, wherein the plurality of fine particles comprises oxides of a plurality of metallic elements, and each fine particle independently comprises an oxide of one or more of said metallic elements, said agglomerated particles having a surface and an inner portion, and wherein fine particles each having an oxide of the same metallic element or elements have a molar distribution in the surface portion that differs from the molar distribution in the inner portion.

2. The composite oxide according to claim 1, wherein the plurality of metallic elements are Al and at least one element selected from the group consisting of Ce and Zr.

3. The composite oxide according to claim 2, wherein Ce is present as $CeO_2$ and Zr is present as $ZrO_2$, and at least a part of $CeO_2$ and $ZrO_2$ form a solid solution.

4. The composite oxide according to claim 1, wherein the plurality of metallic elements are Al, Zr and Ti.

5. The composite oxide according to claim 4, wherein Zr is present as $ZrO_2$ and Ti is present as $TiO_2$, and at least a part of $ZrO_2$ and $TiO_2$ form a solid solution.

6. The composite oxide according to claim 2, wherein said agglomerated particles further comprise a rare-earth element oxide, and the rare-earth element oxide is solved in $Al_2O_3$ in an amount of 70 mol % or more.

7. The composite oxide according to claim 4, wherein said agglomerated particles further comprise a rare-earth element oxide, and the rare-earth element oxide is solved in $Al_2O_3$ in an amount of 70 mol % or more.

8. The composite oxide according to claim 1, wherein the plurality of metallic elements are at least two elements selected from the group consisting of Al, Ce, Zr, Y, Si, Ti, and Pr.

9. The composite oxide according to claim 8, wherein Y is present as $Y_2O_3$, Ce is present as $CeO_2$, and Zr is present as $ZrO_2$, and a solving ratio of $Y_2O_3$ in $CeO_2$ is 10 mol % or less, and a solving ratio of $Y_2O_3$ in $ZrO_2$ is 90 mol % or more.

10. The composite oxide according to claim 8, wherein Al is present as $Al_2O_3$, and said agglomerated particles further comprise a rare earth element oxide, excepting $Y_2O_3$, and the rare earth element oxide is solved in $Al_2O_3$ in an amount of 70 mol % or more.

11. The composite oxide according to claim 6, wherein the rare-earth element oxide is $La_2O_3$.

12. The composite oxide according to claim 10, wherein the rare-earth element oxide is $La_2O_3$.

13. A composite oxide, comprising:
agglomerated particles having an average particle diameter of 20 μm or less, in which first oxide-phase fine particles having an average diameter of 50 μm or less, and second oxide-phase fine particles being different from the first oxide-phase fine particles and having an average particle diameter of 50 μm or less, are agglomerated,
said first oxide-phase forming a crystal having an aspect ratio of 30 or less and being highly dispersed with each other and with said second-phase fine particles to constitute said agglomerated particles, said agglomerated particles having a surface and an inner portion, and wherein fine particles each having an oxide of the same metallic element or elements have a molar distribution in the surface portion that differs from the molar distribution in the inner portion.

14. The composite oxide according to claim 13 further comprising third oxide-phase fine particles being different from the first oxide-phase particles and the second oxide-phase fine particles.

15. A composite oxide, comprising:
agglomerated particles having an average particle diameter of 20 μm or less, in which first oxide phase fine particles having an average diameter of 100 nm or less, and second oxide phase fine particles being different from the first oxide phase fine particles and having an average particle diameter of 30 nm or less, are agglomerated,
said first oxide phase fine particles having pores between the fine particles, in the pores which a major part of said second oxide phase fine particles are dispersed, the pores having a median pore diameter of from 5 to 20 nm, 50% or more of all the pores falling in a range of ±2 nm of the median diameter, said agglomerated particles having a surface and an inner portion, and wherein fine particles each having an oxide of the same metallic element or elements have molar distribution in the surface portion that differs from the molar distribution in the inner portion.

16. The composite oxide according to claim 15 further comprising third oxide-phase fine particles being different from the first oxide-phase fine particles and the second oxide-phase fine particles, a major portion of the third oxide-phase fine particles being dispersed in the pores.

17. The composite oxide according to claim 13, wherein metallic elements, constituting the first oxide phase, the second oxide phase and the third oxide phase are at least two metallic elements selected from the group consisting of Al, Ce, Zr, Ti, Mg, La, Pr and Si.

18. The composite oxide according to claim 15, wherein metallic elements, constituting the first oxide phase, the second oxide phase and the third oxide phase are at least two metallic elements selected from the group consisting of Al, Ce, Zr, Ti, Mg, La, Pr and Si.

19. The composite oxide according to claim 13, wherein the respective oxides have crystalline diameters of 10 nm or less after calcining them in air at 700° C. for 5 hours.

20. The composite oxide according to claim 15, wherein the respective oxides have crystalline diameters of 10 nm or less after calcining them in air at 700° C. for 5 hours.

21. The composite oxide according to claim 16, wherein the respective oxides have crystalline diameters of 10 nm or less after calcining them in air at 700° C. for 5 hours.

22. A catalyst for purifying an exhaust gas, comprising: a catalytic ingredient being loaded on the composite oxide set forth in claim 1.

23. A catalyst for purifying an exhaust gas, comprising: a catalytic ingredient being loaded on the composite oxide set forth in claim 13.

24. A catalyst for purifying an exhaust gas, comprising: a catalytic ingredient being loaded on the composite oxide set forth in claim 15.

25. A catalyst for purifying an exhaust gas, comprising: a catalytic ingredient being loaded on the composite oxide set forth in claim 16.

26. A catalyst for purifying an exhaust gas, comprising:
a support substrate;
a first catalytic layer being formed on a surface of the support substrate, and comprising a first support including the first oxide phase set forth in claim 13, and a catalytic ingredient being loaded on the first support; and
a second catalytic layer being formed on a surface of the first catalytic layer, and comprising a second support including the second oxide phase set forth in claim 13, and a catalytic ingredient being loaded on the second support;
at least one of the first support and the second support including agglomerated particles, each agglomerated particle comprising a plurality of fine particles dispersed therein, the agglomerated particles having an average particle diameter of 20 μm or less, and the fine particles having an average particle diameter of 50 nm or less, wherein the plurality of fine particles comprises oxides of a plurality of metallic elements, and each fine particle independently comprises an oxide of one or more of said metallic elements, said agglomerated particles having a surface and an inner portion, and wherein fine particles each having an oxide of the same metallic element or elements have a molar distribution in the surface portion that differs from the molar distribution in the inner portion.

27. A catalyst for purifying an exhaust gas, comprising:
a support substrate;
a first catalytic layer being formed on a surface of the support substrate, and comprising a first support including the first oxide phase set forth in claim 13, and a catalytic ingredient being loaded on the first support; and
a second catalytic layer being formed on a surface of the first catalytic layer, and comprising a second support including the second oxide phase set forth in claim 15, and a catalytic ingredient being loaded on the second support;
at least one of the first support and the second support including agglomerated particles, each agglomerated particle comprising a plurality of fine particles dispersed therein, the agglomerated particles having an average particle diameter of 20 $\mu$m or less, and the fine particles having an average particle diameter of 50 nm or less, wherein the plurality of fine particles comprises oxides of a plurality of metallic elements, and each fine particle independently comprises an oxide of one or more of said metallic elements, said agglomerated particles having a surface and an inner portion, and wherein fine particles each having an oxide of the same metallic element or elements have a molar distribution in the surface portion that differs from the molar distribution in the inner portion.

28. The catalyst according to claim 26, wherein the plurality of metallic elements are at least two elements selected from the group consisting of Al, Ce, Zr, Ti, Mg, La and Si.

29. The catalyst for purifying an exhaust gas according to claim 28, wherein said agglomerated particles are included in the first support.

30. The catalyst for purifying an exhaust gas according to claim 28, wherein a $CeO_2$—$ZrO_2$ solid solution is included in the inner portion of said agglomerated particles.

31. The catalyst for purifying an exhaust gas according to claim 28, wherein $Al_2O_3$, being stabilized by $La_2O_3$, is included in the surface of said agglomerated particles.

32. The catalyst for purifying an exhaust gas according to claim 28, wherein hollow $Al_2O_3$ is included in the second support.

33. A catalyst for purifying an exhaust gas, comprising:
a support substrate;
a support layer being formed on a surface of said support substrate, and including agglomerated particles, each agglomerated particle comprising a plurality of fine particles dispersed there, the agglomerated particles having an average particle diameter of 20 $\mu$m or less, and the fine particles having an average particle diameter of 50 nm or less, and zeolite particles, wherein the plurality of fine particles comprises oxides of a plurality of metallic elements, and each fine particle independently comprises an oxide of one or more of said metallic elements, said agglomerated particles having a surface and an inner portion, and wherein fine particles each having an oxide of the same metallic element or elements have a molar distribution in the surface portion that differs from the molar distribution in the inner portion; and
a catalytic ingredient loaded on said support layer.

34. The catalyst for purifying an exhaust gas according to claim 33, wherein said support layer being formed as a two layered construction includes at least a lower layer, and an upper layer being formed on a surface of the lower layer, the lower layer comprising the zeolite particles, and the upper layer comprising the agglomerated particles.

35. The catalyst for purifying an exhaust gas according to claim 33, wherein the agglomerated particles comprise a first metallic oxide of at least one element selected from the group consisting of Al, Si and Ti, and a second metallic oxide of at least one element selected from the group consisting of Ce and Pr.

36. The catalyst for purifying an exhaust gas according to claim 35, wherein said agglomerated particles further comprise a third metallic oxide of at least one element selected from the group consisting of La, Nd, Mg and Ca.

37. The catalyst for purifying an exhaust gas according to claim 33, wherein said catalytic ingredient is loaded on said agglomerated particles.

38. The catalyst for purifying an exhaust gas according to claim 33, wherein said agglomerated particles have crystalline diameters of 10 $\mu$m or less after calcining them air at 700° C. for 5 hours.

39. A process for producing a composite oxide according to claim 1, comprising the steps of:
preparing a plurality of aqueous solutions of metallic acid salts;
adding the plurality of aqueous solutions successively to an alkaline aqueous solution, which can neutralize the total amount of the metallic acid salts, thereby generating precipitates; an
calcining the precipitates.

40. The process for producing a composite oxide according to claim 39, wherein the precipitates, which are generated successively, are subjected to an aging treatment while putting them in a suspension state in which water or a solution containing water serves as a dispersion medium, or in a system in which water is present sufficiently.

41. A process for producing a composite oxide, comprising the steps of:
preparing a plurality of aqueous solutions of metallic acid salts;
mixing the respective aqueous solutions of the metallic acid salts with an alkaline solution, thereby forming precipitates respectively;
mixing the respective precipitates, thereby preparing a precipitates mixture; and
calcining the precipitates mixture.

42. The process for producing a composite oxide according to claim 41, wherein at least one of the respective formed precipitates is subjected to an aging treatment while putting it in a suspension state in which water or a solution containing water serves as a dispersion medium, or in a system in which water is present sufficiently, and a precipitates mixture, in which the precipitates are mixed, is calcined.

43. A process for producing a composite oxide according to claim 1, comprising the steps of:
preparing a plurality of aqueous solutions of metallic acid salts;
mixing at least one of the aqueous solutions of the metallic acid salts with an alkaline solution, thereby forming precipitates;
subjecting at least one of the precipitates to an aging treatment while putting it in a suspension state in which water or a solution containing water serves as a dispersion medium, or in a system in which water is present sufficiently;

adding the rest of the aqueous solutions of the metallic acid salts to the formed precipitates the after, thereby further forming precipitates; and calcining the resulting precipitates subsequently.

44. The process for producing a composite oxide according to claim 43, before said calcining step, further comprising the step of: subjecting the resulting precipitates to an aging treatment while putting them in a suspension state in which water or a solution containing water serves as a dispersion medium, or in a system in which water is present sufficiently.

45. A process for producing a catalyst for purifying an exhaust gas, wherein a catalytic ingredient is included in at least one of the aqueous solutions of the metallic acid salts set forth in claims 39.

46. A process for producing a catalyst for purifying an exhaust gas, wherein a catalytic ingredient is included in at least one of the aqueous solutions of the metallic acid salts set forth in claims 41.

47. A process for producing a catalyst for purifying an exhaust gas, wherein a catalytic ingredient is included in at least one of the aqueous solutions of the metallic acid salts set forth in claims 43.

48. The composite oxide according to claim 1, wherein the fine particles have an average diameter of 5 nm or more and 50 nm or less.

49. The composite oxide according to claim 1, wherein the agglomerated particles have an average particle diameter of 1 $\mu$m or more and 20 $\mu$m or less.

50. The composite oxide according to claim 48, wherein the agglomerated particles have an average particle diameter of 1 $\mu$m or more and 20 $\mu$m or less.

51. The composite oxide according to claim 13, wherein the fine particles have an average diameter of 5 $\mu$m or more and 50 $\mu$m or less.

52. The catalyst according to claim 26, wherein the fine particles have an average diameter of 5 $\mu$m or more and 50 $\mu$m or less.

53. The catalyst according to claim 26, wherein the agglomerated particles have an average particle diameter of 1 $\mu$m or more and 20 $\mu$m or less.

54. The catalyst according to claim 52, wherein the agglomerated particles have an average particle diameter of 1 $\mu$m or more and 20 $\mu$m or less.

55. The catalyst according to claim 33, wherein the fine particles have an average diameter of 5 $\mu$m or more and 50 $\mu$m or less.

56. The catalyst according to claim 33, wherein the agglomerated particles have an average particle diameter of 1 $\mu$m or more and 20 $\mu$m or less.

57. The catalyst according to claim 55, wherein the agglomerated particles have an average particle diameter of 1 $\mu$m or more 20 $\mu$m or less.

* * * * *